United States Patent [19]

Brodsky

[11] Patent Number: 4,833,600
[45] Date of Patent: May 23, 1989

[54] COMPUTER DRIVER MODULE FOR MASTER INTERFACE TO COMMUNICATION AND CONTROL NETWORK

[75] Inventor: Bruce L. Brodsky, Bridgeville, Pa.

[73] Assignee: Westinghouse Electric Corp., Pittsburgh, Pa.

[21] Appl. No.: 769,642

[22] Filed: Aug. 26, 1985

[51] Int. Cl.[4] .............................................. G06F 13/00
[52] U.S. Cl. .................................. 364/200; 364/231.5; 364/240.9; 364/242.94; 364/284.4
[58] Field of Search ... 364/200 MS File, 900 MS File

[56] References Cited

U.S. PATENT DOCUMENTS

| | | | |
|---|---|---|---|
| 3,997,896 | 12/1976 | Cassarino, Jr. et al. | 364/200 |
| 4,041,473 | 8/1977 | Bardotti et al. | 364/900 |
| 4,091,361 | 5/1978 | Eichelberger et al. | 340/168 R |
| 4,167,786 | 9/1979 | Miller et al. | 364/493 |
| 4,168,531 | 9/1979 | Eichelberger et al. | 364/900 |
| 4,173,754 | 11/1979 | Feiker | 340/310 R |
| 4,185,272 | 1/1980 | Feiker | 340/168 R |
| 4,213,182 | 7/1980 | Eichelberger et al. | 364/493 |
| 4,367,414 | 1/1983 | Miller et al. | 307/38 |
| 4,396,844 | 8/1983 | Miller et al. | 307/39 |
| 4,396,983 | 8/1983 | Segarra et al. | 364/200 |
| 4,409,656 | 10/1983 | Andersen et al. | 364/200 |
| 4,418,382 | 11/1983 | Larson et al. | 364/200 |
| 4,426,679 | 1/1984 | Yu et al. | 364/200 |
| 4,449,202 | 5/1984 | Knapp et al. | 364/900 |
| 4,481,572 | 11/1984 | Ochsner | 364/200 |
| 4,644,547 | 2/1987 | Vercellotti et al. | 371/69 |

Primary Examiner—Gareth D. Shaw
Assistant Examiner—Christina M. Eakman
Attorney, Agent, or Firm—M. J. Moran

[57] ABSTRACT

A driver module is provided which cooperates with and drives a hardware interface to a two-way communication and control system. The driver module also performs a number of error checking functions in connection with each message sent out by the master so that faulty messages are not placed on the communication and control network.

23 Claims, 13 Drawing Sheets

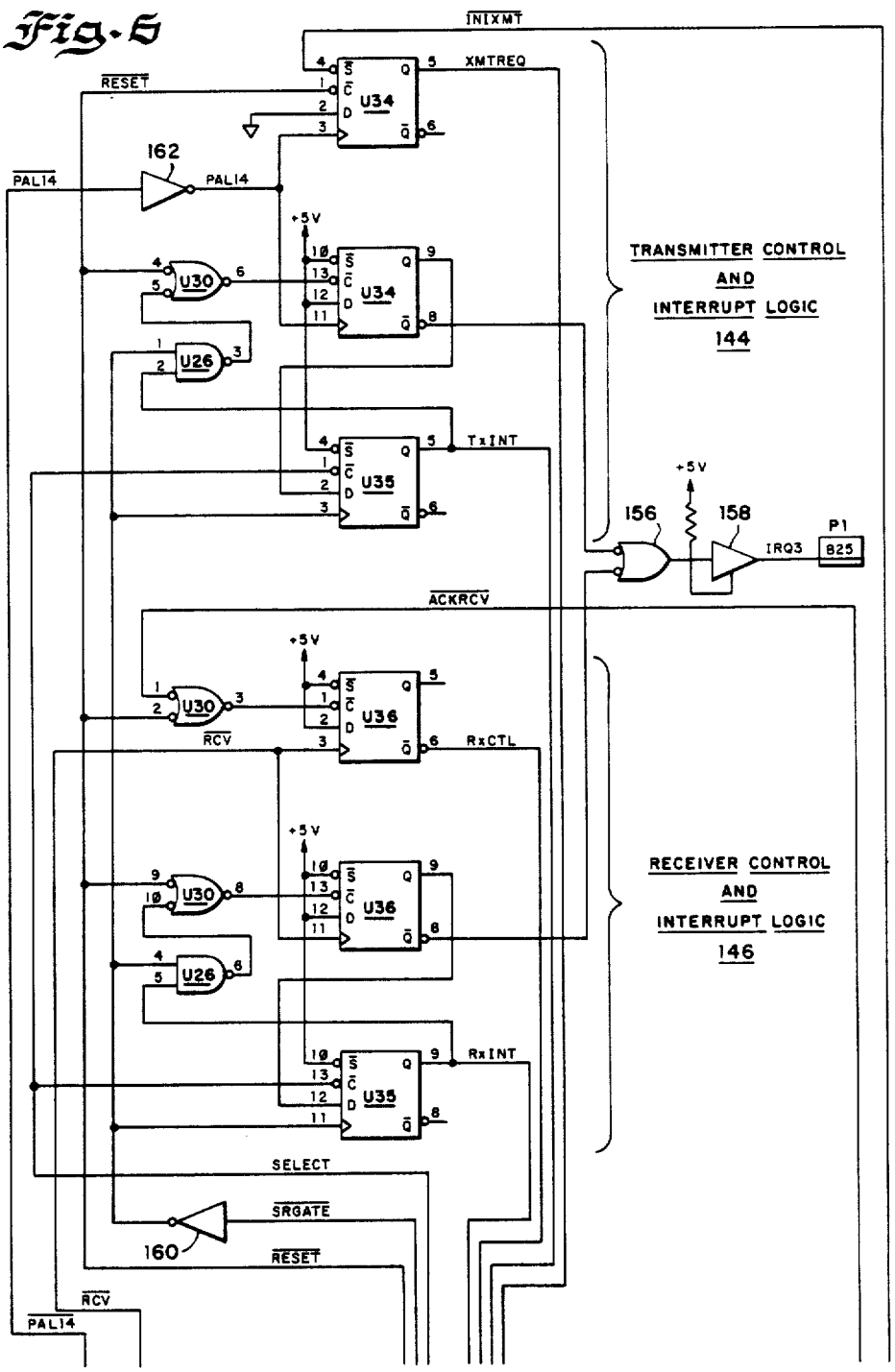

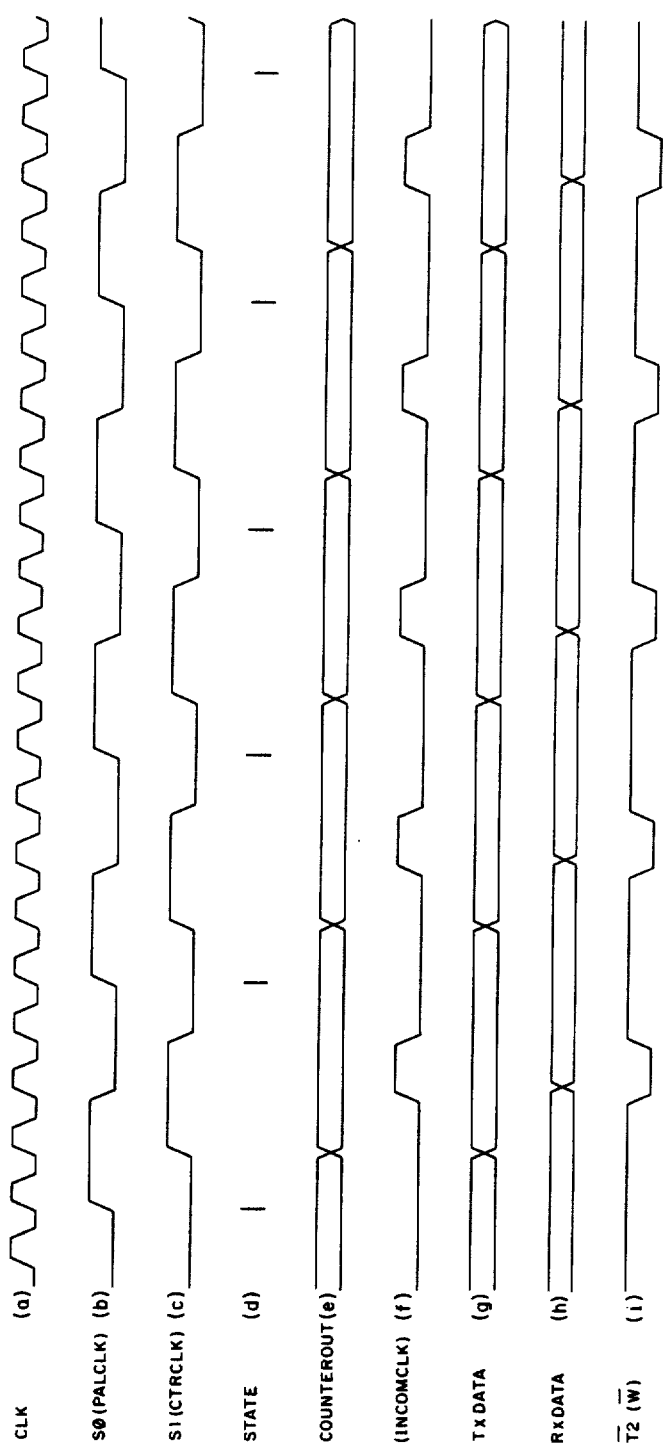

Fig. 12

304h: b2 [ber] [1] undefined 0
- ber: BCH ERROR STATUS RECEIVED MESSAGE
- 1: Rx/Tx RECEIVED MESSAGE 305h: b10 ............ b3 0 — RECEIVED MESSAGE 306h: b18 ............ b11 0 — RECEIVED MESSAGE 307h: b26 ............ b19 0 — RECEIVED MESSAGE

Fig. 14

308h: Bsy [0] IRr [IRt] baud Rx Tx 0
- Bsy: INCOM BUSY
- baud: BAUD RATE
- IRr: RECEIVER INTERRUPT REQUEST
- IRt: TRANSMITTER INTERRUPT REQUEST
- Rx: Rx CONTROL BIT
- Tx: TRANSMIT SEQUENCE

Fig. 11

300h: 7 b2 unused 0
- b2: CONTROL BIT

301h: b10 b7 b6 b5 b3 0
- COMMAND
- REPLY REQUEST
- INCOM INSTRUCTION

302h: b18 ............ b11 0 — ADDRESS lsb

303h: b26 b23 b22 b19 0
- msb ADDRESS
- APPLICATION COMMAND/DATA

Fig. 13

308h: baud unused Rx Tx 0
- baud: BAUD RATE
- Rx: ACKNOWLEDGE RECEIVE
- Tx: INITIATE TRANSMIT

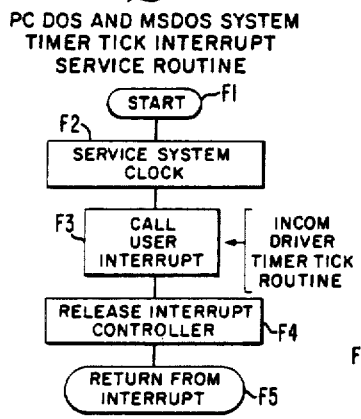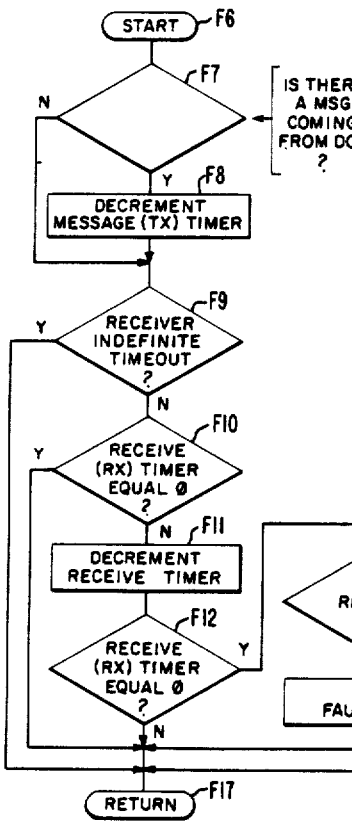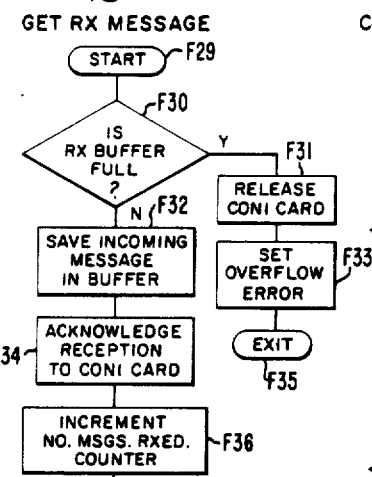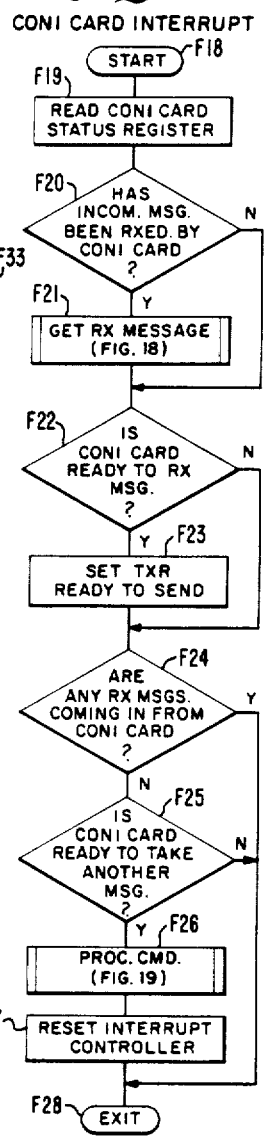

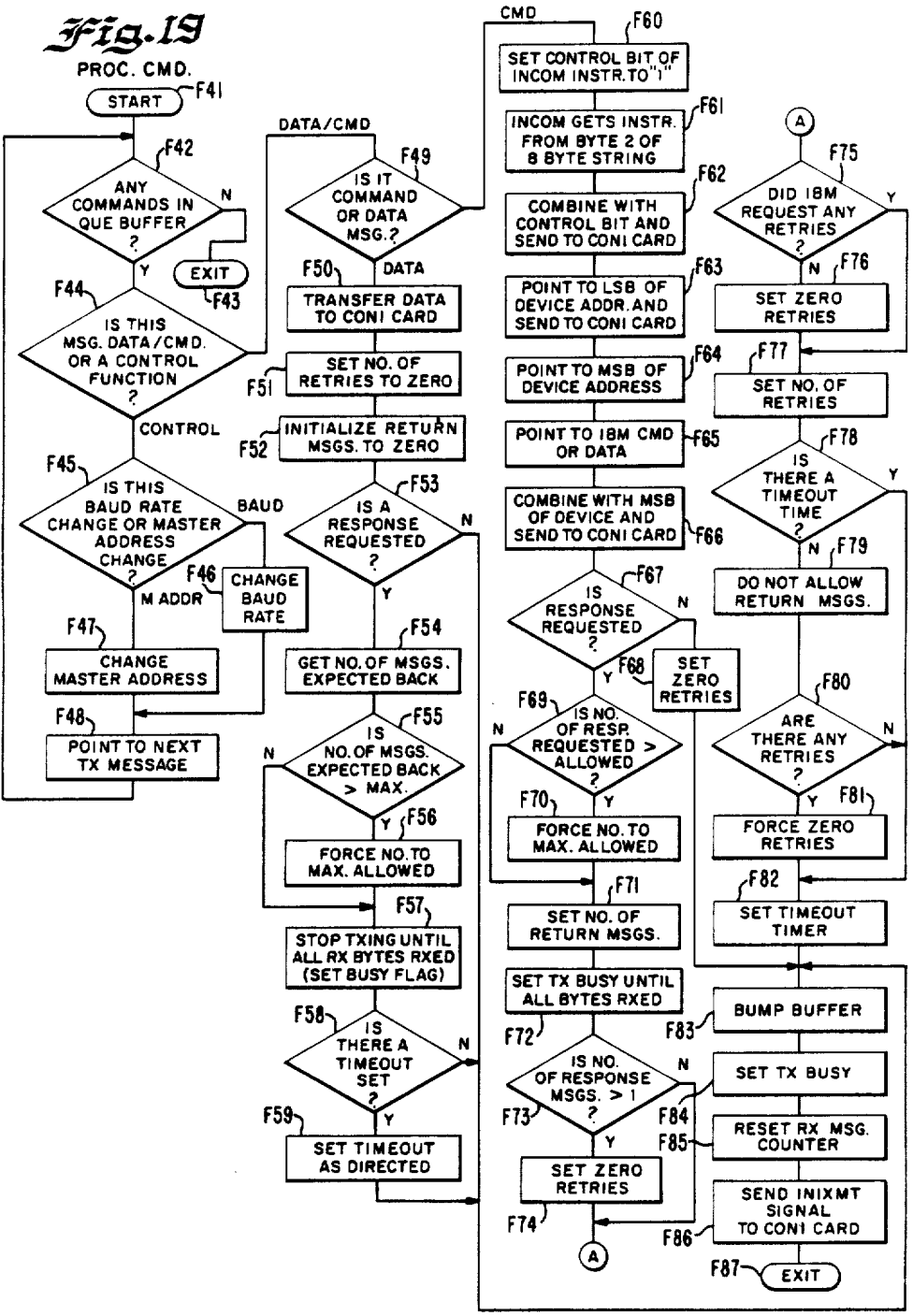

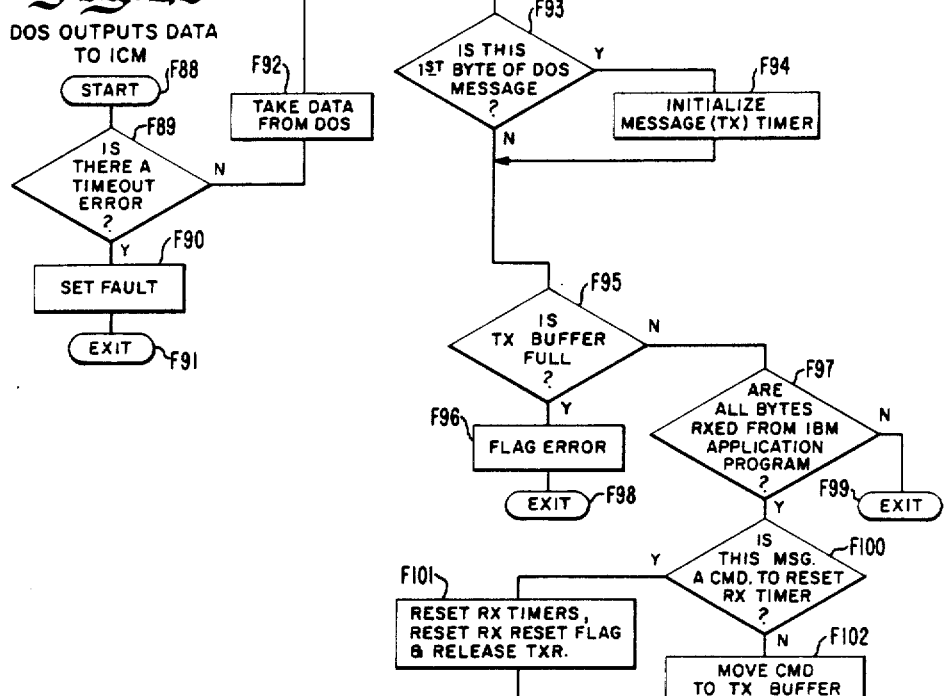
Fig. 20 DOS OUTPUTS DATA TO ICM
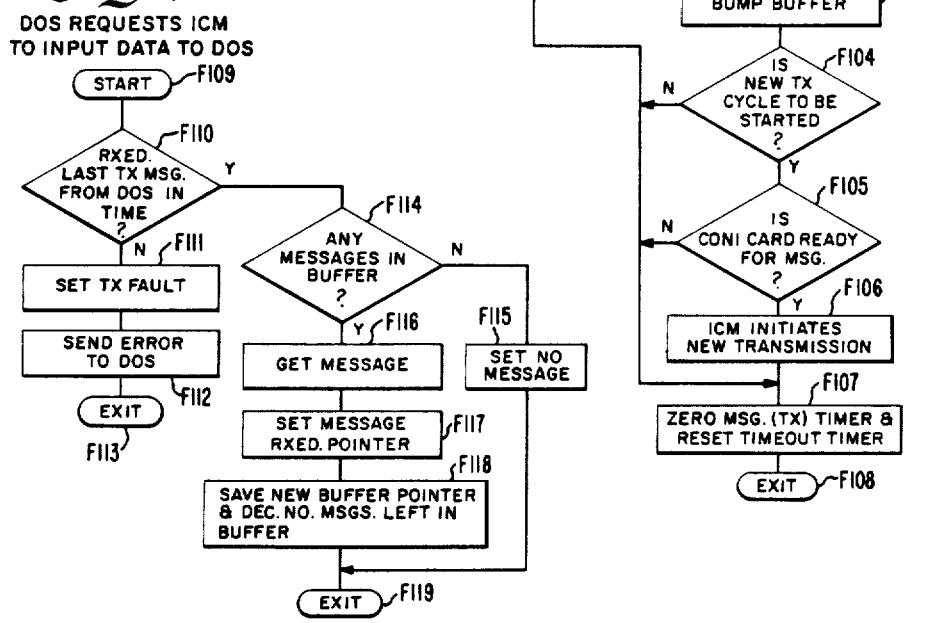
Fig. 21 DOS REQUESTS ICM TO INPUT DATA TO DOS

COMPUTER DRIVER MODULE FOR MASTER INTERFACE TO COMMUNICATION AND CONTROL NETWORK

CROSS REFERENCE TO RELATED APPLICATIONS

The invention disclosed herein relates to two-way communication and control systems. The following commonly assigned United States patent applications relate to such communication and control systems: Ser. No. 625,747 filed on June 28, 1984 by William R. Verbanets and entitled Multipurpose Digital IC for Communication and Control Network, Ser. No. 625,863 filed on June 28, 1984 by William R. Verbanets and Theodore H. York and entitled Improved Digital ICMicrocomputer Interface Ser. No. 625,862 filed on June 28, 1984 by Leonard C. Vercellotti and William R. Verbanets and entitled Low Error Rate Digital Demodulator now U.S. Pat. No. 4,653,072 Ser. No. 625,864 filed on June 28, 1984 by Leonard C. Vercellotti, William R. Verbanets and Theodore H. York entitled Digital Message Format for Two-Way Communication and Control Network now U.S. Pat. No. 4,644,547; and Ser. No. 769,640 filed on Aug. 26, 1985 by John C. Schlotterer, entitled "Communication And Control Network Master Interface For Personal Computer".

BACKGROUND OF THE INVENTION

A. Field of the Invention

The present invention relates generally to two-way communication and control systems, and, more particularly, to communication and control systems of the type disclosed in the above identified related applications wherein a communication and control network provides communication between a variety of controlled devices such as circuit breakers, motor starters, protective relays, remote load controllers, lighting systems, and the like, to communicate with and be controlled by a central or master controller over a common network line.

B. Description of the Prior Art

In the communication and control system disclosed in the above identified related applications control and monitoring is carried out over a network consisting of either the existing power lines or dedicated twisted pair wires. The hardware based digital integrated circuit described in detail in the above-identified related applications forms the basic building block for such a communication and control network. This digital IC is a 28 pin semi-custom integrated circuit implemented by complementary metal oxide semiconductor CMOS technique which provides a simple, low cost interface to the communication and control network. This digital IC, which may also be referred to as an industrial communication (INCOM) integrated circuit, or chip, provides the network interface functions of address recognition, detection and storage of an ON-OFF keyed carrier multi-bit message received from the network, carrier generation and transmission of an ON-OFF keyed carrier message to the network in accordance with information stored therein, generation and checking of a five bit BCH error checking code, and framing of the received and transmitted messages.

The digital IC, or INCOM chip, may be configured for one of three operating modes: stand-alone slave, expanded-mode slave, and expanded-mode master. Arbitration of the network is accomplished in a master-slave fashion. The stand-alone slave mode is used by simple devices and provides control of a single output line and the return of two status bits from the slave device. The expanded-mode slave is used to interface microprocessor based equipment to the network and will support far more complex communications between the master and expanded-mode slave. In the expanded-mode master configuration the INCOM device may be used as a direct interface to the master or central computer of the network. However, this master computer must comprise a dedicated computer in order to ensure that messages will not be lost in transmission between an expanded-slave and the master computer. For example, the master computer may send a request to an expanded-mode slave asking for a block of data which will require several 33 bit messages to be sent back to the master. The expanded-mode slave will respond by sending these messages one right after the other. Each 33 bit message will be stored in the shift register of the INCOM chip. However, the entire message must be shifted out of the INCOM shift register during one bit time since otherwise the first bit of the next message may be lost and the next message garbled. Accordingly, when the INCOM chip is used as a direct interface to the network master computer, this computer must necessarily be a dedicated computer in order to guarantee the ability to respond to an interrupt signal from the INCOM chip by shifting out the contents of its shift register within one bit time.

Other bidirectional communication and control systems have also required the use of a dedicated computer as the master computer or controller of the network. For example, in Miller et U.S. Pat. No. 4,367,414 a dedicated computer is interfaced directly to the network by means of a simple interface arrangement which does not involve buffer storage of any kind in the interface.

In Schlotterer application Ser. No. 769,640 filed on Aug. 26, 1985 there is disclosed a hardware interface by means of which a general purpose computer, which may be a personal computer, such as an IBM PC or XT, may be interfaced to such a communication and control network and act as the central or master controller therefore. This hardware interface includes a receive buffer register into which the contents of the INCOM shift register may be rapidly loaded so that the first bit of a succeeding message on the network will not be lost. An interrupt signal is then sent to the processor means of the general purpose computer indicating that a received message has been stored in the interface and can now be read out. The general purpose computer can respond to this interrupt signal and read the message stored in the interface receive buffer at any time during the next 33 bit message while this next message is being stored in the INCOM shift register. After the general purpose computer has read the first message from the interface receive buffer it releases this buffer for storage of the next message from the network by sending a control signal to the hardware interface.

The master hardware interface of the Schlotterer application also includes a transmit buffer register into which the general purpose computer can write a message intended for the network. The interface responds to an initial transmit signal from the general purpose computer by serializing the message written into the transmit buffer register and loading it into the shift register of the INCOM chip when it is available. During this period the hardware-interface produces a status signal which can be read by the general purpose computer so that it will not load a second message into the transmit buffer while the first message is being read out and loaded into the INCOM shift register. Also, as soon as the first message has been loaded into the INCOM chip, the interface supplies an interrupt signal to the general purpose computer so that it can write a second message into the transmit buffer register while the first message is being transmitted over the network by the INCOM device at the relatively low baud rate of the network.

SUMMARY OF THE INVENTION

While the hardware interface disclosed and claimed in the above-identified Schlotterer application is suitable for its intended purpose, it is extremely important that the messages sent to this interface from the general purpose computer be accurate and precise. This will be readily apparent when it is realized that the units which are controlled by this general purpose computer acting as a master for the INCOM network may consist of slave devices which simply execute the commands sent to them over the common INCOM network line. Accordingly, if a faulty message is sent out by the master controller, it could cause catastrophic results on the network.

In accordance with the present invention, a driver module is provided in the general purpose computer which cooperates with and drives the hardware interface of the Schlotterer application and also performs a number of error checking functions in connection with each message sent out by the master so that faulty messages are not placed on the INCOM network. Specifically, this driver module, which may be referred to as the INCOM Communication Module (ICM), is arranged to receive command, data or control information in an eight byte string which is passed from the application software via the general purpose computer operating system to the ICM. If all eight bytes are not transmitted to the ICM within a predetermined time interval, it informs the computer of an error and does not transmit the message out to the hardware interface. This prevents a faulty message from being sent out when, for example, only a seven byte string is generated by the application software.

The ICM will buffer up to thirty-two (32) output commands, data or control messages to the INCOM network of eight bytes each and up to thirty-two (32) input or response messages from the network of four bytes each. If an attempt is made to send more than thirty-two output messages, the ICM sends a busy signal to the application software to inform it of the error.

The first byte of the eight byte output message string is a control byte by means of which the application software can designate predetermined succeeding bytes of the string as either a command or data message for the INCOM network or a control message to the hardware interface to change the master address or the baud rate of the INCOM chip associated therewith. The ICM responds to this control byte by reformatting succeeding bytes of the string in the INCOM network format and transmitting the reformatted output message to the hardware interface.

Additional bytes of the eight byte string are employed to establish that one or more responses (up to a maximum of thirty-two) is requested from the addressed slave device on the INCOM network and also establish a timeout interval of variable duration during which a response should be received. The ICM responds to these additional bytes by setting up a timeout interval of the requested duration during which it waits for the response and prevents the transmission of an additional output message even though requested by the application software. If no response is received within the timeout interval, the ICM again tries to establish communication with the slave device by retransmitting the same output message to the hardware interface, if such a retry, or a number of retries, is designated by the application software. If no response is received after one or more retries an error flag is set by the ICM. However, if more than one response is requested by the application software, the ICM forces zero retries even though a retry is requested by the application software. In so doing, the ICM avoids the situation where, for example, three response messages are requested but only one is received during the timeout interval. If the message is retried, duplicate response messages would be stored in the ICM's Rx buffer which could be falsely interpreted by the application software.

When response messages are received from the INCOM network, the ICM adds a fourth status byte to the incoming message to inform the application software of certain conditions. One bit of the status byte is used to inform the application software that the preceding bytes of the received message are not valid. Such a condition can arise when the application software reads from the ICM Rx buffer when no message has been received from the INCOM network but a residue may have been left in this buffer from a previous communication. Another bit of this status byte is used t inform the application software that the requested number of response messages have been received. This bit is set by the ICM when the number of responses requested in the original eight byte string has been received from the expanded mode slave on the INOOM network.

Another bit of this status byte is set by the ICM when more than thirty-two response messages have been received before any message is read out of the ICM Rx buffer which can store only thirty-two such messages. This informs the application software that one or more response messages may have been lost. A further bit of the status byte is set when a timeout error has occurred on a received message to inform the application software that this response message is incomplete. Additional bits of this status byte are used to inform the application software that a message was received with a BCH error and to designate the received message as either data or a command message from the INCOM network.

BRIEF DESCRIPTION OF THE DRAWINGS

The invention, both as to its organization and method of operation, together with further objects and advantages thereof, will best be understood by reference to the following specification taken in connection with the accompanying drawings in which:

FIGS. 2-6, when placed in the manner shown in FIG. 7 constitute a detailed schematic drawing of the hardware interface of FIG. 1;

FIG. 8 is a series of timing diagrams illustrating the basic timing of the hardware interface of FIG. 1;

FIG. 11 shows the control message format of the transmit buffer of the hardware interface of FIG. 1;

FIG. 12 shows the network message format for the receive buffer of the hardware interface of FIG. 1;

FIG. 13 shows the control register format of the hardware interface of FIG. 1;

FIG. 14 shows the status register format of the hardware interface of FIG. 1;

FIG. 15 is an overall flow chart illustrating how the driver module of the present invention functions with the operating system of the general purpose computer;

FIG. 16 is a flow chart of the time keeping functions of the driver module of the present invention;

FIG. 17 is a more detailed flow chart of the driver module of the present invention;

FIG. 18 is a detailed flow chart of the operation of the driver module in receiving a message from the hardware interface of FIG. 1;

FIG. 19 is a detailed flow chart of the operation of the driver module in processing an eight byte string developed by the application software of the general purpose computer;

FIG. 20 is a flow chart of the operation of the driver module in taking an output message from the application software and loading it into the TX buffer of the ICM; and FIG. 21 is a flow chart of the operation of the driver module in supplying a message received from the hardware interface to the application software.

DETAILED DESCRIPTION OF THE PREFERRED EMBODIMENT

Figure 1:
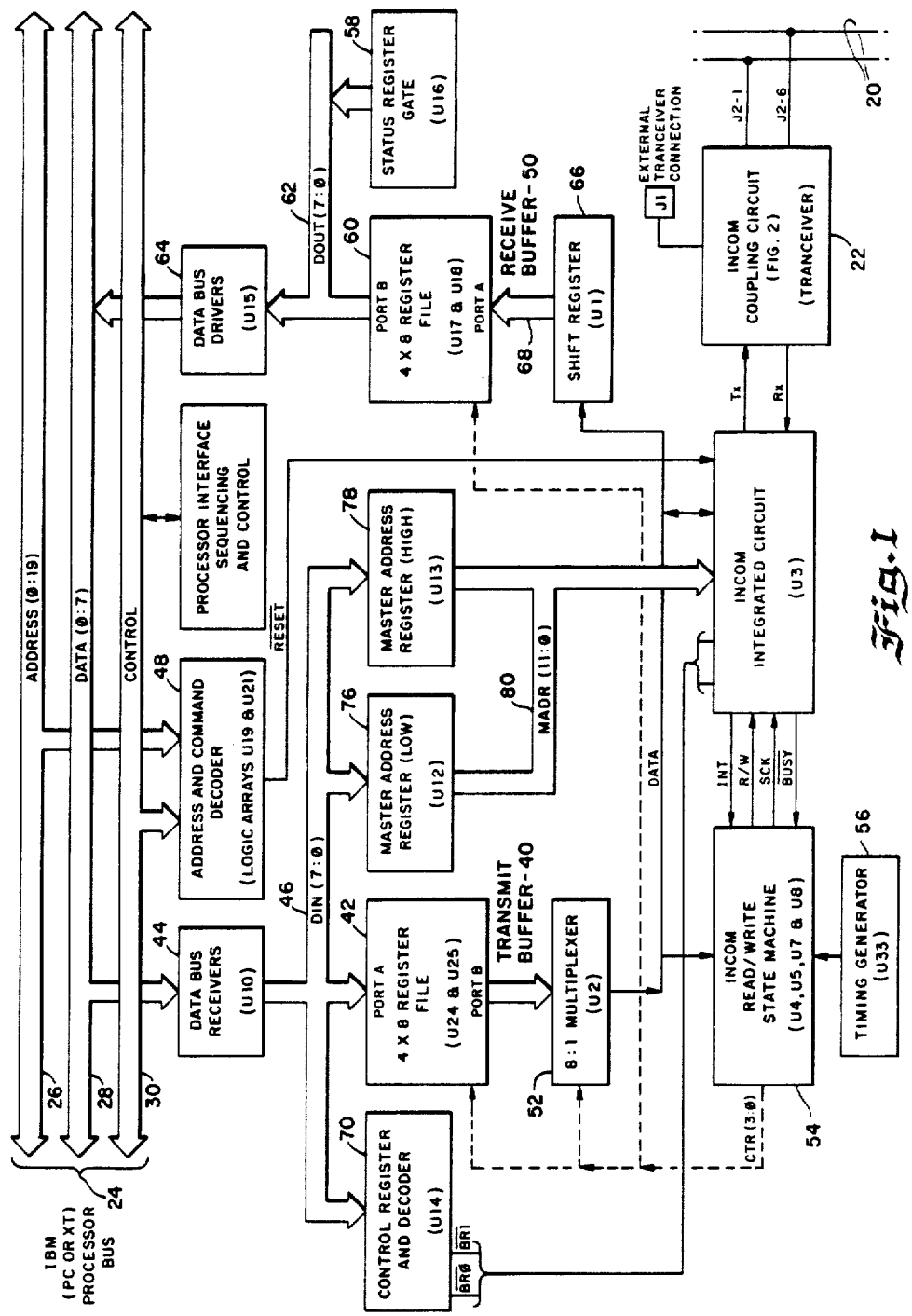
FIG. 1 is an overall block diagram of the hardware interface with which the driver module of the present invention cooperates.

Referring now to the drawings, and more particularly to the block diagram of FIG. 1, the digital IC which is described in detail in the above identified cross referenced applications, is shown in FIG. 1 as the INCOM integrated circuit U3. The INCOM chip U3 is interfaced with the common network line 20 of the communication and control network, through an INCOM coupling circuit 22. The common network line 20 may be power line for the factory, office building or home, or may be a dedicated twisted pair. The coupling circuit 22 is connected to the network line 20 through a connector J2 and provides bidirectional coupling between the INCOM chip U3 and the network line 20 as well as amplifying and limiting a received message placed on the line 20 by another unit of the communication and control network which is also coupled to the line 20. In the alternative, the INCOM chip U3 may be connected to another network medium, such a as fiber optics cable system in which case the fiber optics transmitter/receiver combination may be connected to the connector J1 and an enable signal supplied to this connector is effective to disconnect the INCOM chip U3 from the line 20 and interface it with the fiber optics cable system, as will be described in more detail hereinafter.

As described generally heretofore, the INCOM chip U3 is a 28 pin CMOS semi-custom integrated circuit which provides a simple low cost interface to the communication and control network. The INCOM chip performs the network interface functions of address recognition, detection and storage of an on-off keyed carrier multi-bit message received from the network, carrier generation and transmission of an on-off keyed carrier message to the network in accordance with information stored therein, generation and checking of a cyclic error code, such as a five bit Bose-Chaudhuri-Hocquenguem (BCH) error code, and framing of the received and transmitted messages to the specific format required by the network.

In the hardware interface system disclosed the INCOM chip U3 is operated in the expanded-mode master configuration and is interfaced with a general purpose computer employing the hardware components shown in FIG. 1. Specifically, these hardware components are arranged to interface the INCOM chip U3 to an IBM personal computer (PC or XT) and all of these hardware interface components, including the INCOM chip U3 and the coupling circuit 22 are arranged on a printed circuit board or card, which may be plugged into one of the I/O slots on the IBM processor bus. This printed circuit board or card thus comprises a cocomputer-network interface which will be referred to as a CONI card in the present specification. More particularly, this CONI card is plugged into the IBM processor bus 24 by means of the dual read-out 31/62 pin connector P1 which is the standard connector for the IBM processor bus 24 which includes the address bus 26, the data bus 28 and the control bus 30. The hardware interface CONI card of FIG. 1 is a slave on the computer bus 24 and will only respond to I/O read and write operations. The CONI card is not capable of bus mastership. The size of the I/O address space required for the CONI card of FIG. 1 is 11 bytes, the CONI card responding to I/O addresses in the range 300h–30Ah. The CONI card generates bus interrupt request No. 3 in the IBM nomenclature, this interrupt corresponding to IBM POIS interrupt number "OBh", address "2C-2Fh".

Signal Interfaces

Considering first the electrical interface between the CONI card of FIG. 1, the IBM computer bus 24 and the network line 20, the following definitions will be used:

| Input | a signal received by the CONI card |
|---|---|
| Output | a signal driven by the CONI card |
| Bidirectional | a signal that is both driven and received by the CONI card |
| High-true | true (1) = 2.0 V. to 5.5 V. |
| | false (0) = −1.5 V. to 0.8 V. |
| Low-true | true (1) = −1.5 V. to 0.8 V. |
| | false (0) = 2.0 V. to 5.5 V. |
| | The signal memonic ends with a /(/) |
| LS unit load | 0.2 mA at 0.4 V. |
| | 20 uA at 2.7 V. |

Considering first the computer bus signal interface (connector P1), these signals are defined by IBM publication 1502234, Chapter 1 and are shown in the following Table 1.

TABLE I

| P1 Connector Signal Assignment | | | |
|---|---|---|---|
| PIN | (PIN SIDE) MNEMONIC | PIN | (COMPONENT SIDE) MNEMONIC |
| B1 | GROUND | A1 | −I/O__CHANNEL__CHECK |
| B2 | RESET__DRV | A2 | D7 |
| B3 | +5VDC | A3 | D6 |

TABLE I-continued

P1 Connector Signal Assignment

| PIN | (PIN SIDE) MNEMONIC | PIN | (COMPONENT SIDE) MNEMONIC |
|---|---|---|---|
| B4 | IRQ2 | A4 | D5 |
| B5 | −5VDC | A5 | D4 |
| B6 | DRQ2 | A6 | D3 |
| B7 | −12VDC | A7 | D2 |
| B8 | RESERVED | A8 | D1 |
| B9 | +12VDC | A9 | D0 |
| B10 | GROUND | A10 | I/O_CH_RDY |
| B11 | MEMW/ | AS11 | AEN |
| B12 | MEMR/ | A12 | A19 |
| B13 | IOW/ | A13 | A18 |
| B14 | IOR/ | A14 | A17 |
| B15 | DACK3 | A15 | A16 |
| B16 | DRQ3 | A16 | A15 |
| B17 | DACK1 | A17 | A14 |
| B18 | DRQ1 | A18 | A13 |
| B19 | DACKO/ | A19 | A12 |
| B20 | CLK | A20 | A1 |
| B21 | IRQ7 | A21 | A10 |
| B22 | IRQ6 | A22 | A9 |
| B23 | IRQ5 | A23 | A8 |
| B24 | IRQ4 | A24 | A7 |
| B25 | IRQ3 | A25 | A6 |
| B26 | IRQ2 | A26 | A5 |
| B27 | T/C | A27 | A4 |
| B28 | ALE | A28 | A3 |
| B29 | +5V DC | A29 | A2 |
| B30 | OSC | A30 | A1 |
| B31 | GROUND | A31 | A0 |

However, because the CONI card is a slave device on the processor bus 24, not all of the bus signals are utilized by the CONI card. A summary of those interface signals which are utilized by the CONI card is as follows:

| | |
|---|---|
| A0–A19 | Address Outputs From CPU. These twenty lines transmit the address of the memory location or I/O port to be accessed. A0 is the less significant bit and A19 is the most significant address bit. These lines are generated by either the process or DMA controller. They are active high. Only address lines A0–A9 are used by the CONI card. |
| AEN | Address Enable Output From CPU. This line is used to degate the processor and other devices from the I/O channel to allow DMA transfers to take place. When this line is active (high) the DMA controller has control of the address bus, data bus, read command lines (memory and I/O), and the right command lines (memory and I/O). |
| CLK | System Clock Output From The CPU. This signal is the processor oscillator divided by 3. As a period of 210 end seconds ns (4.77 MHz). The clock has a 33% duty cycle. |
| D0–D7 | Data. These 8 bidirectional, active high, data lines transmit and receive data to and from the addressed memory location or input output port. D7 is the most significant bit. |
| IRQ2–IRQ7 | Interrupt Request Inputs to the CPU. These lines are used to signal the processor that an I/O device requires attention. They are prioritized with IRQ2 the highest priority and IRQ7 the lowest. An Interrupt Request is generated by raising an IRQ line (low to high) and holding it high until it is acknowledged by the processor (interrupt service routine). The CONI card uses interrupt request line IRQ3. |
| IOR/I/O | Read Command Output From CPU. This command line instructs an IO device to drive its data onto the data bus. It may be driven by the processor or the DMA controller. This signal is active low. |
| IOW/ | I/O Write command output from CPU. This command line instructs an I/O device to read the data on the data bus. It may be driven by the processor or the DMA controller. This signal is active low. |
| MEMR/ | Memory read command output from CPU. This command line instructs the memory to drive its data onto the data bus. It may driven by the procesor or the DMA controller. This signal is active low. |
| MEMW/ | Memory Write Command Output from CPU. This command line instructs the memory to store the data present on the data bus. It may be driven by the processor or the DMA controller. This signal is active low. |
| RESET_DRV/ | Reset output from the CPU. This line is used to reset initialize system logic upon power up or during a low line voltage outage. This signal is synchronized to the falling edge of clock and is active high. |
| +5 V.dc | Power. +5 V.dc ± 5% |
| +12 V.dc | Power. +12 V.dc ± 5% |
| −12 V.dc | Power. −12 V.dc ±10% |
| GND | Ground. Power supply and logic common. |

The INCOM network interface (J2 connector) is a 6 pin modular RJ 126 jack that connects the CONI card to the INCOM network line 20. More particularly, pins 1 and 6 of the J2 connector connect directly to the INCOM network line 20 or through an insolation transformer if this line is a power line. The coupling circuit 22 is a bidirectional transformer coupled circuit which is tuned to the INCOM network carrier frequency of 115.2 kHz. The transformer which isolates the INCOM network from the IBM computer internal circuitry has a high-potential rating of 2500 VAC and a 1 microsecond impulse rating of 6 KV peak. The network wiring 20 is also isolated by series capacitor rated at 0.01 mfd, 2%, 400 V.

In the transmit mode, the open circuit voltage across the INCMM network interface terminals J2-1, J2-6 is less than 30 volts RMS, dropping to approximately 2.5 volts RMS with a 10 ohm resistive load. The short circuit current is approximately 100 milliamps RMS. The transmitter portion of the INCOM chip U3 and coupling circuit 22 can operate continuously without damage with either an opened or shorted load at the network interface terminals. The polarity of the leads connected to the network interface terminals is not important.

In the receive mode the input impedance of the CONI card-network interface as seen by the network looking into the J2 terminals 196 is 10 ohms at the carrier frequency of 115.2 kHz. The receiver sensitivity of the coupling circuit 22 and INCOM chip U3 is 10 millivolts at 115.2 kHz with a band pass response centered at this frequency. The digital carrier detection circuitry within the INCOM chip U3 has a + or −1.5 kHz window.

Considering now the external transceiver connection (J1 connector) to the CONI card of FIG. 1, the J1 connector is a 9 pin female delta subminiature connector that connects the CONI card to an external INCOM network transceiver. This connector is used in applications where higher bit rates are employed or when a non-standard network transceiver is used, as for example a fiber-optic interface. This external interface is active only when a connector present signal is detected on the J1 connector, the pin connections of the J1 connector being shown in Table II below.

J1-1: EXT-RxDATA
J1-2: EXT-TxDATA
J1-3: +5 V
J1-4: +12 V
J1-5: −12 V
J1-6: GND
J1-7: GND
J1-8: GND
J1-9: EXT-ENABLE/

Table II - J1 Connector Signal Assignments

The transmitter output signal on pin J1-1, referred to as EXT-TxDATA, is a standard LS-TTL output that is the high-true transmit data output from the INCOM chip U3 whenever the external transceiver interface is enabled. When this interface is disabled pin J1-2 is low. The receiver input signal J1-1, referred to as EXT-Rx DATA, is a standard LS-TTL input with a 10K ohm pull up to +5 volts. It is used only when the external transceiver is enabled. The external transceiver enable signal on pin J1-9, referred to as EXT-ENABLE/, represents 3 standard LS-TTL input loads with a 10K ohm pull up to 5 volts. When low, the external transceiver is enabled and the internal transceiver circuits in the coupling circuit 22 are disabled.

Operating Discipline Of CONI Card

The operating discipline of the hardware interface CONI card is described by both the electrical and software interfaces of the CONI card. All data and control information from the IBM general purpose computer (PC or XT) is passed through I/O registers located on the CONI card. The CONI card does not respond to processor memory commands. These I/O registers located on the CONI card are located in I/O address space based at 300h. The CONI card will respond to all I/O read and write requests in the range 300h-30Ah.

The I/O registers on the CONI card include a transmit buffer register 40 and a receive buffer register 50. Each of the buffers 40, 50 comprise a dual port register file accessed by both the processor bus 24 and the CONI card hardware. The transmit buffer 40 is written only by the processor interface and is read only by the INCOM network interface. The receive buffer 50 is written only by the INCOM network interface and is read only by the processor interface. More specifically, the transmit buffer 40 consists of 4 byte-wide write only registers 42 which are accessed at I/O addresses 300h through 303h and redundantly at 304h through 307h. The IBM processor writes to these registers by placing data on the data bus 28 which is applied through data bus receivers 44 to an internal data input bus 46 connected to port A of the register file 42. The processor also places a suitable input output address on the address lines 26 and an IOW signal on the control bus 30 which are decoded by the address and command decoder 48. The transmit buffer 40 is read from port B of the register file 42 by means of a multiplexer 52, the register file 42 and multiplexer 52 being controlled during the read out operation by an INCOM read/write state machine 54. The state machine 54 is controlled by a timing generator 56 and provides suitably timed counter pulses CTR[3;0] to the register file 42 and multiplexer 52. The IBM processor should write into the registers 42 only when a message is not in the process of being read out of this register as indicated by the contents of a status register 58. The four register file 42 may be loaded in any order and the contents of the transmit buffer 40 are not altered during the transmit operation. If sections of a message are unchanged from the previous transmission these sections do not have to be re-loaded into the transmit buffer 40. A read operation from the I/O locations by the IBM processor will access the corresponding locations in the receive buffer 50 due to the above-described redundant connection.

Messages are written into the transmit buffer 40 in the format of the INCOM communication network, as described in detail in the above identified cross referenced related applications. The format of the transmit buffer 40 is shown in FIG. 11 for a message with the control bit (b2) set. As described in more detail in said related applications, a message with the control bit b2 set ("1") designates a control or command message which the master may send over the common network line 20 to a stand alone slave or an enable-mode slave which includes the address of the slave, an INCOM instruction and other command data. More specifically, referring to FIG. 11, the control bit b2 is written into the most significant bit 7 of the register which is addressed at input output address 300h, the remaining bits of this register being unused. In the next register which is addressed at I/O address 301h, the INCOM instruction bits b3–b5 and the reply request bit b6 are written into the four lower stages of this register. If an expanded mode slave is addressed the four upper stages of this register may contain bits b7–b10 which provide a command to the microprocessor based equipment to which the expanded mode slave is interfaced, as described in detail in said related applications. The next register which is addressed at I/O address 302h contains bits b11–b18 of the control message which are the 8 lower order bits of the address assigned to the slave on the network line 20. In the register addressed at I/O address 303h the four lowest order stages contain bits b19 to b22 of the INCOM message which comprise the 4 highest order bits of the slave address. If an expanded mode slave is addressed, bits b23–b26 of the INCOM message, which is stored in the four upper stages of this register, may contain further commands or data for the microprocessor based equipment to which the expanded mode slave is interfaced.

As described in detail in said related applications, after an interface has been established between an expanded mode slave and the associated microprocessor based equipment, the format of the message transmitted to the slave is changed so as to permit relatively complex communications back and forth between the master and the slaves on the network. Thus, once an interface is established in response to the first command message shown in FIG. 11, subsequent messages may be written into the transmit buffer 40 in which the control bit b2 equals a logic "0". In this data communication message the registers addressed at I/O addresses 301h–303h will each contain data which is supplied from the master IBM processor, through the CONI card, and over the network line 20 to the addressed expanded mode slave.

The message which has been stored in the transmit buffer 40, as shown in FIG. 11, is read from port B of the register file 42 by the multiplexer 52, beginning with the register which is addressed at I/O address 300h. The multiplexer 52 serializes the 8 bits of data available from each register and supplies individual data bits to the bidirectional DATA line which is connected to the internal shift register in the INCOM chip U3. Concurrently, therewith the state machine 54 supplies serial clock pulses over the SCK line to the clock input of the internal shift register in the INCOM chip U3 so that the message shown in FIG. 11 is loaded into this shift register beginning with bit b2 and ending with bit b26, as is described in more detail hereinafter.

Considering now the receive buffer 50, this buffer comprises the register file 60 which consists of 4 byte wide read only registers which are accessed at I/O addresses 304h through 307h and redundantly at 300h through 303h. More particularly, port B of the register file 60 is connected to an internal data out bus 62 DOUT(7:0) to which the output of the status register 58 is also supplied. The IBM processor may read any one of the four registers in the register file 60 by placing the corresponding I/O address on the address bus 26 and an input output write signal IOW on the control bus 30, the address and command decoder 48 decoding these signals and providing a bus gate pulse to the data bus drivers 64 which connect the internal data output bus 62 to the data bus 28 of the IBM processor.

Each message received by the CONI card from the INCOM network is first loaded into the internal shift register of the INCOM chip U3 in the manner described in detail in the above identified related applications. After the network message has been loaded into the INCOM chip U3 it provides an interrupt signal on the INT line to the read write state machine 54 which responds by holding the read write line R/W high and supplying timed serial clock pulses over the SCK line so as to shift the stored message serially onto the bidirectional DATA line and through the four bit shift register 66 to port A of the register file 60. The read/write state machine 54 also controls the loading of data into the register file 60 to enable the use of the four bit shift registers 66, as will be described in more detail hereinafter. As each four bits of the message stored in the INCOM chip U3 are shifted into the register 66 they are supplied over the receive data bus 68 to port A of the register file 60, the read/write machine state machine 54 supplying suitable counter signals to the register file 62 to enable the storage of the received message in the four bit wide registers of the register file 60. Additionally, if the IBM processor attempts to write into the input output locations assigned to the receive buffer 50 this will result in writing into the corresponding locations in the transmit buffer 40 due to the above described redundant input output connections.

The format of the network message which has been loaded into the receive buffer 50 is shown in FIG. 12. Referring to this figure, since the INCOM chip U3 on the CONI card of FIG. 1 is operated in the expanded master mode in which its interface facilities are always enabled, the message shifted out of the internal shift register of the INCOM chip U3 includes 2 additional data bits, the RxTx bit and a BCH error status bit, as described in detail in said related applications. Specifically, the RxTx bit is always set when a message has been received from the network which is to be read out over the enabled interface of the chip U3. Thus, in the register which is read from the I/O address 304h the fifth stage of this register is set to a "1". If the message has been received from the network without an error, as determined by the BCH error checking circuitry in the INCOM chip U3, the BHH error status bit "ber" which is stored in the sixth stage of this register will be a zero. On the other hand, if an error is detected in transmission on the network, the BCH error status bit ber=1. When such a message is read from the receive buffer 50 by the IBM processor the BCH error status bit ber=1 is detected and the received message is not considered valid. The control bit B2 of the receive message is stored in the highest stage of the register addressed at I/O address 304h and the remaining bits of the receive message are stored in the registers addressed at I/O addresses 305h-307h, as shown in FIG. 12.

The hardware interface CONI card of FIG. 1 also includes a control register 70 which is used by the IBM processor to control this hardware interface. More specifically, the control register is connected to the internal data input bus 46 on the CONI card so that data placed on the data bus 28 by the IBM processor may be written into the register 70 through the data bus receivers 44. The control register 70 is assigned I/O address 308h and it may be written to by the IBM processor by placing the desired data on the data bus 28, and I/O address 308h on the address bus 26 and an I/O write signal IOW on the control bus 30. The address and command decoder 48 decodes these address and control signals and provides a gating signal to the control register 70, as will be described in more detail hereinafter.

The format of the control register 70 is shown in FIG. 13. Referring to this figure, bit 0 of the control register is assigned to an initiate transmit signal. After the IBM processor has written a message into the transmit buffer 40 it can produce an initiate transmit signal by writing a "1" in bit zero of the control register 70 (CR:0=1). The CONI card responds to this initiate transmit signal by loading the message stored in the transmit buffer 40 into the internal shift register in the INCOM chip U3 and controlling the INCOM chip U3 over the R/W line to initiate transmission of the message stored in its internal shift register onto the network line 20. During the period when the message stored in the transmit buffer 40 is being transferred to the internal shift register of the INCOM chip U3, bit 1 of the status register 58 is set (SR:1=1) and during this period the CONI card ignores an initiate transmit signal from the IBM processor. Writing a "0" in bit zero of the control register 70 has no effect.

Bit 1 of the control register 70 is an acknowledge receive signal. More particularly, after the IBM processor has read the network message which is stored in the receive buffer 50 the IBM processor can produce an acknowledge receive signal by writing the control register with bit 1 set (CR:1=1). This informs the CONI card that the received message has been read by the IBM processor and that the receive buffer 50 is available for storing the next network message from the INCOM chip U3. Writing a zero to bit 1 of the control register 70 will have no effect.

In order to permit the IBM master to control the baud rate at which messages are transmitted and received by the INCOM chip U3, bits 6 and 7 of the control register 70 re designated as baud rate control bits. A logic 0 in its 6 and 7 will leave the current baud rate unchanged. However, the IBM master can change the baud rate to any one of the three values at which the INCOM chip U3 is designed to operate by writing the appropriate values in bits 6 and 7 of the control register 70. Thus, for CR:7,6=01 the corresponding stages of the control register 70 supply control signals BR0 and BR1 to the INCOM chip U3 which cause it to operate at a baud rate of 38.4 kHz. For a setting of CR:7,6=10 the chip U3 will operate at a baud rate of 1200 Hz and for a setting of CR:7,6=11 the chip U3 will operate at the baud rate of 300 Hz.

It will be noted from the above description of the bits of the control register 70 that these bits are defined so that independent operation of the various functions on the CONI card can share this common control register. This is made possible because zero fields have been defined as having no affect on their associated control function. For example, producing an initiate transmit signal (CR=01h) will not affect operation f the receiver or change the baud rate. This is because writing a zero in the other bits of the control register has no effect.

The status register 50 issued by the CONI card to inform the IBM processor of the state of the CONI card. Status register is read from the same I/O address 308h at which the control register 70 is written to by the IBM processor. The format of the status register 58 is shown in FIG. 14. Referring to this figure, bit 0 of the status register is used as a transmit sequence signal bit which indicates the availability of the transmit buffer 40 to the IBM In order to permit the IBM master to processor. A logic 1 in bit 0 of the status register (SR:0=1) indicates that the CONI card is transferring the contents of the transmit buffer 40 to the INCOM chip U3 for transmission onto the network 20. During this time the IBM processor should not write to the transmit buffer registers. A logic zero is bit 0 (SR:0=0) indicates that the transmit buffer 40 is available to the IBM processor. After reset, SR:0=0.

Bit 1 of the status register 58 comprises an Rx control bit which indicates the availability of the receive buffer 50 to the IBM processor. A 1 in bit 1 of the status register 58 (SR:1=1) indicates that the CONI card is transferring a message from the INCOM chip U3 to the receive buffer 50. Reading the receive buffer during this time will produce meaningless data. A zero (SR:1=0) indicates that the buffer contains a valid message and the IBM processor may safely read its contents. After reset, SR:1=1 since no message has yet been stored in the receive buffer 50.

Bit 2 of the status register 58 comprises a transmitter interrupt request bit which indicates the completion of the transfer of a message from the transmit buffer 40 to the INCOM chip U3 in response to an INIXMT signal from the IBM processor. This bit will be set (SR2:=1) after the contents of the transmit buffer 40 have been loaded into the INCOM chip U3 and the state machine 54 pulls the R/W line high to initiate transmission by the INCOM chip U3 over the network line 20. At the same time tis bit is set an interrupt request is placed on the IRQ3 line of the control bus 30 (pin B25 of connector P1, table I) as will be described in more detail hereinafter. The transmitter interrupt request bit is cleared (SR:2=0) after the status read operation. It should be noted that the transmission of the message by the INCOM chip U3 over the network will still be in progress at the time the transmitter interrupt request bit is set, the setting of this bit indicating to the IBM processor that the transmit buffer 40 is empty and it may write another message into it although this second message will not be transferred to the INCOM chip U3 until transmission of the first message onto the network is completed and an interrupt is produced on the INT line to the state machine 54.

Bit 3 of the status register 58 is a receiver interrupt request bit which indicates that a message has been received from the INCOM network. This bit will be set (SR:3=1) after the receive buffer 50 has been loaded with message received by the INCOM chip U3. At the same time this bit is set an interrupt request is produced on the IRQ3 line, as will be described in more detail hereinafter. This bit will be cleared (SR:3=0) after the status read operation.

Bits 5, 4 of the status register 58 are baud rate status bits which indicate the current baud rate of the INCOM chip U3. SR:5, 4=01 indicates a baud rate of 38.4 kHz. SR:4, 5=10 indicates a baud rate of 1200 Hz. SR:5, 4=11 indicates a baud rate of 300 Hz. SR:5, 5=00 is illegal.

Bit 7 of the status register 58 is the INCOM busy status bit which indicates the status of the INCOM chip U3. This bit will be set (SR:7=1) whenever the INCOM chip U3 is busy demodulating a network message and storing in its internal shift register or is in the process of transmitting a message which has been stored in this register from the transmit buffer 40 on the INCOM network.

The hardware interface CONI card of FIG. 1 is provided with master address registers 76, 78 into which the IBM processor can write a desired address for the INCOM chip U3. When the ICOM chip U3 is operated in the expanded master mode it should be given an address which is different from that assigned to any of the slaves on the INCOM network. Even though the INCOM chip U3 is able to receive all messages on the network irrespective of their addresses, the address comparison circuit in the INCOM chip U3 is still functioning in the expanded master mode of this chip. Accordingly, the master address setting of the chip U3 should be different from all slaves to avoid a confusing address comparison output signal. The master address may also be changed for other purposes, such as testing, and the like.

The address registers 76, 78 are accessed by the IBM processor through the data bus receivers 44 and the internal data input bus 46. The INCOM address register 76 is a byte wide register to which the IBM processor can write at I/O address 309h. This register contains the 8 lower order bits of the INCOM network address for the CONI card. The INCOM address register 78 is a nibble wide register which contains the high order bits of the INCOM network address for the CONI card, this register also being accessed over the internal data input bus 46. Bits 3 through 0 of this register are bits 11 through 8 respectively of the 12 bit INCOM address of the INCOM chip U3. On reset both of the registers 76 and 78 will be initialized to zero. The IBM processor can write into the INCOM address register 76 by placing the desired byte of data on the data bus 28 and an I/O address of 309h on the address bus 26 together with an IOW signal on the control bus 30. The address and command decoder 48 decodes these address and command signals and supplies a load register signal to the address registers 76. In a similar manner the IBM processor can write into the address register 78 by placing an I/O address of 30Ah on the address bus together with an IOW signal on the control bus 30. The 12 bit output of tee register 76, 78 is supplied to the INCOM chip U3 over the master address bus 80 MADR(11:0) so that the address comparison circuit of the INCOM chip U3 can utilize the INCOM address established by the IBM processor and stored in the register 76 and 78.

The CONI card is initialized by the hardware reset signal "RESET DRV" received from the IBM control-bus 30 (pin B2 of connector P1). However, since the IBM personal computer only provides this reset signal on a power up sequence, the CONI card of FIG. 1 is also arranged to respond to a software reset operation initiated by the IBM processor. More specifically, the address and command decoder 48 is arranged so that a read operation from the I/O address 30Ah by the IBM processor is decoded to initiate a hardware reset of the CONI card. After reset, either by the hardware reset signal from the IBM control bus 30 or a software read operation at I/O address 30Ah, the CONI card will be placed in a state in which the contents of the transmit and receive buffers 40, 50 is indeterminate, the status register 58 contents will be 12h, the baud rate of the INCOM chip U3 will be set at 1200, no message transmission will be in progress, the CONI card will be prepared to receive a message from the INCOM network, and the CONI card address will be set to 00.

Considering now the general operation of the CONI card of FIG. 1 during a transmit operation, whenever a message is to be transmitted the IBM processor checks the status register bit zero (SR:0) to determine if the transmit buffer 40 is available to the IBM processor. A "1" in this bit indicates that the CONI card has not yet completed unloading of previous message from the transmit buffer 40. A zero in SR:0 indicates that the transmit buffer 40 is available and may be filled with a new message. After the transmit buffer 40 has been loaded, the initiate transmit bit in the control register (CR:0) should be set by the IBM processor to request that the message in the transmit buffer be transmitted on the INCOM network. The CONI card will set the transmit sequence bit in the status register (SR:0) in response to the writing of CR:0=1 by the IBM processor. The new transmit message will be loaded in the INCOM chip U3 when it is available. After the message has been loaded into the INCOM chip U3 and transmission to the INCOM network initiated, SR:0 will be reset, an interrupt request is placed on the IRQ3 line of tee control bus 30 and the transmit or interrupt request bit of the status register 58 (SR:2) is set.

The IBM processor can either poll the status register (SR:0) or respond to the interrupt request to determine completion of unloading of the transmit buffer 40 into the INCOM chip U3. Since bit 2 of the status register is reset after the status read operation, the IBM processor must keep track of this completion interrupt. The hardware implementation of this interrupt (SR:2) will only reset the interrupt if it was read as a 1. This prevents clearing the interrupt erroneously if the status read operation and completion of unloading of the transmit buffer 40 occurs simultaneously as is described in detail hereinafter.

The actual message transmission on the INCOM network will continue after the status register update. The INCOM busy signal (SR:7) will remain set until the message has been completely transmitted by the INCOM chip U3. Also, as discussed heretofore, the INCOM busy signal (SR:7) is also asserted by receive operations of the INCOM chip U3.

Considering no the general operation of the CONI card in FIG. 1 during a receive operation, since the INCOM chip U3 is operated in the expanded master mode, the CONI card will receive all messages on the INCOM network except those transmitted by itself. Whenever a message is detected, the INCOM chip U3 will be activated and load the receive message into its internal shift register. If the receive buffer 50 is available at the completion of reception of the message (SR:1=0), the CONI card will transfer the contents of the INCOM shift register to the receive buffer 50, set the receiver interrupt request bit of the status register 58 (SR:3=1), and request an IBM processor interrupt on the IRQ3 line of the control bus 30. If the receive buffer 50 is not available (SR:1=1), the message will remain in the INCOM shift register until the IBM processor has read the message already stored in the receive buffer 50 and then sets the acknowledge receive bit of the control register 70 by writing this control register with bit 1 set (SR:1=1). The CONI card responds to the ACKRCV signal developed by the control register 70 by clearing the status register bit 1 (SR:1).

When the IBM processor responds to the receiver interrupt, or polls the status register (SR:3=1), it may read the message stored in the receive buffer 50 at I/O addresses 304h through 307h. If the IBM processor polls the status register, the SR:3 bit is cleared after reading this register. A status of one (1) in this bit indicates that the CONI card requires service i.e. reading of the message stored in the receive buffer 50. This status must be saved for processing by an appropriate software routine in the IBM processor.

All messages which are read from the receive buffer 50 by the IBM processor will include a BCH error status bit i.e. bit 6 in the register addressed at I/O address 304h (FIG. 12) and the IBM processor should check this BCH status bit and discard the message if this bit is set.

After the message has been read from the CONI card by the IBM processor, the IBM processor must free the receive buffer 50 for additional messages by setting the acknowledge receive bit in the control register (CR:1=1). Failure to release the receive buffer 50 will cause all future network messages to be ignored by the CONI card.

From the above general description of the CONI card of FIG. 1, it will be seen that the processor data bus 28 is received by the data bus receivers 44 and driven by the data bus driver 64. Input data received by the data bus receivers 44 is driven onto the internal input data bus 46. All output data from the CONI card is placed on the internal output data bus 62 (DOUT[7:0]) that is received by the processor data bus drivers 64. These separate unidirectional internal data paths are provided in the CONI card of FIG. 1 to limit loading on the IBM processor data bus 28 and to eliminate bus contention problems which would be created if a bidirectional internal data bus is employed.

DETAILED CIRCUIT DESCRIPTION OF CONI CARD

In FIGS. 2-6, inclusive, of the drawings a detailed circuit diagram is given of the CONI card which is shown in block diagram form in FIG. 1. The following sections will describe the detailed circuit operation of the CONI card with circuit references to FIGS. 2-6, inclusive. All signal names will be capitalized and terminate with a "/" if the signal is shown in the drawings with an over bar (low-true).

INCOM Coupling Circuit - 22

Figure 2:
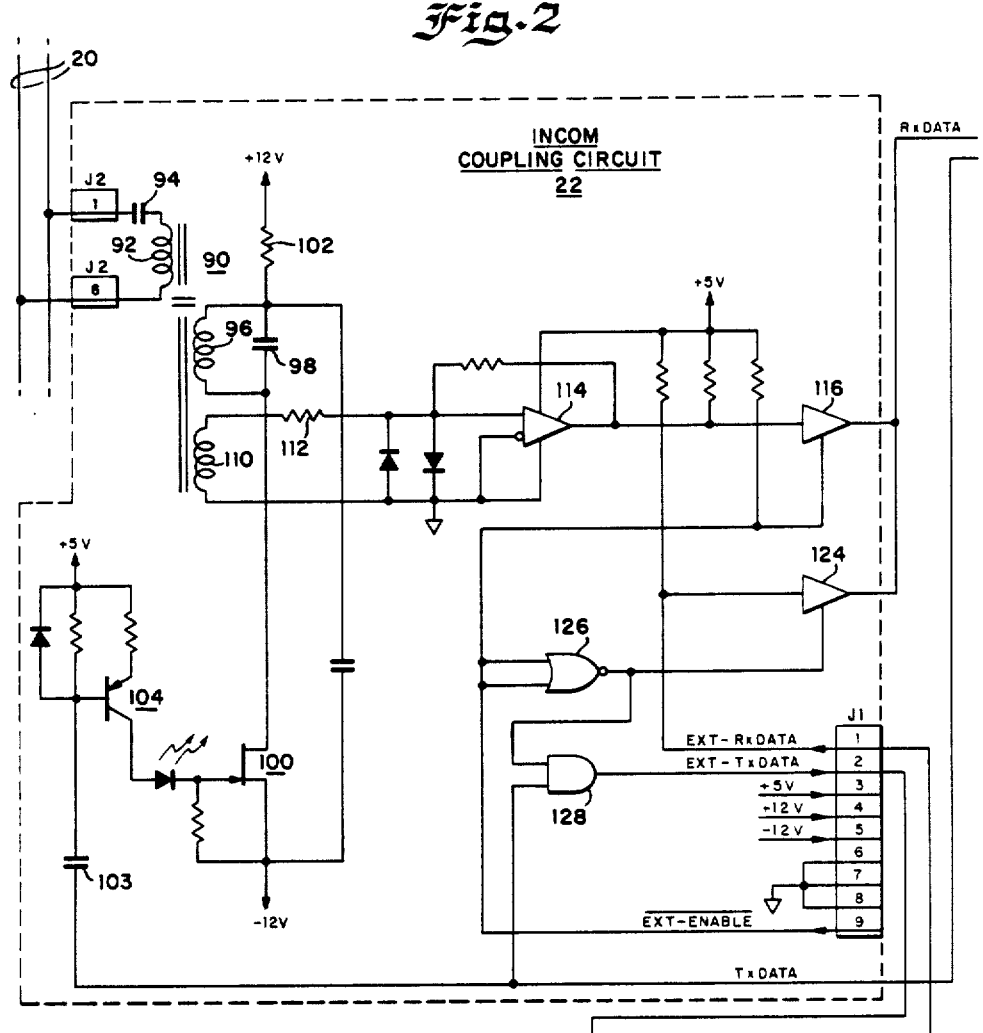
Figure 3:
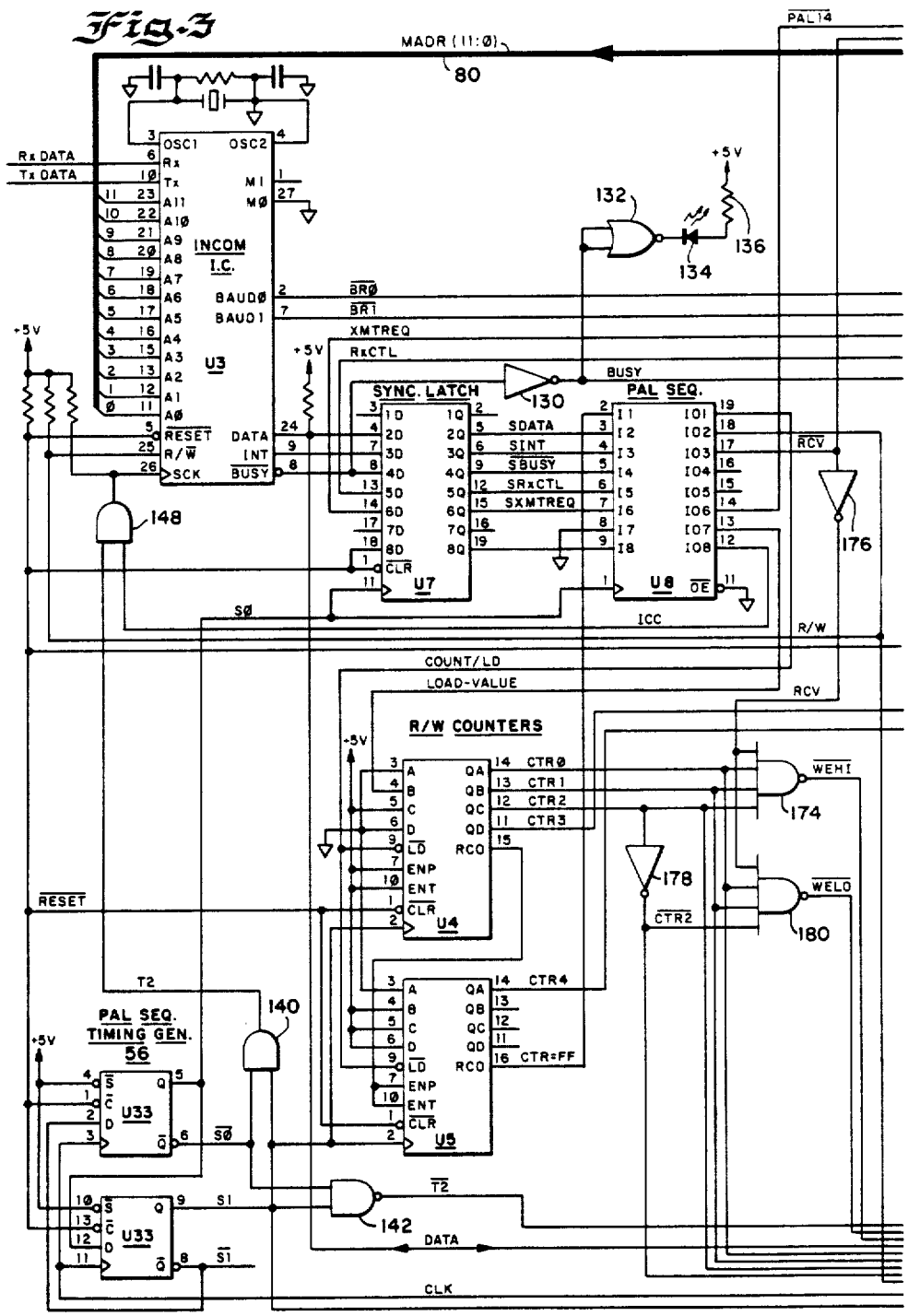
Figure 4:
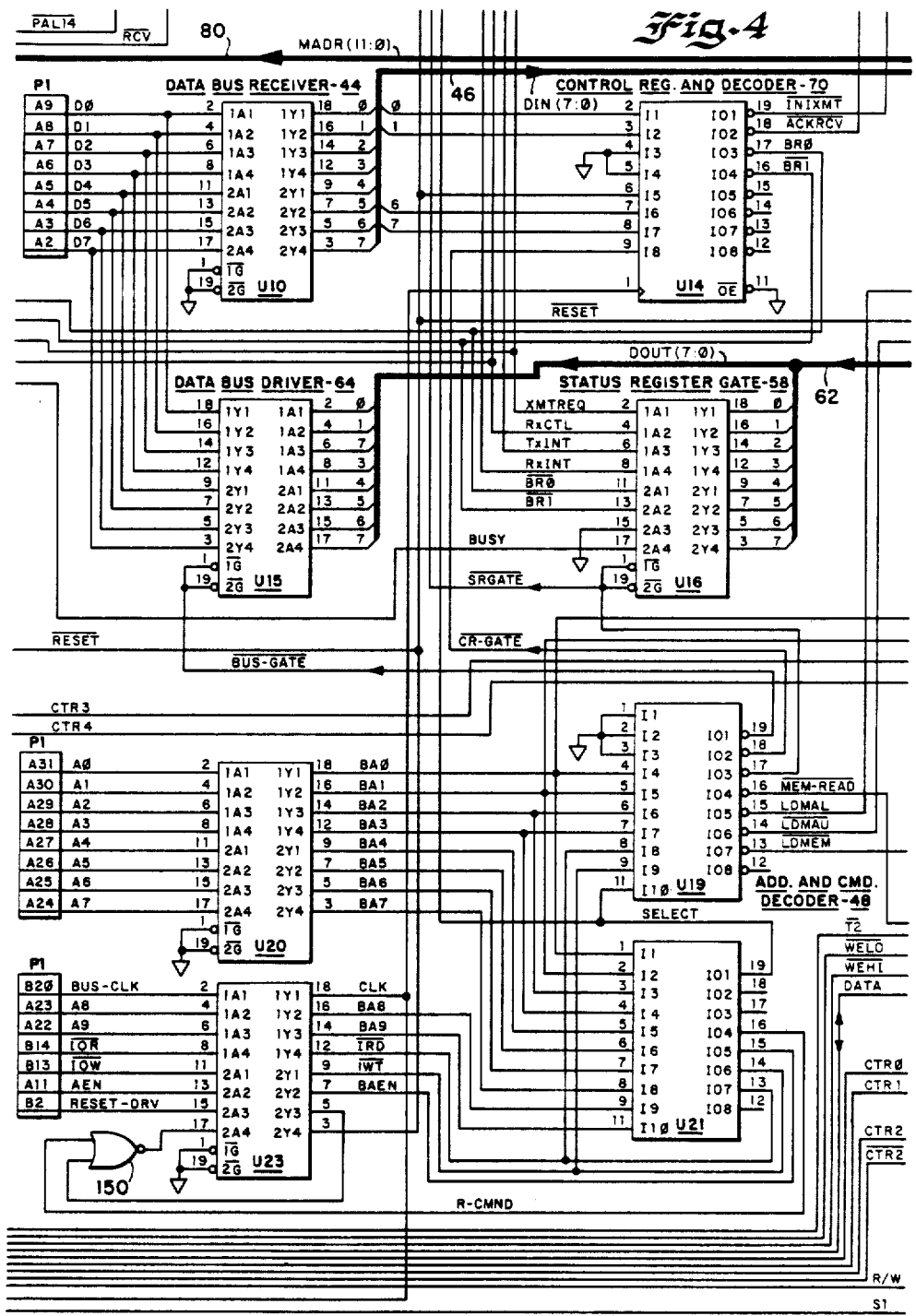
Figure 5:
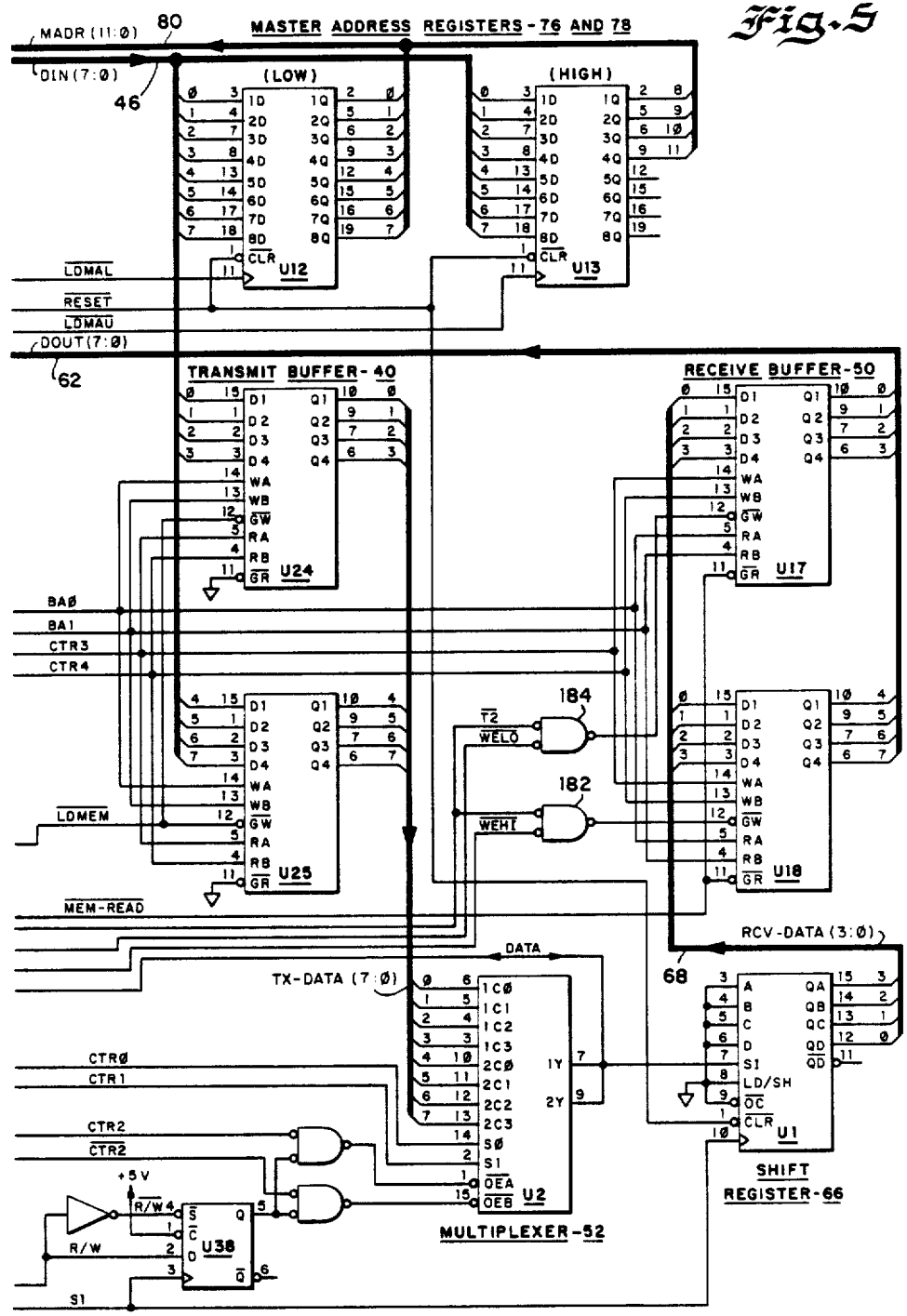

The INCOM coupling circuit on the CONI card is shown in FIG. 2 of the drawings. Referring to this figure, it is first pointed out that a similar coupling circuit is disclosed in Engel et al application Ser. No. 706,079, filed Feb. 27, 1985, assigned to the same assignee as the present invention, and reference may be had to said Engel application for a detailed description thereof. However, for the purposes of the present invention it may be briefly stated that the INCOM coupling circuit 22 includes a coupling transformer 90 having a primary winding 92 which is connected to the common network line through a capacitor 94, the primary winding 92 and capacitor 94 being tuned to the carrier frequency of 115.2 kHz. A secondary winding 96 is also tuned to the carrier frequency by means of the capacitor 98, the winding 96 being connected in series with an FET 100 and a 10 ohm resistor 102 between the +12 volt and −12 volt pins on the processor bus connector P1 of the IBM processor. The INCOM chip U3 (FIG. 3) develops an ON-OFF keyed carrier signal on its TX DATA line which is supplied through a capacitor 103 to the base of a PNP transistor 104 the collector of which is connected through a diode 106 to the gate electrode of the FET 100, as shown, so as to control conduction thereof in accordance with the carrier-on portions of the transmitted message. When the FET 100 is rendered conductive approximately 24 volts is placed across the secondary winding 96 so that a carrier signal is coupled through the transformer 90 and appears on the network line 20 as an ON-OFF keyed carrier signal of approximately 2.5 volts RMS across a 10 ohm load which is sufficient to drive approximately 5,000 stand alone mode or expanded mode slaves connected to the line 20. The diode 106 may be a light emitting type LED and also indicates periods when the INCOM chip U3 is transmitting a message on the network 20. Preferably the LED 106 is mounted on an edge of the CONI card so that it is visible to the user.

The transformer 90 is also provided with a tertiary winding 110 across which a message received from the network 20 is developed and is supplied through a resistor 112 to a comparator 114 which acts as a high gain amplifier for the received signal so that a received ON-OFF keyed carrier signal of approximately 5 volts amplitude is developed in the output of the comparator 114. This amplified and limited received carrier signal is supplied through a tristate output gate 116 to the Rx DATA input line (pin 6) of the INCOM chip U3. In accordance with the present invention, the CONI card is arranged to receive signals from and transmit signals to another communication network medium through the connector J1. This other communication medium, may for example, comprise a fiber optics cable system which includes a fiber optic cable receiver 120 the output of which is connected to pin 1 of the J1 connector, and a fiber optics cable driver 122 whose input is connected to pin 2 of the J1 connector. The units 120, 122 may also receive power and ground signals from the IBM processor bus connector P1 through the connector J1, as indicated in FIG. 2. When an external enable signal is supplied to pin 9 of the J1 connector the tristate output gate 116 is disabled so that signals are no longer received from the network line 20. At the same time a tristate gate 124 is enabled through the inverter 126 so that the message received by the fiber optics cable receiver 120 is supplied through the tristate gate 124 to the Rx DATA input of the INCOM chip U3. During transmission of a message from the INCOM chip U3 the Tx DATA line is supplied to an AND gate 128 the other input of which is supplied from the inverter 126 so that the transmit message generated in the INCOM chip U3 is supplied to the external Tx DATA line (pin 2 of the J1 connector) and to the fiber optic cable driver

INCOM Integrated Circuit U3

The INCOM chip U3 is described in detail in Verbanets application Ser. No. 625,747 filed June 28, 1984 and assigned to the same assignee as the present invention, and reference may be had to this application for a detailed description of the operation thereof. When the INCOM chip U3 is used on the CONI card of the present invention it is operated in the expanded master mode in which pin 27 is grounded and pin 1 is pulled up internally. When operated in this mode, the INCOM chip U3 has its interface lines continuously enabled. These interface lines include an interrupt line (INT) which is an active high output signal which is asserted at the end of a network message reception or at the end of a transmission operation by the INCOM chip U3. The INT line is reset and held low by a logic 1 on the serial clock (SCK) interface line of the INCOM chip U3 (FIG. 1).

The DATA interface line of the INCOM chip U3 is a bidirectional I/O pin whose direction is controlled by the signal on the read-write (R/W) interface line of the chip U3. When the R/W line is a logic high the DATA line is an output. When an interrupt is asserted on the INT line, the DATA pin indicates the cause of the interrupt, the R/W line being held high at this time. A logic high on DATA when the INT is asserted indicates that the interrupt was caused by the receipt of a network message by the INCOM chip U3. A logic 0 on the DATA line indicates the completion of a transmission to the network by the INCOM chip U3. The DATA interface line is also used as a bidirectional data transfer line during a data transfer operation to the receive buffer 50 from the INCOM chip U3 and during a data transfer operation from the transmit buffer 40 to the INCOM chip U3.

The SCK interface line is a serial clock line which is used to clock DATA into or out of the INCOM chip U3 through the DATA line. The quiescent state of the SCK line should be low. The read write (R/W) interface line of the INCOM chip U3 controls the direction of data transfer on the DATA interface line of the chip U3. The R/W line is also used to transfer control of the internal shift register of the INCOM chip U3 from the IBM processor to the INCOM network so that the chip U3 can initiate message transmission on this network. The BUSY/ interface line of the INCOM chip U3 is an active low output that indicates that the INCOM chip U3 is either busy demodulating a 33 bit network received message or is busy transmitting a similar message onto the network. In the CONI card arrangement the BUSY/ line is supplied through the inverters 130 and 132 (FIG. 3) to an LED 134 which is connected in series with the resistor 136 to the +5 volt supply. The LED 134 is preferably edge mounted on the CONI card so as to provide the user with a visible indication of the time periods when the INCOM chip U3 is receiving a message from the INCOM network or transmitting a message onto the network.

INCOM Read/Write State Machine-54

All timing and control signals for both transmit and receive operations to the INCOM interface lines are generated by the INCOM read write state machine 54. Furthermore the logic sequences necessary for these transmit and receive operations are generated by a programmable logic array so that the desired sequence of operations is performed by a logic means which is more compact and less expensive than if the same sequence of operations were carried out by discrete logic circuits. More particularly, the INCOM state machine 54 is comprised of a four bit registered PAL sequencer (U8, FIG. 3), a synchronization latch U7, and the four bit counters U4 and U5. Preferably the PAL sequencer U8 is a commercial type PAL 16R4, the synchronization latch U7 is a commercial type 74LS273 high speed 8 bit register, and the counters U4 and U5 are commercial type 74LS163 high speed four bit synchronous counters. The timing generator 56 for the INCOM state machine 54 comprises a four phase Johnson counter timing generator which includes the dual edge triggered flip flop U33 (FIG. 3), preferably commercial type 74LS74 and the NAND gates 140 and 142. The INCOM state machine 54 also receives signals from and transmits signals to the transmitter control and interrupt logic circuits 144, FIG. 6 and the receiver control and interrupt logic circuits 146, as will be described in more detail hereinafter.

The address lines A0–A9 of the IBM processor address bus 26, and those ones of the processor control bus 30 which are used by the CONI card, are buffered in the octal buffers U20 and U23 (FIG. 4) so as to isolate the processor bus lines from internal loading by the CONI card. Preferably, the buffers U20 and U23 are commercial type 74LS244 octal buffers with three state outputs which provide such isolation. Accordingly, the BUS-CLK line of the processor control bus 30 (B20 of P1 connector) is buffered in the unit U23 and is supplied as the CLK line to the timing generator 56 so as to synchronize all of the timing and control signals generated on the CONI card with the IBM processor clock. The input to the timing generator 56 is thus the 210 ns (4.77 MHz) processor clock BUS-CLK. The timing wave forms generated by the timing generator 56 are shown in FIG. 8 wherein the processor clock pulses on the CLK line are shown at FIG. 8(a). The period of the four phase Johnson counter 56 is 840 ns (nanoseconds) and the output S0 (U33-5) of the generator 56 is supplied to the PAL sequencer U8 to advance this sequencer to the next state, these STATE transitions being shown in FIG. 8(d). The S0 waveform is shown in FIG. 8(b) which line is also identified as the PALCLK control line. The timing generator 56 also produces the waveform S1 (U33-9) which occurs one bus clock (210 ns) after the rising edge of S0 and is used to advance the counters U4 and U5. The S1 waveform is shown in FIG. 8(c) in which it is also identified as the CTRCLK line. The generator 56 also produces the output T2 at the output of the AND gate 140 which is a BUS-CLK period wide pulse (210 ns) which is generated 1 BUS-CLK period after the rising edge S1 waveform. The T2 waveform is shown in FIG. 8(f) wherein it is also referred to as the INCOMCLK line. The T2 waveform is used as a source of serial clock pulses for the SCK line of the INCOM chip U3 during periods when the PAL sequencer U8 develops an enabling waveform. More particularly, the T2 waveform is supplied to the AND gate 148 to which the INCOM clock control waveform (ICC) developed at pin 12 of the PAL sequencer U8 is also supplied. The ICC waveform is developed during periods when a message stored in the internal shift register of the INCOM chip U3 is to be transferred to the receive buffer 50 of the CONI card and also during periods when a transmit message stored in the transmit buffer 40 is to be loaded into the INCOM chip shift register for transmission on the INCOM network, as will be described in more detail hereinafter. The timing generator 65 also develops a T2/ wave form in the output of the NAND gate 142, which is shown in FIG. 8(i) and is employed to control the receive buffer 50 during a write operation from the INCOM chip U3, as will be described in more detail hereinafter.

As described generally heretofore, the sequencer U8 is a programmable array logic (PAL) device which is programmed in accordance with the PALASAM language to implement the necessary logic equations to provide certain states and state transitions necessary to accomplish the loading of DATA into the internal shift register of the INCOM chip U3 and the reading out of data stored in this shift register. The complete PALASAM listing for the sequencer U8 is given APPENDIX A.4. This listing is in accordance with the programmable array logic handbook of Monolithic Memories, 1978, Chapter 4 wherein the procedure used in designing such a PAL is given. The current state of the sequencer U8 is defined by four flip flops contained in this sequencer. These flip flops are labelled A, B, C, and D in the PALASAM listing reproduced in Appendix A.4. The low-true outputs of these four state flip-flops are available on pins 14 through 17 of the sequencer U8. However, only two of these outputs are used externally on the ConI card, i.e. the D flip flop identified as RCV/on pin 17 and the A flip flop identified as PAL14 on pin 14 of the sequencer U8.

There are six valid states defined for the U8 PAL sequencer. The state of the four internal flip flops will be shown as [DCBA] in the following descriptions:

[0000] IDLE—This is the reset state of the state machine 54. This state is used as the "do nothing" wait state.

[1000] R-EC—This is the "receive, enable counter" state. It is used during a receive operation to clock data from the INCOM chip U3 to the receive buffer 50.

[1010] R-C—This is the "receive, clear" state. It is used during a receive operation to generate a signal to the INCOM chip U3 to release its internal shift register so that it can receive another INCOM network message. Specifically, this signal causes the R/W line to the chip U3 to go low and then high.

[0110] X-EC—This is the "transmit, enable counter" state. It is used during a transmit operation to clock data to the INCOM chip U3 from the transmit buffer 40.

[0111] X-W—This is the "transmit, wait" state. It is used during a transmit operation to wait for the INCOM chip U3 to develop an interrupt on its INT line indicating completion of the transmission of a message by the INCOM chip U3 onto the network line 20.

[0101] X-C—This is the "transmit, clear" state. It is used during a transmit operation to supply a single T2 pulse to the SCK input of the INCOM chip U3 to clear the transmit interrupt which the INCOM chip U produces on its INT line after it has completed transmitting a message onto the INCOM network.

The PAL sequencer U8 is programmed to permit the following state transmissions:

| [0000] | [0000] | IDLE | IDLE |
|--------|--------|------|------|
| [0000] | [1000] | IDLE | R-EC |

-continued

| | | | |
|---|---|---|---|
| [1000] | [1000] | R-EC | R-EC |
| [1000] | [1010] | R-EC | R-C |
| [1010] | [0000] | R-C | IDLE |
| [0000] | [0110] | IDLE | X-EC |
| [0110] | [0110] | X-EC | X-EC |
| [0110] | [0111] | X-EC | X-W |
| [0111] | [0111] | X-W | X-W |
| [0111] | [0101] | X-W | X-C |
| [0101] | [0000] | X-C | IDLE |

The synchronization latch U7 is clocked by the same signal (S0) that is used to advance the sequencer U8. All asynchronous inputs to the state machine 54 are first synchronized by U7 before being presented to the registered PAL sequencer U8. The primary requirement for this synchronization is due to the COUNT/LD combinatorial output (U8-19) from the PAL sequencer U8. This signal must be stable at the leading edge of the S1 signal which clocks the U4, U5 counter in order for this counter to function properly. If the inputs to the PAL sequencer U8 are not stable during the entire sequencer cycle, the counter U4, U5 would be loaded with the incorrect value any time the inputs to the sequencer U8 changed after the leading edge of S1. A secondary requirement for the synchronization latch U7 is to reduce metastability problems caused by set up time violations on the D-input of the internal flip flops in the sequencer U8.

The counter formed by the two four bit counters U4 and U5 is initially loaded with a count value such that this counter will be filled after the required number of bits have been counted. In the case of a receive operation this counter will be loaded with a value to count the 26 bits of the received message as shown in FIG. 12. In this connection it will be noted that the counter starts with the BCH error bit since for a received message the preceding bit is always a "1". In the case of a transmit operation the counter U4, U5 will be loaded with a value such that it will count the 25 bits of a message to be transmitted to the INCOM network before it is filled, as shown in FIG. 11. More particularly, the counter U4, U5 is loaded by the COUNT/LD signal developed by the sequencer U8 in accordance with a count value supplied over the LOAD-VALUE line from the sequencer U8 at the start of a receive or transmit operation. This counter develops the timing signals CTR0, CTR1, CTR2, CTR3, and CTR4 on the first five outputs thereof. The CTR3 and CTR4 timing signals are supplied to the transmit buffer 40 to control the write operation therefrom and to the receive buffer 50 to control the read operation into this buffer, as will be described in more detail hereinafter. The CTR0, CTR1, and CTR2 signals are employed to time the operation of the multiplexer 52, as will be described in more detail hereinafter. When the counter U4, U5 is filled it supplies a signal over the CTR FF line to the sequencer U8.

Considering now the operation of the INCOM read write state machine 54 during a receive operation from the INCOM network, this operation begins with the presence of a message on the INCOM network line 20. When the INCOM chip U3 detects a carrier on its Rx DATA line it pulls its BUSY/ line low and begins decoding the incoming bit stream and stores the message in its internal shift register. After the final bit of the message has been decoded, the INCOM chip U3 will pull the BUSY/ line high and produce an interrupt signal (high) on the INT line.

Figure 9:
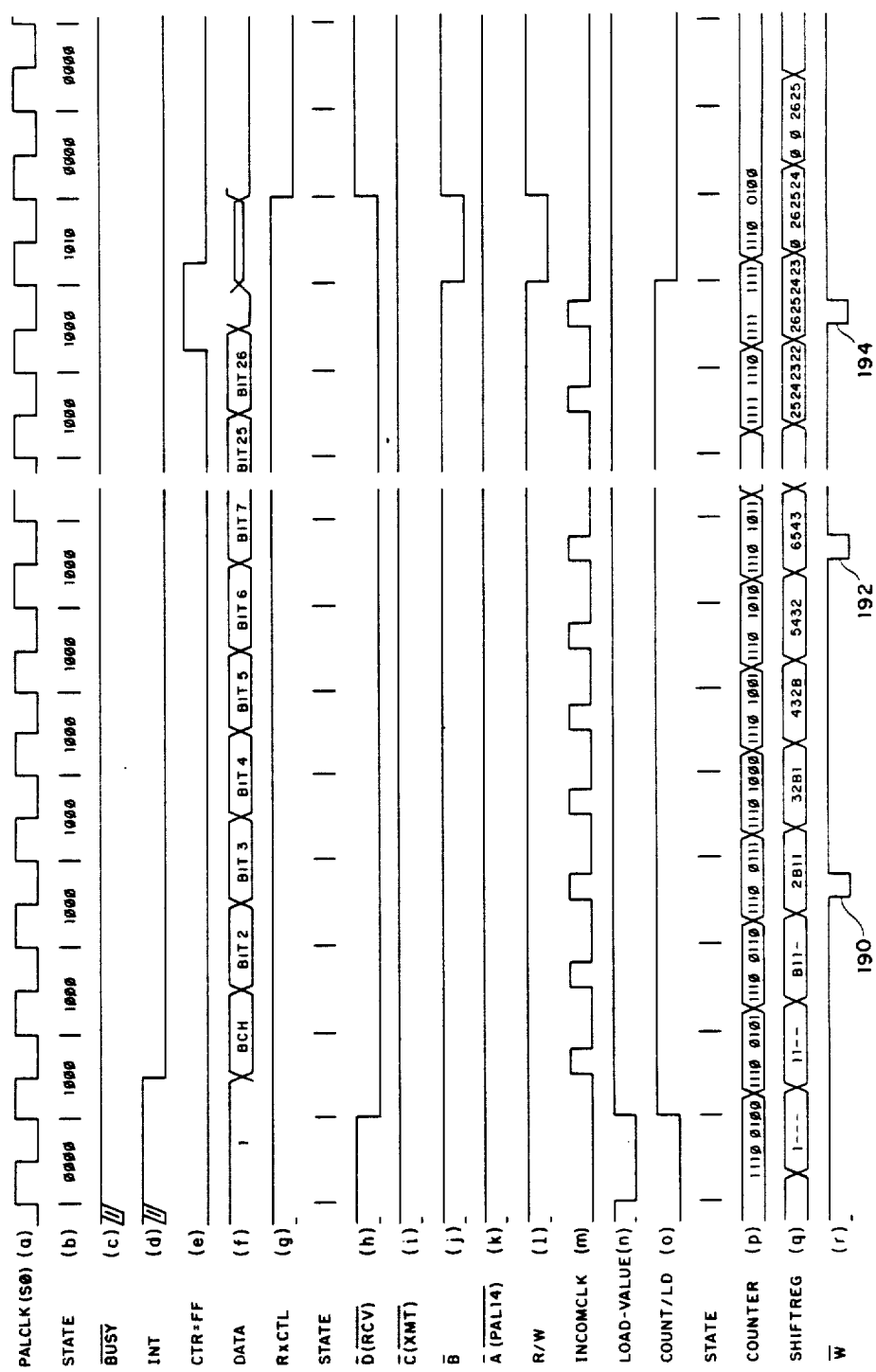
FIG. 9 is a series of timing diagrams illustrating the operation of the hardware interface in receiving a message from the communication network.

The states and state transitions of the INCOM read write state machine 54 during the receive operation are shown in the timing diagram in FIG. 9(b). As shown by this timing diagram, the sequencer U8 idles in a [0000] [0000] state loop. When (1) the INT line is pulled high by the INCOM chip U3, as shown in the timing diagram FIG. 9(d), (2) the DATA line of the INCOM chip U3 is a logic 1 indicating that the interrupt on the INT line is a receive interrupt, and (3) the RxCTL line to pin 6 of the sequencer U8, which is developed in the receiver control and interrupt logic 146 as will be described in more detail hereinafter, indicates that the receive buffer 50 is available; the state machine 54 will initiate a receive operation. The receive operation begins in state [0000] with LOAD-VALUE (U8-13) low (FIG. 9(n)). This will load the U4, U5 counter with 11100100b, as shown in the timing diagram in FIG. 9(p). The next state of the U8 sequencer will be [1000], as shown in FIG. 9(b). In this state the ICC output from the sequencer U8 is high so that the AND gate 148 supplies T2 pulses to the serial clock line SCK of the INCOM chip U3, as shown in the timing diagram of FIG. 9 (m). Also, when the sequencer U8 is in the [1000] state the U4, U5 counter is enabled for counting by the signal on the COUNT/LD output line of the sequencer U8, as shown in FIG. 9(o). Accordingly, the INCOMCLK pulses shown in FIG. 9(m) begin shifting the received message out of the internal shift register of the INCOM chip U3 and onto its DATA line starting with the BCH bit, as shown in FIG. 9(f). The message shifted onto the DATA line is supplied to the shift register 66 and written into the receive buffer 50 in the manner described in detail hereinafter.

The sequencer U8 will remain in the [1000] state until the entire message has been shifted out of the INCOM chip U3 as determined by the setting of the U4, U5 counter. When message bit 26 has been read from the INCOM chip U3, CTR=FF will be asserted by the counter line U5-15 and the sequencer U8 responds thereto by advancing to the state [1010], as shown in the timing diagrams in FIGS. 9(b),(e) and (p). In the [1010] state the sequencer U8 produces a R/W signal on its pin 18 which pulls the R/W pin 25 of the INCOM chip U3 low and then high, as shown by the timing diagram in FIG. 9(l). This signal causes the INCOM chip to condition its internal shift register to receive additional messages from the INCOM network. After state [1010], the U8 sequencer will return to the IDLE state [0000], as shown in FIG. 9(b).

Figure 10:
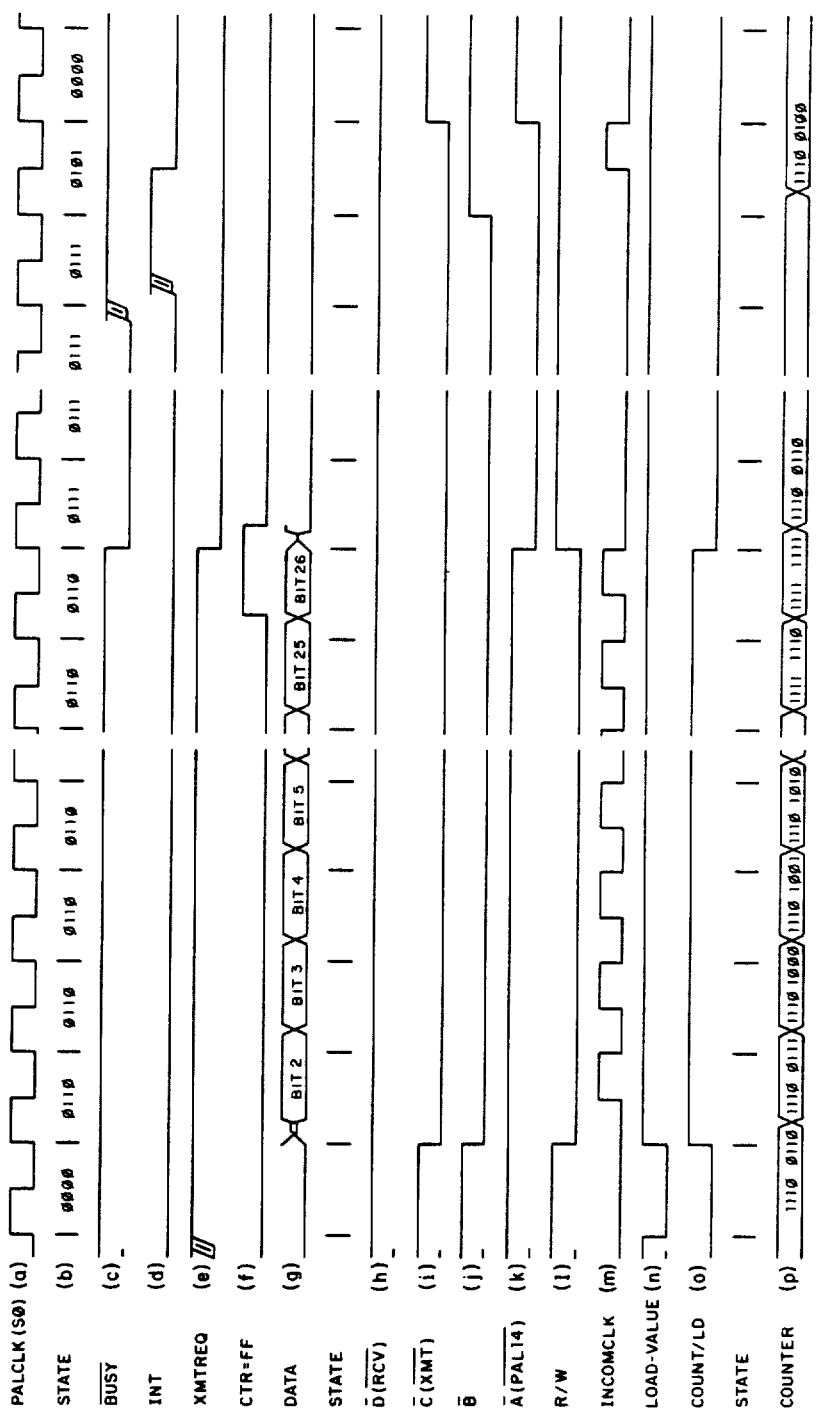
FIG. 10 is a series of timing diagrams illustrating the operation of the hardware interface during transmission of a message onto the network.

Considering now the operation of the INCOM read write state machine 54 during a transmit operation from the transmit buffer 40 to the INCOM network, prior to initiating such a transmit operation the IBM processor will have loaded a message into the transmit buffer 40, as described generally heretofore. Transmission is initiated by the IBM processor by writing bit 0 of the control register 70 (CR:0=1) and then transmitter control and interrupt logic 144 responds to this write operation by generating an XMTREQ signal, as will be described in more detail hereinafter. The XMTREQ signal is synchronized in the latch U7 and is supplied to pin 7 of the sequencer U8 to cause this sequencer to leave its idle loop [0000] [0000] and begin the transmit sequence if a receive operation is not in progress. The waveforms developed during a transmit operation are shown in FIG. 10 and the state and state transitions of the sequencer U8 during a transmit operation are shown in FIG. 10(b). As shown in this timing waveform, the first transmit state after IDLE [0000] is [0110]. The U4, U5 counter is loaded with 11100110b during the last [0000] state prior to [0110], as shown in FIGS. 10(n) and 10(p). This counter is enabled to count by the signal on the COUNT/LD line at the beginning of the first [0110] state, as shown in FIG. 10(o). During the [0110] state the sequencer U8 pulls its R/W output line low (FIG. 10(l)) and the INCOM chip U3 responds thereto by connecting the bidirectional DATA line to the input of its internal shift register and connecting the SCK line to the clock input of this shift register, as described in detail in said copending Verbanets application Ser. No. 625,747. At the same time the sequencer U8 provides an enabling signal on its ICC line so that the T2 pulses from the timing generator 56 are supplied as serial clock pulses to the SCK input of the INCOM chip U3 as shown in FIG. 10(m). Accordingly, data which is stored in the transmit buffer 40 is serialized in the multiplexer 52 and is loaded into the INCOM chip U3 through the bidirectional DATA line in a manner to be described in more detail hereinafter.

The sequencer U8 will remain in the [0110] state until the U4, U5 counter reaches FFh (CTR=FF) at which time the last bit of the transmit message has been loaded into the INCOM chip U3 as shown by the timing waveforms FIG. 10(f), (g) and (p). The U8 sequencer will then advance to state [0111]. When the U8 sequencer advances to state [0111] the R/W line is pulled high and the INCOM chip U3 responds thereto by initiating transmission of the message stored in its iinternal shift register onto the network line 20 in the manner described in detail in said copending Verbanets application Ser. No. 625,747. This transition of the R/W line is shown in FIG. 10(l). During such transmission the BUSY/ line of the INCOM chip U3 is pulled low, as shown by the timing waveform in FIG. 10(c). During the transition from state [0110] to [0111] the sequencer U8 provides a signal on its PAL14 output line which is employed by the transmitter control and interrupt logic 144 to generate a transmit interrupt on the IRQ3 line of the IBM processor bus to indicate that the message has been loaded from the transmit buffer 40 to the INCOM chip U3, as will be described in more detail hereinafter.

After the INCOM chip U3 has completed transmitting the message stored in its internal shift register onto the INCOM network it produces a transmit interrupt on its INT line, as shown in FIG. 10(d) which causes the U8 sequencer to advance from the [0111] state to the [0101] state, as shown in FIG. 10(b). In the [0101] state the sequencer U8 controls the ICC line so that a single clock pulse is supplied to the SCK input of the INCOM chip U3, as shown in FIG. 10(m), and the INCOM chip U3 responds thereto by removing the transmit interrupt from its INT line and conditioning its internal shift register to receive a message from the INCOM network. From the [0101] state the sequencer U8 will return to the IDLE state [0000], as shown in FIG. 10(b).

Address And Command Decoder - 48

The address and command decoder 48 comprises the programmable logic arrays U19 and U21. Preferably the array U19 is a type PAL16L8A and the array U21 is a commercial type PAL 16H8A. A detailed PALASAM listing of the PAL U21 is given in Appendix A.3 together with the function table which is used by the PALASAM language to simulate the logic and to check it, as well as the simulated function table which is used in creating the PAL U21 and testing it. The decoder U21 receives the buffered addresses PA0-PA9 from the buffer U20 corresponding to the conductors A0-A9 of the IBM processor address bus 26, an IRD/ signal which is the buffered input output read signal IOR/ from the buffer 23, an IWT/ signal which corresponds to the input output write (IOW/) signal from the buffer U23 and the DAEN signal which corresponds to the address enable (AEN) signal from the buffer U23. A SELECT signal (U21-19) is decoded from BA5-BA9 and BAEN to define the base I/O address for the CONI card. The SELECT signal is supplied to the PAL U19 for additional registered decoding. The PAL U21 also provides a decoded reset command signal R-CMND in response to the IBM processor performing a read operation at the I/O address 30Ah. The R-CMND signal is OR'd with the buffered RESET-DRV signal from the buffer U23 in the OR gate 150, this signal being further buffered in the buffer U23 and provided as the RESET/ signal to the indicated portions of the CONI card. Accordingly, the CONI card can be reset by the IBM processor when it produces a RESET-DRV signal on the pin B2 of the P1 connector on power up, or, in the alternative, the IBM processor can perform a read operation at I/O address 30Ah to which the PAL U21 will respond by providing a hardware reset signal on the RESET/ line.

The PALASAM listing for the PAL U19 is given in Appendix A.2 and includes the function table used by the PALASAM language to simulate the desired logic and check it, as well as the simulated function table which is used in making and testing the PAL U19. The PAL U19 generates low-true decodes from the buffered addresses BA0-BA3, the SELECT line from the PAL U21 and the IRD/ and IWT/ lines from the buffer U23. In response to these input signals the PAL U19 generates a load memory signal LDMEM/ which is supplied to the transmit buffer 40 to enable the IBM processor to write to this buffer. The PAL U19 also develops a memory read signal MEM-READ which is supplied to the receive buffer 50 to enable the IBM processor to read this buffer. The PAL U19 also generates upper and lower master address load signals LDMAU/ and LDMAL/ which are supplied to the master address registers 78 and 76, respectively to enable the IBM processor to write into these registers. The PAL U19 also generates enabling gate signals for the status register 58, the control register and decoder 70 and the data bus driver 64 on the SRGATE/ line, the CR-GATE/ line and the BUS-GATE/ line, respectively.

Control Register And Decoder - 70

The control register and decoder 70 comprises a four bit registered PAL U14, preferably of the commercial type PAL16R4 the PALASAM listing for the logic contained in U14 is given in Appendix A.1 together with the state flip-flop input equations, the function table used by the PALASAM language to simulate the desired logic and check it, and the simulated function table which is employed to manufacture and test the unit. The PAL U14 receives the buffered data input lines DIN [7, 6, 1, 0] on the internal unidirectional data input bus 46 and it decode the IBM processor commands for initiating transmission (INIXMT/) and acknowledging message reception (ACKRCV/). The control register and decoder 70 also contains the baud rate register and associated logic for providing the BR0 and BR1 output signals to control the baud rate at which the INCOM chip U3 operates.

The internal 4 state flip-flops of the PAL U14 are available externally in low-true (complemented) form on pins 14 to 17 of U14. Two of these outputs (BR0 and BR1) are used externally as the baud rate register. The other two (A and B) are only used internally to generate a CR-GATE/ delayed by 2 CLK cycles. It is necessary to generate a leading edge delay on the gating signal CR-GATE/which is developed by the PAL U19 so that processor data (DIN[7:0]) will be stable on the leading edge of the enable that generates INXXMT/ and ACKRCV/ from the decode of the processor address and data. The CR-GATE/ signal is generated in the PAL U21 in response to processor bus signal IOW/. However, the IOW/signal is generated from the "early write" decode in the IBM processor and the data bus (D0-D7) is not stable at the leading edge of IOW/ and consequently is not stable at the leading edge of the CRGATE/signal.

The state flip-flops A and B of the PAL U14 are used to delay the SR-GATE/ signal by two cycles of the processor BUS-CLK. These two flip-flops are connected to form a shift register with the internally generated signal CR-GATE as the serial input. The reset term on both flip-flops is either the reset input pulse on the RESET/ line or the input signal CR-GATE/ from the PAL U19. Accordingly, a delay of only the leading edge of the CR-GATE/ signal is produced in the PAL U14.

The INIXMT/ output from the PAL U14 is a combinatorial decode of the processor data bus, CRGATE/ and CR-GATE/ delayed. The ACKRCV/ output from the PAL U14 is a combinatorial decode of the processor data bus, CR-GATE/ and CR-GATE/ delayed.

The two state flip-flops BR0 and BR1 in the PAL U14 are used as the baud rate register. The input coding of the PAL U14 is arranged to provide the following logical functions:

1. Reset the baud rate register (C & D state flip flops) to 10b. (Baud rate of 1200)
2. Maintain the current state of the register in the absence of a CR-ATE strobe command.
3. Load the register with the appropriate value when CR-GATE is asserted, and either D0 or D1 are non-zero. (shouldn't this be D6 and D7?)

It should be pointed out that the INIXMT and ACKRCV which are in the control register and decoder 70 are not stored in this register but instead are stored separately in the transmit control and interrupt logic 144 and receiver control interrupt logic 146. Such an arrangement permits the control register to be used for the different independent functions described heretofore in which zero fields have been defined as having no affect on their associated control function.

Receiver Control and Interrupt Logic 146

As discussed generally heretofore the interface between the CONI card and the IBM processor is based on two control signals or flags which are generated by the CONI card and supplied to the status register 58 so that the IBM processor can read these control signals. The interface also includes two interrupt sources on the CONI card which are supplied to the processor bus interrupt request line IRQ3. The receiver control and interrupt logic 146 generates one of these controls and is the source of one of these interrupts. Specifically, the logic circuits 146 include a flip-flop U36-5 which is employed to develop the control signal labeled RxCTL which is supplied to the status register as bit 1 wherein it is identified as the Rx control bit in FIG. 14. The flip flop U36-5 is set by the rising (trailing edge) of the RCV/ waveform (FIG. 9h) which is developed by the U8 sequencer at the end of a receive operation in which the message received by the INCOM chip U3 is stored in the receive buffer 50. The RxCTL signal thus indicates to the IBM processor that the receive buffer 50 contains a receive message that is awaiting processing by the IBM processor. It will be noted that the low-true output of the flip flop U36 is used as the RxCTL control signal or flag. Accordingly, this control signal is clear (U36-5 set) when the receive buffer contains a receive message that is awaiting processing. The RxCTL signal is set (U36-5 cleared) by either the reset signal on the RESET/ line or by the ACKRCV signal which is generated by the PAL U14 in the control register and decoder 70 in response to the writing of an acknowledge receive signal into bit 1 of this control register by the IBM processor. Specifically, the flip flop U36-5 is cleared by either the RESET/signal or the ACKRCV/ signal through the OR gate U30-3.

Concurrently with the development of the RxCTL/ signal by the flip flop U36-5, the interrupt logic 146 also develops a receive message request on the IRQ3 processor bus. More particularly, the rising (trailing) edge of the RCV/ signal developed by the sequencer U8 at the completion of a receive operation also sets flip flop U36-9 the Q/ output of which is supplied through the NAND gates 160 and 156 and the tristate driver 158 to the IRQ3 interrupt line of the processor control bus 30.

The receive message interrupt is removed from the IRQ3 line during a status read operation of the status register 58 by the IBM processor. More particularly, the flip flop U35-9 is used to clear the interrupt flip flop U36-9 during a status read operation. The flip flop U35-9 is clocked by the leading edge of the status read gate signal SR GATE/which is developed by the PAL U19 in response to an IOR/ read by the IBM processor at I/O address 308h assigned to the status register 58. This SR GATE/signal is inverted in the inverter 160 and is applied to the clock input of the flip flop U35-9 so as to load this flip flop with the state of the interrupt flip flop U36-9. NAND gate U26-6 is used to clear the interrupt flip flop U36-9 during a status read if U36-9 was set prior to the read operation. More particularly, the SR GATE signal is applied to one input of the NAND gate U26-6 and the Q output of U35-9 is applied to the other input of this NAND gate. The output of the NAND gate U26-6 is supplied through the OR gate U30-8 to clear the interrupt flip flop U36-9. This circuitry permits the receive interrupt flag to the read as a "1" only once, and then automatically clears this interrupt request.

The circuitry 146 resolves the problem of the status read operation and the interrupt set condition occurring simultaneously. The receive interrupt flag is read and cleared only if it was asserted prior to the status read operation. If the interrupt request flip flop U36-9 is set during the status read operation, the interrupt will be read as a zero and the receive request will not be cleared. This can readily be seen by assuming first that when the status read operation occurs a receive interrupt has not occurred. Under these conditions, the flip flop U36-9 will be reset and pin 9 of U36-9 will be low which means that the flip flop U35-9 will also be reset, so that one input of the NAND gate U26-6 will also be low. Next, if it is assumed that an interrupt has occurred and then the status read operation occurs, when the interrupt occurs U36-9 is clocked true by the RCV/signal developed by the sequencer U8 at the end of the receive operation. However, the SELECT line from the PAL U21, which is applied to the pin 13 of the flip flop U35-9, is normally low until the status read operation is initiated by the IBM processor and the right I/O address applied to the address lines A0-89. Accordingly, the flip flop U35-9 is held low and cannot respond to the setting of the flip flop U36-9 on a receive interrupt. When a status read operation occurs the SR-GATE/ signal, which is developed by the PAL U19 starts with the SELECT line high since the SELECT signal is developed first by the PAL U21 in response to the base I/O address of the CONI card. Accordingly, the leading edge of the SR-GATE/ signal occurs while the SELECT line is high and hence the SR-GATE/ signal clocks the flip flop U35-9 and loads it with the state of the interrupt flip flop U36-9. Thus, if the flip flop U36-9 is set, the flip flop U35-9 will be set. When the flip flop U35-9 is set both inputs to the NAND gate U26-6 are high and its output clears the flip flop U36-9 and clears the receive interrupt. Accordingly, if the interrupt signal is read as a "1" it is cleared. At the end of the status read cycle the SELECT line goes low and clears the flip flop U35-9.

The above assumed conditions are the only ones that can occur. If it is assumed that the SRGATE/ and the CRV/ signals occur at the same time U35-9 is either clocked true or it is not clocked true depending upon the state of U36-9. If the RCV/signal is earlier than the SR-GATE/ signal then U36-9 is set. However, if the RCV/signal is later than the SR-GATE/, U35-9 is not clocked true and so will not clear U36-9 with the result that the interrupt is read as a zero and the interrupt request will not be cleared.

The flip flop U35-9 also develops the RxINT signal which is supplied t the status register 58 as bit 3, this bit being identified as the "receiver interrupt request" in FIG. 14, as described previously in connection with this figure.

Transmitter Control and Interrupt Logic - 144

The transmitter control and interrupt logic 144 is shown in FIG. 6 and operates quite similarly to the logic 146 described in detail heretofore. This logic includes the flip flop U34-5 which is set in response to the transmit initiate signal INIXMT/which is developed by the PAL U14 when the IBM processor requests initiation of a transmit operation from the transmit buffer 40 to the INCOM chip U3. Setting of the flip flop U34-5 generates the XMTREQ signal which is supplied to the U8 sequencer in the state machine 54 and indicates that a transmission operation should be initiated by the sequencer U8. The flip flop U34-5 is cleared by either the reset signal on the RESET/ line or the falling edge of the PAL14/ signal (FIG. 10(k)) which is developed by the sequencer U8 at the end of the transmit operation, this signal being inverted in the inverter 162 and applied to the clock input of the flip flop U34-5. The XMTREQ/ control signal or flag is thus set by the IBM processor writing a transmit initiate signal into the control register 70 and is cleared by the U8 sequencer after the message has been loaded into the INCOM chip U3 for transmission onto the INCOM network.

At the time that the flip flop U34-5 is reset, the transmit interrupt flip flop U34-9 will be set by the rising (leading) edge of PAL 14. The Q/output of U34-9 is supplied through the NAND gate 156 to the IRQ3 line on the IBM processor bus thus indicating to the IBM processor that the message has been loaded from the transmit buffer 40 into the INCOM chip and that another message may be loaded into the transmit buffer 40. The transmit interrupt flip flop U34-9 is cleared by either the RESET/signal or a status read operation, the flip flop U35-5 being employed in a manner identical to that described in detail heretofore in connection with the flip flop U35-9 to clear the flip flop U34-9 after a status read operation. The flip flop U35-5 also develops the TxINT which is supplied to the status register 58 as bit 2 thereof, this bit being identified as the "transmitter interrupt request" in FIG. 14.

Status Register 58

The status register 58 comprises a tristate bus driver U16 (FIG. 4) which is preferably of the commercial type 74LS244. This driver is enabled by the SR-GATE/ signal developed by the PAL U19 during a status read operation and gates internal status signals f the CONI card onto the unidirectional internal data out bus DOUT[7:0] 62. The specific status signals which can be read by the IBM processor are the XMTREQ and TxINT signals developed by the transmitter control and interrupt logic 144, the RxCTL and RxINT signals developed by the receiver control and interrupt logic 146 and the baud rate signals BR0 and BR1 stored in the state flip flops of the PAL U14.

Master Address Registers 76, 78

The master address register 76, 78 comprise the latches U12 and U13, respectively which are preferably of the commercial type 74LS273 high speed eight bit registers with clear. The 12 bit address of the INCOM chip U3 is contained in the byte wide register U12 and the nibble wide register U13 which are loaded from the internal data input bus DIN[7:0] 46 by the clock signals LDMAL/ and LDMAU/ generated by the PAL U19. The 12 bit output of the registers U12 and U13 is supplied over the master address bus MADR[11:0] 170 (FIG. 5) to the address inputs A0-A11 of the INCO chip U3. The registers U12 and U13 are reset by the RESET/ signal which is developed as described in detail heretofore.

Transmit Buffer 40

The transmit buffer 40 consists of two dual-port 4×4 register file integrated circuits U24 and U25. Preferably these circuits are of the commercial type 74LS670 the register files U24 and U25 are organized as a four word by eight bit dull-port random access memory. The write port of the registers U24, U25 is connected to the internal data input bus 46. Addresses BA0 and BA1 for the write port are supplied by the buffered processor address bits A0 and A1. Write enable is generated by the LDMEM/ signal developed by the PAL U19.

The read port of the registers U24 and U25 is the source of the Tx-DATA[7:0] bus (FIG. 5) which is supplied to the multiplexer 52. The address bits for the read operation from the transmit buffer 40 are supplied by the counter signals CTR3 and CTR4 developed by the counters U4 and U5.

Transmit Data Multiplexer 52

The multiplexer 52 comprises the integrated circuit U2 which is preferably a commercial type 74LS253 dual four-input multiplexer with three state outputs. The multiplexer U2 is employed to serialize the data read from the transmit buffer 40, the output of this multiplexer being supplied to the bidirectional serial DATA input of the INCOM chip U3. The SELECT lines S0 and S1 of the multiplexer U2 are controlled by the timing signals CTR0 and CTR1 which are developed by the interface sequencer counter U4. However, the output enable lines OEA/ and OEB/ of the multiplexer U2, which are controlled by the timing signal CTR2 and CTR2/ from the counter U4, are delayed by the flip flop U38-5 to avoid conflicts with the INCOM chip U3 on the DATA line.

Receive Buffer 50 and Shift Register 66

The receive buffer 50 consists of two dual port 4×4 register file integrated circuits U17 and U18 which are preferably of the commercial type 74LS670. The register files U17 and U18 are organized as a four word by eight bit memory for read operations by the IBM processor and as an eight word by four bit memory for write operations from the INCOM chip U3. The read port of the registers U17 and U18 is connected to the unidirectional data out bus 62 and is enabled onto the bus by the MEM-READ/signal which is generated by the PAL U19. Addresses for the read port (BA0 and BA1) are supplied by the buffer processor address bits A0 and A1. Write port addresses are provided by the timing signals CTR3 and CTR4 which are generated by the sequencer counter U4.

The write ports of the registers U17 and U18 are driven by the shift register 66 which comprises the integrated circuit U1 preferably of the commercial type 74LS395, the four bit output of the shift register 66 forming the RCV-DATA bus 68 which is supplied to the registers U17 and U18. The shift register 66 is continuously clocked by the timing signal S1 generated by the timing generator 56 and shown in FIG. 8(c). Accordingly, the data on the bidirectional DATA line of the INCOM chip U3, which is applied to the serial input S1 of the shift register 66, is continuously shifted through the register 66. However, this data is not written into the receive buffer 50 from the RCV-DATA bus 172 until a receive operation is initiated by the PAL sequencer U8. More particularly, the timing signals CTR0, CTR1 and CTR2 are applied to a four input NAND gate 174 the other input of which is the RCV/ signal developed by the sequencer U8 which is inverted in the inverter 176. Accordingly, the qualifying signal WEHI/ is developed in the output of the NAND gate 174 only during the period when the sequencer U8 develops the RCV/ signal during a receive operation, as shown in FIG. 9(h). In a similar manner the counter signals CTR0, CTR1, and the counter signal CTR2 which is inverted in the inverter 178, are applied to three inputs of the four input NAND gate 180 to the other input of which the RCV signal is supplied so that the qualifying signal WELO/ is developed in the output of the NAND gate 180. The WEHI/ and the WELO/ signals are applied respectively to the AND gates 182 and 184 to the other input of which the T2/ signal (FIG. 8(i)) developed by the timing generator 56 is supplied. The outputs of the AND gates 182 and 184 alternately write the four bit output of the shift register 66 on the receive data RCV-DATA bus 68 into the registers U17 and U18. This operation is shown in the timing diagrams of FIGS. 9(q) and 9(r). More particularly, as shown in FIG. 9(f) the DATA line is a "1" when a message has been received by the INCOM chip U3, as shown in FIG. 9(f). If no receive operation is initiated by the sequencer U8, a series of ones would continue to be shifted through the shift register 66. However, after the message has been received the INCOM chip U3 produces an interrupt signal on the INT line and the sequencer U8 responds thereto by initiating a receive operation in which clock pulses are supplied to the serial clock line SCK of the INCOM chip U3 as shown in FIG. 9(m). These clock pulses shift the bits stored in the INCOM shift register onto the data line beginning with the BCH bit, as shown in FIG. 9(f). Since only the first three bits of the received message are to be stored in the first byte of the receive buffer 50 which is addressed at I/O address 304h, as shown in FIG. 12, the AND gate 182 produces a write pulse 190 (FIG. 9(r)) as soon as the first three bits have been shifted into the shift register 66 from the DATA serial input line. After the next 4 bits of the received message have been shifted into the register 66, i.e. bits b3, b4, b5 and b6 (FIG. 12) the AND gate 184 produces a write pulse 192 (FIG. 9(r)) so that these bits are written into the register U17. In a similar manner successive groups of four bits of the received message are stored in the registers U17 and U18, the final four bits, b23, b24, b25 and b26, being written into the register U18 by the write pulse 194, as shown in FIG. 9(q) and FIG. 9(r). In this connection it will be noted that FIG. 9(b) shows the change in setting of the counter U4, U5 as the received message is shifted ut of the shift register of the INCOM chip U3.

Processor Read/Write Operations

The IBM processor read and write operations utilize the internal data paths DIN[7:0] an DOUT[7:0] for data transfer. Address and command decode is provided by the PALs U19 and U21 as described in detail heretofore.

A processor read operation is initiated by placing the proper address on the address bus A9-A0. The bus control line IOR/ is asserted, requesting the data from the CONI card. PAL U21 decodes the higher order (A9-A5) addresses and asserts SELECT to the PAL U19. PAL U19 uses SELECT and the lower order (A4-A0) addresses in addition to the buffered IOR/ signal (IRD/) to generate the appropriate enable signal to gate the requested data onto the internal DOUT[7:0] bus. PAL U19 also enables the data bus driver 64 over the BUS-GAEE/ line. The data bus driver 64 comprises the buffer U15 (FIG. 4) which is preferably the commercial type 74LS244. The read operation does not require processor wait states.

A processor write operation is initiated by placing the proper address on the address bus A9-A0. The bus control line IOW/ is asserted, indicating that the write address is stable. Because the IBM processor uses the "early write" signal to generate the bus signal IOW/, data will not be stable prior to the leading edge of IOW/. PAL U21 decodes the higher order addresses and asserts SELECT to PAL U19. PAL U19 uses SELECT and the lower order addresses in addition to the buffered IOW/ signal (IWT/) to generate the appropriate write enable signal to write data from the internal DIN[7:0] bus. Write data is stable at the trailing edge of IOW/ and will be latched at that time in the appropriate memory or register.

Driver Module For Coni Card

In accordance with the present invention, a driver module is provided in the IBM PC which cooperates with and drives the CONI card and also performs a number of error checking functions in connection with each message sent out by the master so that faulty messages are not placed on the INCOM network. This software driver module is referred to as the INCOM Communication Module (ICM). The listing of the ICM is given in the attached Appendix B and flow charts showing the operation of this driver module are given in FIGS. 15 to 21, inclusive.

The ICM is arranged to receive command, data or control information in an eight byte string which is passed from the application software via the general purpose computer operating system to the ICM. If all eight bytes are not transmitted to the ICM within a predetermined time interval, it informs the computer of an error and does not transmit the message out to the CONI card. This prevents a faulty message from being sent out when, for example, only a seven byte string is generated by the application software.

The ICM will buffer up to thirty-two (32) output commands, data or control messages to the INCOM network of eight bytes each and up to thirty-two (32) input or response messages from the network of four bytes each. If an attempt is made to send more than thirty-two output messages, the ICM sends a busy signal to the application software to inform it of the error.

The first byte of the eight byte output message string is a control byte by means of which the application software can designate predetermined succeeding bytes of the string as either a command or data message for the INCOM network or a control message to the CONI card to change the master address or the baud rate of the INCOM chip associated therewith. The ICM responds to this control byte by reformatting succeeding bytes of the string in the INCOM network format and transmitting the reformatted output message to the CONI card.

Additional bytes of the eight byte string are employed to establish that one or more responses (up to a maximum of thirty-two) is requested from the addressed slave device on the INCOM network and also establish a timeout interval of variable duration during which a response should be received. The ICM responds to these additional bytes by setting up a timeout interval of the requested duration during which it waits for the response and prevents the transmission of an additional output message even though requested by the application software If no response is received within the timeout interval, the ICM again tries to establish communication with the slave device by retransmitting the same output message to the CONI card, if such a retry, or a number of retries is designated by the application software. If no response is received after one or more retries an error flag is set by the ICM. However, if more than one response is requested by the application software, the ICM forces zero retries even though a retry is requested by the application software. In so doing, the ICM avoids the situation where, for example, three response messages are requested but only one is received during the timeout interval. If the message is retried, duplicate response messages would be stored in the ICM's Rx buffer which could be falsely interpreted by the application software.

When response messages are received from the INCOM network, the ICM adds a fourth status byte to the incoming message to inform the application software of certain conditions. One bit of the status byte is used to inform the application software that the preceding bytes of the received message are not valid. Such a condition can arise when the application software reads from the ICM Rx buffer when no message has been received from the INCOM network but a residue may have been left in this buffer from a previous communication. Another bit of this status byte is used to inform the application software that the requested number of response messages have been received This bit is set by the ICM when the number of responses requested in the original eight byte string has been received from the stand-alone or expanded work slave on the INCOM network.

Another bit of this status byte is set by the ICM when more than thirty-two response messages have been received before any message is read out of the ICM Rx buffer which can store only thirty-two such messages. This informs the application software that one or more response messages may have been lost. A further bit of the status byte is set when a timeout error has occurred on a received message to inform the application software that this response message is incomplete. Additional bits of this status byte are used to inform the application software that a message was received with a BCH error and to designate the received message as either data or a command message from the INCOM network.

The ICM is written for use on the IBM PC or XT Computer with IBM PC DOS Ver. 2.10 operating system and with the CONI card in one of the spare card slots in the IBM PC. The ICM complies with the standards given in IBM 1502234, Technical Reference Manual, IBM 6024120 DOS Vrr. 2.10 Operating Manual, and IBM 6024125 DOS Ver. 2.10 Technical Reference Manual. The following definitions and abbreviations are used in the ICM specification described hereinafter:

binary numbers:
(base 2) are written with "b" following the number: 0111b=7.

bit numbering:
bits will be specified with the least significant bit designated as 0.

byte:
an eight bit word.

DOS:
Disk Operating System. In this specification, refers to the IBM PC personal computer operating system. disk: Either a floppy diskette or hard disk in the IBM computer The mass storage of data and or programs.

File:
A group of related data treated as a unit.

Hexidecimal numbers:
(base 16) are written with "h" following the number: 0Fh=15.

ICM:
Incom Communication Module. The software driver module used to handle the protocol of the CONI card from the application software.

I/O:
Input Output.

Input:
The direction is always to the IBM PC unless otherwise indicated.

K:
when referring to size, it represents 1024.

LSB:
Least Significant Bit.

MSB:
Most Significant bit.

nibble:

A four bit word. Typically ½ byte.
output:
the direction is always from the IBM PC unless otherwise indicated.
PROM:
Programmable Read Only Memory
RAM:
Random Access Memory.
Rx:
Receiver.
String:
A sequence of characters.
Tx:
Transmitter.

ICM Operating Specifications

The system disk, with DOS Ver. 2.10 or greater on it, used to boot up the computer, must have a file called CONFIG.SYS with DEVICE=INCOM.COM in it. This file is loaded into the computer at boot time and loads the ICM device driver (INCOM.COM) which becomes part of the operating system. INCOM.COM must also be peasant on the same disk.

The CONI card installed in the IBM PC must be strapped to generate an interrupt request #3, as described in detail heretofore. This corresponds to interrupt vector number 0Bh in the operating system. The ICM modifies and utilizes system interrupt vector numbers 0Bh (unused by DOS-hardware interrupt #3) and 1Ch (Timer Tick). The ICM adds 2270 bytes to the operating system.

ICM Operating Discipline

The ICM allows the sending or receiving of commands or data information to and from the INCOM network through the CONI card. It also allows the sending of control information to the CONI card to change the master address or set baud rates, as described in detail heretofore. The commands, data or control information is sent via an eight byte string to the ICM. The input data is retrieved in a four byte string from the ICM.

TX And RX Buffers

The ICM will buffer thirty-two (32) output commands, data or control messages (eight bytes each) and thirty-two (32) input messages (four bytes each). If more than thirty-two messages are received before the first message is retrieved by the application software, the last message received will be lost. If more than thirty-two commands, data or control information messages are sent, the ICM will return a busy to the calling program.

TX Message Format

The TX or output message is an eight (8) byte string having the following format:

1st byte—This byte is the control byte. If this byte is a binary zero (0000 0000b), this indicates the following bytes are data to be sent to the INCOM network and a "0" will be put in control bit (22) of the INCOM data message (FIG. 11). If this byte is a binary one (0000 0001b), this indicates the following bytes are a command to the INCO network and a "1" will be put in bit (B2) of the INCOM command message, as shown in FIG. 11. If this byte is a binary two (0000 0010b), it indicates that this message is a control message to change the master address and that the next two bytes are the address desired. If this byte is a binary three (0000 0011b), this indicates that this message is a control message to change the baud rate of the INCOM network and the next byte is the baud rate desired. If this byte is a binary four (0000 0100b), it indicates that this message is a control message to reset the receive time-out timer of the ICM.

2nd byte—If the 1st byte is zero, then this 2nd byte is the first data byte to be sent to the INCOM network. This data will be put into bits B3 through B10 in the INCOM message with the LSB in B3 and MSB in B10.

If the 1st byte is one, then the least significant nibble of this 2nd byte is the four bit instruction to be sen to the INCOM network. The most significant nibble of this 2nd byte will be ignored. The least significant four bit nibble will be put into bits B3 through B6 of the INCOM command word with the LSB in B3 and bit 3 of the byte in B6, as shown in FIG. 11.

If the 1st byte is two, then this 2nd byte is the least significant byte of the new master address. This will be sent to the address register 76 of the CONI card at 40 address 304h to change the address of the master, as described in detail heretofore.

If the 1st byte is three, then this 2nd byte is the new baud rate desired for the INCOM network which is sent to the CONI card at I/O address 308h of the control register 70, as described in detail heretofore. The ICM initializes at 1200 baud. The baud rates can be change by setting this 2nd byte to the following values:

0000 0000b=no change—leaves baud rate at last rate set.
0000 0001b=38.4 KHZ
0000 0010b=1200 baud
0000 0011b=300 baud If the first byte is four, this 2nd byte is ignored. This 2nd byte must still be present in the eight byte string.

3rd byte—If the 1st byte is zero, then this 3rd byte is the second data byte to be sent to the INCOM network. This data will be put into bits B11 through B18 in the INCOM data message with the LSB in B11 and the MSB in B18.

If the 1st byte is one, then the least significant nibble of this 3rd byte is the four bit command to be sent to the INCOM network. The most significant nibble of this 3rd byte will be ignored. The leas significant four bit nibble will be put into bits B7 through B10 of the INCOM command word with the LSB in B7 and bit 3 of the byte in B10, as shown in FIG. 11. If the 1st byte is two, then the low nibble of this 3rd byte is the high nibble of the new master address desired. The low nibble of this 3rd byte will be sent to the address register 78 of the CONI card at I/O address 30Ah to change the master address, as described in detail heretofore.

If the 1st byte is three or four, this 3rd byte is ignored. This 3rd byte must still be present in the eight byte string.

4the byte—If the 1st byte is zero, then this 4the byte is the third data byte to be sent to the INCOM network. This data will be put into bits B19 through B26 in the INCOM message with the LSB in B19 and the MSB in B26.

If the 1st byte is one, then this 4the byte is the least significant eight bits of the address field of the INCOM command word. This 4the byte will be put in bits B11 through B18 in the INCOM command word with the LSB in B11 and MSB in B18, as shown in FIG. 11.

If the 1st byte is either two, three or four, this 4the byte is ignored. This 4the byte must still be present in the eight byte string.

5the byte—If the 1st byte is zero, two, three or four, this 5the byte is ignored. This 5the byte must still be present in the eight byte string.

If the 1st byte is one, then the least significant nibble of this 5the byte is the most significant nibble of the address field of the INCOM command word The most significant nibble of the 5the byte is ignored. The least significant nibble of this 5the byte is then put into B19 through B22 of the INCOM command word with the LSB in B19 and the MSB in B22, as shown in FIG. 1.

6the byte—If the 1st byte is zero, two, three or four, this 6the byte is ignored. This 6the byte must still be present in the eight byte string.

If the 1st byte is one, then the least significant nibble of this 6the byte is the application command or data to be put in the INCOM command word. The most significant nibble of this 6the byte is the number of retries minus one. The least significant nibble of this 6the byte is put into bits B23 through B26 of the INCOM command word with the LSB in B23 and the MSB in B26, as shown in FIG. 11.

7th byte—If the 1st byte is zero or one, this 7the byte is the operation code used by the ICM to att on the previous data passed to it. The bit positions of the 7the byte are described as follows:

bit 0

This bit tells ICM if there is a response expected. A one in this bit means a response is expected. A zero in this bit means no response is expected.

* bit 1

This bit tells ICM that it should wait an interval equal to the binary value of the 8the byte times 55 milliseconds for a response and then flag an error or retry the command. If tis bit is a one then the 8the byte is utilized to compute time delay. If this bit is a zero then the 8the byte is ignored. If this bit is zero, the number of response messages expected back is set to zero regardless of bit 0 being set to one.

* bit 2

This bit tells ICM to retry the command after the time out interval. The number of retries is set by bits 4 through 7 of the 6the byte. If this bit is a one then the ICM will retry the command the number of times set forth in bits 4 through 7 of the 6the byte after waiting the full timeout interval for each retry. If this bit is a zero then no retries will take place. Retries are only allowed with command messages which require one response message. Therefore, if the 1st byte is not zero or more than one response message is expected, this bit is ignored. If bit 1 is zero, retries are set to zero regardless of this bit being one.

*bit 3 through bit 7

If bit 0 = one, then bit 3 through bit 7 is the number of messages expected back from the INCOM network. The maximum number is 32 (Rx buffer size). Bit 7 is the MSB and bit 3 is the LSB of the number of messages. If bits 3 through 7 are greater than 32, then ICM forces the messages expected to 32.

*If bit 0 = zero, then the bits with an asterisk are ignored.

If the 1st byte is two, three or four, this 7the byte is ignored. This 7the byte must still be present in the eight byte string.

8the byte—This byte is the time delay × 55 milliseconds for the ICM to wait before retrying or erroring out. The range is from 1 to 254 × 55 msec. or approximately 14 seconds max. This byte is ignored if bit 0 or bit 1 in the 7the byte is a zero. If bit 0 and bit 1 of the 7the byte are one and this 8the byte is zero, ICM forces zero retries. If this 8the byte is 255 (FFh or 1111 1111b), this indicates a wait delay of indefinite duration. The only way to clear the transmitter after giving this delay is to issue an RX TIMER RESET command (1st byte=four). The reason for this option is to allow the application software to control the timeout delay (i.e. to provide timeout delays greater than fourteen seconds).

Rx Message Format

The RX or received (input) message is a four (4) byte string having the following format:

1st byte—This byte is data bits B3 through B10 of the received message, as shown in FIG. 12.

2nd byte—This byte is data bits B11 through B18 of the received message, as shown in FIG. 12.

3rd byte—This byte is data bits B19 through B26 of the received message, as shown in FIG. 12.

4byte—This byte is the status byte of the received message which is developed by the ICM and supplied to the IBM application software. The bits of the 4the byte have the following meaning:

* bit 0

If this bit is a one (1) then the preceding bytes are valid. If this bit is a zero, then the preceding data is not valid. Such a situation can arise, for example, when the IBM application software reads from the ICM RX buffer when no message has been received from the INCOM network by way of the CONI card.

* bit 1

When this bit is a one (1), then this means that all messages from the last transmission have been received and are in the Rx buffer. This bit will be set in the last message received.

* bit 2

When this bit is a one (1), this means that more than thirty-two (32) messages have been received and the last message is lost.

* bit 3

If this is a one (1), this means that a timeout error on the received messages has occurred.

* bits 4 and 5

These bits are undefined

* bit 6

This bit is set if the received message was received with a BCH error and corresponds to bit "ber" of the receive buffer 50 on the CONI card, as shown in FIG. 12

* bit 7

This bit corresponds to bit b2 of the INCOM message on the receive buffer 50 on the CONI card, as shown in FIG. 12. If this bit is a zero, the previous bytes are data from the INCOM network If this bit is a one, the previous bytes are a command from the INCOM network.

Error Coes

There are two error codes that ICM can return to DOS. They are: UNKNOWN COMMAND (DOS error code 03) and DEVICE NOT READY (DOS error code 02). The error codes are described as follows:

* UNKNOWN COMMAND

This code is returned if all eight (8) TX message bytes are not received by ICM from the application software within two (2) seconds after the first byte is transferred to the ICM. This error code will be returned the next time a TX message is sent to ICM by the application software.

* DEVICE NOT READY

This code is returned if the TX que buffer of the ICM has thirty-two (32) messages in it and is full. ICM then waits then (10) seconds for the que buffer to become free to take another message. If at the end of the ten second timeout the Tx buffer has not become free to take another message, then ICM returns this error code to DOS. From the foregoing detailed description of the operating disciplines of the ICM, the listing in Appendix B and the flow charts shown in FIGS. 15-21, inclusive, it will be seen that the ICM stores the eight byte output string from the IBM application software and assembles a command or data message conforming to the protocol of the INCOM network, such as the command message to a stand alone slave or enabled mode slave on the INCOM network shown in FIG. 11, and writes it into the transmit buffer 40 of the CONI card. The ICM also sends control messages to the control register 70 of the CONI card at I/O address 308h, as shown in FIG. 13.

Considering in more detail the operation of the ICM in response to an eight byte output string, the 1st or control byte is decoded to determine whether the remaining bytes of the string comprise information relating to a command, data or control message. If the 1st byte is a binary "1" (0000 0001b) the ICM interprets the succeeding bytes as relating to an INCOM command message and assembles the portions thereof described below into a command message having the format shown in FIG. 11 in which the first or control bit B2 is a "1":

2nd byte—least significant nibble is bits B3-B6 of INCOM command message.

3rd byte—least significant nibble is bits B7-B10 of INCOM command message.

4the byte—least significant eight bits B18) of INCOM slave address.

5th byte—least significant nibble is most significant 4 bits (B19-22) of INCOM slave 6th byte—least significant nibble is the application command bits (B23-26) of the INCOM command message. The most significant nibble of the 4th byte indicates the mumber of times (−1) that the ICM is to retry sending tee INCOM command message in the event it does not receive a reply from the addressed slave within a timeout interval determined by the decoded value of the 8th byte in the string.

7th byte—This byte is decoded as the operation code described in detail heretofore. If bit 0 is a one, indicating that a response is expected, the ICM stores bits 3-7 as the number of messages expected back from the INCOM network.

8th byte—If one or more retries are to be made, the ICM uses this byte to determine a timeout interval (decoded value of this byte ×55 milliseconds) which it will wait before retrying (sending the same INCOM command message to the CONI card and waiting for a reply) or erroring out.

If the 1st or control byte of the eight byte string is a binary "0" (0000 0000b) the ICM interprets the succeeding bytes as relating to an INCOM data message to an enabled mode slave previously addressed and assembles the portions thereof described below into a data message in which the control bit B2 is "0 ":

2nd byte—data bits B3-B10 of the INCOM data message

3rd byte—data bits B11-18 of data message

4th byte—data bits B19-26 of data message

5th byte—ignored

6th byte—least significant nibble is ignored. Most significant nibble indicates number of retries (−1) in the event no reply is received from the enabled mode slave.

7th byte—This byte is decoded as the operation code described in detail heretofore.

8th byte—This byte is used to determine the timeout interval, as described above in connection with an INCOM command message.

If the 1st or control byte of the eight byte string is a binary "2" (0000 0010b) the ICM interprets the succeeding bytes as relating to a control message to the master address registers 76, 78 on the CONI card and assembles the portions thereof the data bus 28 and I/O addresses 309h and 30Ah on the address bus 26 are employed to write into the registers 776, 78 as described in detail heretofore:

2nd byte—least significant byte of master address (register 76)

3rd byte—least significant nibble is most significant nibble of master address (register 78)

4th byte—ignored

5th byte—ignored

6th byte—ignored

7th byte—ignored

8th byte—ignored

If the 1st byte of the eight byte string in a binary "3" (0000 0011b) the ICM interprets the succeeding bytes as relating to a control message to the control register 70 on the CONI card to change the baud rate of the INCOM network and assembles the portions thereof described below into a baud rate control message which is written into the control register 70 at I/O address 308h, as shown in FIG. 13:

2nd byte—The two most significant bits of this byte are the new baud rate (B6 and B7 in FIG. 13).

3rd to 8the bytes—ignored

The ICM also writes an initiate transmit (Tx) bit in B0 of the control register 70 after a command or data message has been written into the transmit buffer 40 or an acknowledge receive (Rx) bit in B1 of the control register 70 after a received message has been read from the receive buffer 50 on the CONI card, as described in detail heretofore.

If the 1st byte of the eight byte string is a binary "4" (0000 0100b) the ICM responds thereto by resetting its own internal timer and ignores the remaining bytes of the eight byte string. It will be recalled from the preceding description of the 7th byte operation code that the ICM responds to a timeout value of 255 in the 8th byte of the string by disabling its internal timer so that a wait delay of indefinite duration is initiated. The RX TIMER RESET command (1st byte=4) may then be used by the application software when delays greater than fourteen seconds are needed.

As discussed generally heretofore, when a number of messages are to be received back from the enabled slave on the INCOM network the ICM stores bits 3-7 of the 7th byte of the TX string and counts the number of messages received back from the INCOM network. When the number of messages stored in the ICM receive buffer equals the stored bits 3-7, the ICM sets bit 1 of the 4th byte (status) in the last received message to inform the application software that all messages in response to the last transmission have been received.

If the RX buffer of the ICM overflows, bit 2 of the 4th status byte of the next received message read from the RX buffer will be set to indicate to the application software that more than thirty-two messages have been received and the last message has been lost.

Referring now to the flow charts for the ICM driver module, FIG. 15 is an overall flow chart illustrating how the ICM functions with the timer task interrupt service routine of the IBM PC DOS operating system which generates an interrupt signal every 55 milliseconds. FIG. 16 is a flow chart of the ICM timer tick routine which uses the DOS system timer tick to determine whether all eight bytes of the eight byte output message string have been developed by the application software within a predetermined time interval This figure also shows how the ICM utilizes the DOS system timer tick to establish a receive timeout interval during which a response to the output message of the master should be received from the INCOM network.

FIG. 17 is a flow chart illustrating how the ICM responds to a CONI card interrupt. If an INCOM message has been received by the CONI card, the ICM stores the message, as shown by the GET Rx MESSAGE routine of FIG. 18. It will be noted from FIG. 18 that the ICM releases the CONI card and sets an overflow error if the number of messages from the CONI card is greater than the capacity of the Rx buffer of the ICM, i.e., greater than 32 response messages. The ICM also increments its response messages received counter as each response message is received and when the number of messages received equals the number of responses expected (bits 3 through 7 of 7th byte of the eight byte string) the ICM sets an all response messages received flag (bit 1 of 4th byte of last Rx message) to inform the application software of this event.

From FIG. 17 it can also be seen that if all messages have been received from the CONI card, no messages are comings in from the CONI card and it is ready to take another message, the process command routine shown in FIG. 19 is utilized. Referring to FIG. 19, it will be seen that the ICM determines whether a command from the application software is stored in its que buffer and whether this command is a control message (baud rate or counter address change) or a command or data message. If it is a data message, the data is sent to the CONI card, the number of retries is set to zero and the number of return messages is initialized to zero. If a response is expected back (bit 0 of 7th byte) the number of responses is determined from bits 3 through 7 of the 7th byte. If the application software attempts to call for more response messages than the ICM is capable of handling, the ICM forces the number of responses to the maximum allowed and then stops transmitting any further output messages until all bytes of the expected response messages have been received.

If the eight byte string is a command message to the INCOM network, the ICM reformats the control bit, INCOM instruction, INCOM address and master command derived from the eight byte string into the format required by the INCOM network and sends the command to the CONI card. The number of responses and number of retries are determined from the eight byte string as well as the desired setting for the timeout timer and an initiate transmit (INIXMT) is then sent to the CONI card.

FIG. 20 is a flow chart of the operation of the ICM in receiving an eight byte string from the DOS operating system of the IBM and FIG. 21 is a flow chart of the operation of the ICM in inputting data to the DOS operating system upon request.

While there has been illustrated and described a single embodiment of the present invention, it will become apparent that various changes and modifications thereof will occur to those skilled in the art. It is intended in the appended claims to cover all such changes and modifications as fall within true spirit and scope of the present invention.

Appendix A
PAL DOCUMENTATION

The following sections document the contents of the Programmed Array Logic elements used on the CONI printed circuit board. This documentation is written in PALASM*. PAL Assembler, is a Fortran IV program which translates a PAL Design Specification into a PAL Fuse Pattern and PAL Programming Format (BHLF or HEX).

A.1 U14: Control Register and Decoder

```
INCOM COmputer Network Interface (CONI) Control Decoder
Westinghouse R&D Center          1310 Beulah Rd. Pgh, Pa.  15236
CLK D0 D1 NC NC /R D6 D7 /CRGATE GND
/OE NC NC /A /B /BR1 /BR0 /ACKRCV /INIXMT VCC

- - INPUT PINS - -
        D0 - D1:     Data bus
```

```
;          D6 - D7:        Data bus
;          /CRGATE:        Control register
;          /R:             Reset ;          - - STATE DEFINITIONS - -
;          STATE f-f's     A, B, BR1, BR0
;          [abxx]    :     CRGATE => A, A => B.
;                          B is CRGATE delayed by 2 clocks
;          [xx00]    :     Illegal
;          [xx01]    :     1200 Hz
;          [xx10]    :     38.4 kHz
;          [xx11]    :     300 Hz ;          - - STATE f-f INPUT EQUATIONS - -

A :=      ;                                    CRGATE delayed 1 clock
 /R * CRGATE;

B :=      ;                                    CRGATE delayed 2 clocks
 /R * A * CRGATE;                              (leading edge only)
```

*Reference: Monolithic Memories "PAL Handbook", 1978

```
BR1 :=    ;                                    Baud Rate 1 (reset HIGH)
 /R * CRGATE * A */B * D6 */D7 +;              Load command
 /R * CRGATE * A */B */D6 */D7 * BR1 +;        No load command
 /R */CRGATE * BR1 +;                          No command => maintain
 /R */A * BR1 +;                                    *
 /R * B * BR1;                                      *

BR0 :=    ;                                    Baud Rate 0 (reset LOW)
  R +;
  CRGATE * A */B */D6 * D7 +;                  Load command
  CRGATE * A */B */D6 */D7 * BR0 +;            No load command
 /CRGATE * BR0 +;                              No command => maintain
 /A * BR0 +;                                        *
  B * BR0;                                          *

;          - - COMBINATORIAL OUTPUT PINS - -

ACKRCV =  ;                                    Ack receive message
  CRGATE * A * B * D1;

INIXMT =  ;                                    Initiate transmit
  CRGATE * A * B * D0;
FUNCTION TABLE
/OE CLK /R D7 D6 D1 D0 /CRGATE
/BR1 /BR0 /B /A /INIXMT /ACKRCV ;                /          / /
;                C          I A
;                R          N C
;                G  / /     I K
;/ C             A  B B     X R
```

```
;O L / D D D D T  R R / /  M C
;E K R 7 6 1 0 E  1 0 B A  T V
------------------------------------------------------------------
 L C L L L L L H  H L H H  H H; Reset internal f-f's L C H L L L L H  H L H H  H H; Check that BR's are maintained
 L C H L L L L H  H L H H  H H;
 L C H L L L L H  H L H H  H H;

L C H L L L L L  H L H L  H H; Check no BR change command
 L C H L L L L L  H L L L  H H;
 L C H L L L L L  H L L L  H H;
 L C H L L L L H  H L H H  H H;

L C H H L L L L  H L H L  H H; Check load BR 10 command
 L C H H L L L L  H L L L  H H;
 L C H L L L L L  H L L L  H H;
 L C H L L L L H  H L H H  H H;

L C H L H L L L  H L H L  H H; Check load BR 01 command
 L C H L H L L L  L H L L  H H;
 L C H L L L L L  L H L L  H H;
 L C H L L L L H  L H H H  H H;

L C H H H L L L  L H H L  H H; Check load BR 11 command
 L C H H H L L L  H H L L  H H;
 L C H L L L L L  H H L L  H H;
 L C H L L L L H  H H H H  H H;

L C H L L L H L  H H H L  H H; Check initiate XMT command
 L C H L L L H L  H H L L  L H;
 L L H L L L H L  H H L L  L H;
 L L H L L L H H  H H L L  H H;
 L C H L L L L H  H H H H  H H;

L C H L L H L L  H H H L  H H; Check acknowledge receive command
 L C H L L H L L  H H L L  H L;
 L L H L L H L L  H H L L  H L;
 L L H L L H L H  H H L L  H H;
 L C H L L L L H  H H H H  H H;
------------------------------------------------------------------
```

DESCRIPTION This PAL is used for Control Register command decoding on the INCOM COmputer Network Interface card (COMI) for the IBM PC & XT personal computers. It receives bits 0,1,6 and 7 of the 8-bit DATA BUS, an enable from the address decoder logic (CRGATE) and reset. It contains the baud rate f-f's and decodes the commands for altering their states. It also generates a transmit initiate signal (/INIXMT) and receive acknowledgement (/ACKRCV) signals for use in the transceiver control logic.

Command : 4 - Assemble PALASM source
0491 Fuses to be blown

Command : 5 - Simulate function table
0001 C00XX0001N0XXHHHLHHN
0002 CC0XX1001N0XXHHHLHHN
0003 C00XX1001N0XXHHHLHHN

```
0004 C00XX1001N0XXHHHLHHN
0005 C00XX1000N0XXLHHLHHN
0006 C00XX1000N0XXLLHLHHN
0007 C00XX1000N0XXLLHLHHN
0008 C00XX1001N0XXHHHLHHN
0009 C00XX1010N0XXLHHLHHN
0010 C00XX1010N0XXLLHLHHN
0011 C00XX1000N0XXLLHLHHN
0012 C00XX1001N0XXHHHLHHN
0013 C00XX1100N0XXLHHLHHN
0014 C00XX1100N0XXLLLHHHN
0015 C00XX1000N0XXLLLHHHN
0016 C00XX1001N0XXHHLHHHN
0017 C00XX1110N0XXLHLHHHN
0018 C00XX1110N0XXLLHHHHN
0019 C00XX1000N0XXLLHHHHN
0020 C00XX1001N0XXHHHHHHN
0021 C10XX1000N0XXHHHHHHN
0022 C10XX1000N0XXLLHHHLN
0023 010XX1000N0XXLLHHHLN
0024 010XX1001N0XXLLHHHHN
0025 C00XX1001N0XXHHHHHHN
0026 C01XX1000N0XXLHHHHHN
0027 C01XX1000N0XXLLHHLHN
0028 001XX1000N0XXLLHHLHN
0029 001XX1001N0XXLLHHHHN
0030 C00XX1001N0XXHHHHHHN
```

Command : A - Display pulse pattern

```
        00         10         20        30
0000  ----------  ----------  ---------- --
0032  X---------  ---------X  ---X-----X --
0064  XXXXXXXXXX  XXXXXXXXXX  XXXXXXXXXX XX
0096  XXXXXXXXXX  XXXXXXXXXX  XXXXXXXXXX XX
0128  XXXXXXXXXX  XXXXXXXXXX  XXXXXXXXXX XX
0160  XXXXXXXXXX  XXXXXXXXXX  XXXXXXXXXX XX
0192  XXXXXXXXXX  XXXXXXXXXX  XXXXXXXXXX XX
0224  XXXXXXXXXX  XXXXXXXXXX  XXXXXXXXXX XX
0256  ----------  ----------  ---------- --
0288  ----X-----  ---------X  ---X-----X --
0320  XXXXXXXXXX  XXXXXXXXXX  XXXXXXXXXX XX
0352  XXXXXXXXXX  XXXXXXXXXX  XXXXXXXXXX XX
0384  XXXXXXXXXX  XXXXXXXXXX  XXXXXXXXXX XX
0416  XXXXXXXXXX  XXXXXXXXXX  XXXXXXXXXX XX
0448  XXXXXXXXXX  XXXXXXXXXX  XXXXXXXXXX XX
0480  XXXXXXXXXX  XXXXXXXXXX  XXXXXXXXXX XX
0512  ----------  -------X--  ---------- --
0544  ----------  ---------X- -X-XX----X --
0576  ----------  -X------X-  -X-X-X---X --
0608  ----------  -X--------  --------X- --
0640  ----------  -X--------  --X------- --
0672  ----------  -X------X   ---------- --
        00         10         20        30
0704  XXXXXXXXXX  XXXXXXXXXX  XXXXXXXXXX XX
0736  XXXXXXXXXX  XXXXXXXXXX  XXXXXXXXXX XX
```

```
0768  ----------  ------X-X-  X--X-X---X  --
0800  ----------  -----XX-X-  -X-X-X---X  --
0832  ----------  -----XX---  --------X-  --
0864  ----------  -----XX---  --X-------  --
0896  ----------  -----XX--X  ----------  --
0928  XXXXXXXX    XXXXXXXX    XXXXXXXX    XX
0960  XXXXXXXX    XXXXXXXX    XXXXXXXX    XX
0992  XXXXXXXX    XXXXXXXX    XXXXXXXX    XX
1024  ----------  ------X---  ---X-----X  --
1056  XXXXXXXX    XXXXXXXX    XXXXXXXX    XX
1088  XXXXXXXX    XXXXXXXX    XXXXXXXX    XX
1120  XXXXXXXX    XXXXXXXX    XXXXXXXX    XX
1152  XXXXXXXX    XXXXXXXX    XXXXXXXX    XX
1184  XXXXXXXX    XXXXXXXX    XXXXXXXX    XX
1216  XXXXXXXX    XXXXXXXX    XXXXXXXX    XX
1248  XXXXXXXX    XXXXXXXX    XXXXXXXX    XX
1280  ----------  ------X---  ----------X --
1312  XXXXXXXX    XXXXXXXX    XXXXXXXX    XX
1344  XXXXXXXX    XXXXXXXX    XXXXXXXX    XX
1376  XXXXXXXX    XXXXXXXX    XXXXXXXX    XX
      00          10          20          30
1408  XXXXXXXX    XXXXXXXX    XXXXXXXX    XX
1440  XXXXXXXX    XXXXXXXX    XXXXXXXX    XX
1472  XXXXXXXX    XXXXXXXX    XXXXXXXX    XX
1504  XXXXXXXX    XXXXXXXX    XXXXXXXX    XX
1536  XXXXXXXX    XXXXXXXX    XXXXXXXX    XX
1568  XXXXXXXX    XXXXXXXX    XXXXXXXX    XX
1600  XXXXXXXX    XXXXXXXX    XXXXXXXX    XX
1632  XXXXXXXX    XXXXXXXX    XXXXXXXX    XX
1664  XXXXXXXX    XXXXXXXX    XXXXXXXX    XX
1696  XXXXXXXX    XXXXXXXX    XXXXXXXX    XX
1728  XXXXXXXX    XXXXXXXX    XXXXXXXX    XX
1760  XXXXXXXX    XXXXXXXX    XXXXXXXX    XX
1792  XXXXXXXX    XXXXXXXX    XXXXXXXX    XX
1824  XXXXXXXX    XXXXXXXX    XXXXXXXX    XX
1856  XXXXXXXX    XXXXXXXX    XXXXXXXX    XX
1888  XXXXXXXX    XXXXXXXX    XXXXXXXX    XX
1920  XXXXXXXX    XXXXXXXX    XXXXXXXX    XX
1952  XXXXXXXX    XXXXXXXX    XXXXXXXX    XX
1984  XXXXXXXX    XXXXXXXX    XXXXXXXX    XX
2016  XXXXXXXX    XXXXXXXX    XXXXXXXX    XX
Sumcheck 3BBB
```

A.2 U19:Command Decoder

```
INCOM COmputer Network Interface (CONI) Command Decoder
Westinghouse R&D Center      1310 Beulah Rd. Pgh. Pa.  15235
Z Z Z BA0 BA1 BA2 BA3 /IRD /IWT GND
SELECT NC /LDMEM /LDMAU /LDMAL /RD-MEM /SRGATE /CRGATE /BUSGATE VCC

;       - - OUTPUT PINS - -

LDMEM = ;                           Load Memory (write)
  SELECT * IWT * /BA3;                 [300 - 307]
```

```
LDMAU = ;                                     Load Master Addr. high
  SELECT * IWT * BA3 * /BA2 * BA1 * /BA0;           [30A]

LDMAL = ;                                     Load Master Addr. low
  SELECT * IWT * BA3 * /BA2 * /BA1 * BA0;           [30B]

RD-MEM = ;                                    Dual-port read
  SELECT * IRD * /BA3;                              [300 - 307]

SRGATE = ;                                    Status reg. read
  SELECT * IRD * BA3 * /BA2 * /BA1 * /BA0;          [303]

CRGATE = ;                                    Control reg. write
  SELECT * IWT * BA3 * /BA2 * /BA1 * /BA0;          [308]

BUSGATE = ;                                   Read operation
  SELECT * IRD * /BA3 + ;                           [300 - 307]
  SELECT * IRD * BA3 * /BA2 * /BA1 * /BA0;          [308]

FUNCTION TABLE
BA3 BA2 BA1 BA0 SELECT   J /IWT
/LDMEM /LDMAU /LDMAL /RD-MEM /SRGATE /CRGATE /BUSGATE

;                        /
;                      / / / B
;                     / / / D S C U
;           S        / / / D S C U
;           E        L L L E R R S
;           L / /    D D D - G G G
;B B B B E I I       M M M M A A A
;A A A A C R W       E A A U T T T
;3 2 1 0 T D T       M U L X E E E
-------------------------------------------------------------------
X X X X L X X        H H H H H H H;   No active SELECT
X X X X H H X        X X X H H X H;   No active IRD L X X X H X H        H X X X X X X;   No active WRITE
H X X X H X L        H X X X X X X;   No RAM selected
L X X X H X L        L X X X X X X;   Write to RAM H L H L H H L        X L X X X X X;   Valid write MAU
L X X X H H L        X H X X X X X;   Check for no select for other addr.
X H X X H H L        X H X X X X X;
X X L X H H L        X H X X X X X;
X X X H H H L        X H X X X X X;

H L L H H H L        X X L X X X X;   /Valid write MAL
L X X X H H L        X X H X X X X;   Check for no select for other addr.
X H X X H H L        X X H X X X X;
X X H X H H L        X X H X X X X;
X X X L H H L        X X H X X X X;

L X X X H L X        X X X L X X X;   RAM selected
H X X X H L X        X X X H X X X;   RAM not selected L X X X H L X        X X X X H X X;   No SRGATE on RAM
```

```
H L L L H L X  X H H X L X X;  Status Reg => SRGATE
H X X H H L X  X X X X H X X;  No SRGATE on other addresses
H X H X H L X  X X X X H X X;
H H X X H L X  X X X X H X X;

X X X X H X H  X X X X X H X;  No active INT
L X X X H X L  X X X X X H X;  No CRGATE on RAM
H L L L H X L  X H H X X L X;  Control Reg => CRGATE
H X X H H X L  X X X X X H X;  No CRGATE on other addresses
H X H X H X L  X X X X X H X;
H H X X H X L  X X X X X H X;

L X X X H L X  X X X X X X L;  BUSGATE on RAM addresses
H L L L H L X  X X X X X X L;  BUSGATE ON Status Reg.
H X X H H L X  X X X X X X H;  No BUSGATE on other addresses
H X H X H L X  X X X X X X H;
H H X X H L X  X X X X X X H;
```

DESCRIPTION  This PAL is used for command decoding on the INCOM
COmputer Network Interface card (CONI) for the IBM PC or XT personal
computers.  It receives the low-order 4 address bits, I/O read and
write and a select signal from the address decoder logic.  It
generates 7 low-true select signals to enable the following gating
functions:
  1. LDMEM - Write enable for transmit buffer
  2. LDMAU - Write enable for master address register - upper
  3. LDMAL - Write enable for master address register - lower
  4. RD-MEM - Output enable for receive buffer read operations
  5. SRGATE - Output enable for status register read
  6. CRGATE - Control register decode enable
  7. BUSGATE - Enable CONI to drive IBM data bus Command : 4 - Assemble PALASM source
0441 Fuses to be blown
 Command : 5 - Simulate function table
0001 XXXXXXXXN0XHHHHHHN
0002 XXXXXX1XN1XXXHHXHN
0003 XXXXX0X1N1XHXXXXXXN
0004 XXXXX1X0N1XHXXXXXXN
0005 XXXXX0X0N1XLXXXXXXN
0006 XXX010110N1XXLXXXXXN
0007 XXXXX010N1XXHXXXXXN
0008 XXXX1X10N1XXHXXXXXN
0009 XXXX0XX10N1XXHXXXXXN
0010 XXX1XXX10N1XXHXXXXXN
0011 XXX100110N1XXXLXXXXN
0012 XXXXX010N1XXXHXXXXN
0013 XXXXX1X10N1XXXHXXXXN
0014 XXXX1XX10N1XXXHXXXXN
0015 XXX0XXX10N1XXXHXXXXN
0016 XXXXX00XN1XXXXLXXXN
0017 XXXXX10XN1XXXXHXXXN
0018 XXXXX00XN1XXXXXHXXN
0019 XXX00010XN1XXHHXLXXN

```
0020 XXX1XX10XN1XXXXXHXXN
0021 XXXX1X10XN1XXXXXHXXN
0022 XXXXX110XN1XXXXXHXXN
0023 XXXXXXXX1N1XXXXXHXXN
0024 XXXXXX0X0N1XXXXXHXXN
0025 XXX0001X0N1XXHHXXLXN
0026 XXX1XX1X0N1XXXXXXHXN
0027 XXXX1X1X0N1XXXXXXHXN
0028 XXXXX11X0N1XXXXXXHXN
0029 XXXXXX00X"  "XXXXXLN
0030 XXX00010."  "XXXXXLN
0031 XXX1XX10XN1XXXXXXHN
0032 XXXX1X10XN1XXXXXXHN
0033 XXXXX110XN1XXXXXXHN
```

Command : A - Display fuse pattern

```
        00          10          20          30
0000    ----------  ----------  ----------  --
0032    ----------  ----------  -X---X----  X-
0064    ---------X  ---X---X--  X----X----  X-
0096    XXXXXXXXXX  XXXXXXXXXX  XXXXXXXXXX  XX
0128    XXXXXXXXXX  XXXXXXXXXX  XXXXXXXXXX  XX
0160    XXXXXXXXXX  XXXXXXXXXX  XXXXXXXXXX  XX
0192    XXXXXXXXXX  XXXXXXXXXX  XXXXXXXXXX  XX
0224    XXXXXXXXXX  XXXXXXXXXX  XXXXXXXXXX  XX
0256    ----------  ----------  ----------  --
0288    ---------X  ---X---X--  X--------X  X-
0320    XXXXXXXXXX  XXXXXXXXXX  XXXXXXXXXX  XX
0352    XXXXXXXXXX  XXXXXXXXXX  XXXXXXXXXX  XX
0384    XXXXXXXXXX  XXXXXXXXXX  XXXXXXXXXX  XX
0416    XXXXXXXXXX  XXXXXXXXXX  XXXXXXXXXX  XX
0448    XXXXXXXXXX  XXXXXXXXXX  XXXXXXXXXX  XX
0480    XXXXXXXXXX  XXXXXXXXXX  XXXXXXXXXX  XX
0512    ----------  ----------  ----------  --
0544    ---------X  ---X---X--  X----X----  X-
0576    XXXXXXXXXX  XXXXXXXXXX  XXXXXXXXXX  XX
0608    XXXXXXXXXX  XXXXXXXXXX  XXXXXXXXXX  XX
0640    XXXXXXXXXX  XXXXXXXXXX  XXXXXXXXXX  XX
0672    XXXXXXXXXX  XXXXXXXXXX  XXXXXXXXXX  XX 00                      20          30
0704    XXXXXXXXXX  XXXXXXXXXX  XXXXXXXXXX  XX
0736    XXXXXXXXXX  XXXXXXXXXX  XXXXXXXXXX  XX
0768    ----------  ----------  ----------  --
0800    ----------  ----------  -X---X----  X-
0832    XXXXXXXXXX  XXXXXXXXXX  XXXXXXXXXX  XX
0864    XXXXXXXXXX  XXXXXXXXXX  XXXXXXXXXX  XX
0896    XXXXXXXXXX  XXXXXXXXXX  XXXXXXXXXX  XX
0928    XXXXXXXXXX  XXXXXXXXXX  XXXXXXXXXX  XX
0960    XXXXXXXXXX  XXXXXXXXXX  XXXXXXXXXX  XX
0992    XXXXXXXXXX  XXXXXXXXXX  XXXXXXXXXX  XX
1024    ----------  ----------  ----------  --
1056    --------X-  ---X---X--  X--------X  X-
1088    XXXXXXXXXX  XXXXXXXXXX  XXXXXXXXXX  XX
1120    XXXXXXXXXX  XXXXXXXXXX  XXXXXXXXXX  XX
1152    XXXXXXXXXX  XXXXXXXXXX  XXXXXXXXXX  XX
```

```
1184  XXXXXXXXX  XXXXXXXX   XXXXXXXX  XX
1216  XXXXXXXXX  XXXXXXXX   XXXXXXXX  XX
1248  XXXXXXXXX  XXXXXXXX   XXXXXXXX  XX
1280  ----------  ----------  ----------  --
1312  ---------X  --X----X--  X--------X  X-
1344  XXXXXXXXX  XXXXXXXX   XXXXXXXX  XX
1376  XXXXXXXXX  XXXXXXXX   XXXXXXXX  XX
       00         10          20         30
1408  XXXXXXXXX  XXXXXXXX   XXXXXXXX  XX
1440  XXXXXXXXX  XXXXXXXX   XXXXXXXX  XX
1472  XXXXXXXXX  XXXXXXXX   XXXXXXXX  XX
1504  XXXXXXXXX  XXXXXXXX   XXXXXXXX  XX
1536  ----------  ----------  ----------  --
1568  ----------  ----------  -X-------X  X-
1600  XXXXXXXXX  XXXXXXXX   XXXXXXXX  XX
1632  XXXXXXXXX  XXXXXXXX   XXXXXXXX  XX
1664  XXXXXXXXX  XXXXXXXX   XXXXXXXX  XX
1696  XXXXXXXXX  XXXXXXXX   XXXXXXXX  XX
1728  XXXXXXXXX  XXXXXXXX   XXXXXXXX  XX
1760  XXXXXXXXX  XXXXXXXX   XXXXXXXX  XX
1792  XXXXXXXXX  XXXXXXXX   XXXXXXXX  XX
1824  XXXXXXXXX  XXXXXXXX   XXXXXXXX  XX
1856  XXXXXXXXX  XXXXXXXX   XXXXXXXX  XX
1888  XXXXXXXXX  XXXXXXXX   XXXXXXXX  XX
1920  XXXXXXXXX  XXXXXXXX   XXXXXXXX  XX
1952  XXXXXXXXX  XXXXXXXX   XXXXXXXX  XX
1984  XXXXXXXXX  XXXXXXXX   XXXXXXXX  XX
2016  XXXXXXXXX  XXXXXXXX   XXXXXXXX  XX
Sumcheck 37E9
```

A.3 U21: Address Decoder

```
INCOM COmputer Network Interface (CONI) Address Decoder
Westinghouse R&D Center       1310 Beulah Rd. Pgh. Pa. 15235
BA0 BA1 BA2 BA3 BA4 BA5 BA6 BA7 BA8 GND
BA9 NC /IRD /IWT BAEN R_CMND NC NC SELECT VCC

;         - - INPUT PINS - -

;         BA0 - BA9:     Buffered Address Bus
;         BAEN:          Buffered Address Enable
;         IRD:           I/O read
;         IWT:           I/O write

;         - - OUTPUT PINS - -

R_CMND = ;                    Reset Command Decode: READ 30A
  /BAEN * IRD * BA9 * BA8 * /BA7 * /BA6 * /BA5 * /BA4 *
                     BA3 * /BA2 * BA1 * /BA0

SELECT = ;                    SELECT to PAL U19
  /BAEN * BA9 * BA8 * /BA7 * /BA6 * /BA5
FUNCTION TABLE
BA9 BA8 BA7 BA6 BA5 BA4 BA3 BA2 BA1 BA0 /BAEN /IRD /IWT
```

R_CMND SELECT

```
;                          R S
;                 /        - E
;                 B / /  C L
;B B B B B B B B B A I I  M E
;A A A A A A A A A E R W  N C
;9 8 7 6 5 4 3 2 1 0 N D T  D T
-----------------------------------------------------
 X X X X X X X X X X L X X  L L;    Active AEN/ inhigits decode
 X X X X X X X X X X H H H  L X;    Inactive IRD/ or /IWT inhibits H H L L L L L X X X H L H  X X;    Valid RAM read H H L L L L H L H L H L X  H X;    Reset Command (read 30A)
 X X X X X X X X X X H H L  L X;    Invalid reset command
 L X X X X X X X X X H L X  L X;    Invalid addresses
 X L X X X X X X X X H L X  L X;
 X X H X X X X X X X H L X  L X;
 X X X H X X X X X X H L X  L X;
 X X X X H X X X X X H L X  L X;
 X X X X X H X X X X H L X  L X;
 X X X X X X L X X X H L X  L X;
 X X X X X X X H X X H L X  L X;
 X X X X X X X X L X H L X  L X;
 X X X X X X X X X H H L X  L X;

H H L L L X X X X X H X X  X H;    Valid select
 L X X X X X X X X X H X X  X L;    Invalid addresses
 X L X X X X X X X X H X X  X L;
 X X H X X X X X X X H X X  X L;
 X X X H X X X X X X H X X  X L;
 X X X X H X X X X X H X X  X L;
-----------------------------------------------------
```

DESCRIPTION This PAL is used for Address decoding on the INCOM COmputer Network Interface card (CONI) for the IBM PC & XT personal computers. It receives the 10 low-order address bits, I/O read and write and AEN. It generates the following 2 address decodes:
1. Reset command
2. A select signal for PAL U19 that decodes addresses 11 000X XXXX Command : 4 - Assemble PALASM source
0110 Fuses to be blown Command : 5 - : ...te function table
0001 XXXXXXXXXXX::LXXLN
0002 XXXXXXXXXXXX::JLXXXN
0003 XXX000001N1X010XXXXN
0004 010100001N1X0X0HXXXN
0005 XXXXXXXXXXXX100LXXXN
0006 XXXXXXXXXX0X0X0LXXXN
0007 XXXXXXXX0NXX0X0LXXXN
0008 XXXXXXX1XNXX0X0LXXXN
0009 XXXXXX1XXNXX0X0LXXXN
0010 XXXXX1XXXNXX0X0LXXXN
0011 XXXX1XXXXNXX0X0LXXXN

```
0012 XXX0XXXXXNXX0X0LXXXN
0013 XX1XXXXXXNXX0X0LXXXN
0014 X0XXXXXXXNXX0X0LXXXN
0015 1XXXXXXXXNXX0X0LXXXN
0016 XXXX0001N1XXX0XXXHN
0017 XXXXXXXXN0XXX0XXXLN
0018 XXXXXXX0NXXXX0XXX1
0019 XXXXXXX1XNXXXX0XX
0020 XXXXXX1XXNXXXX0XXXLN
0021 XXXXX1XXXNXXXX0XXXLN
```

Command : A - Display fuse pattern

```
         00         10         20         30
0000   ----------  ----------  ----------  --
0032   ----------  --------X-X -X---X--X-  X-
0064   XXXXXXXXXX  XXXXXXXXXX  XXXXXXXXXX  XX
0096   XXXXXXXXXX  XXXXXXXXXX  XXXXXXXXXX  XX
0128   XXXXXXXXXX  XXXXXXXXXX  XXXXXXXXXX  XX
0160   XXXXXXXXXX  XXXXXXXXXX  XXXXXXXXXX  XX
0192   XXXXXXXXXX  XXXXXXXXXX  XXXXXXXXXX  XX
0224   XXXXXXXXXX  XXXXXXXXXX  XXXXXXXXXX  XX
0256   XXXXXXXXXX  XXXXXXXXXX  XXXXXXXXXX  XX
0288   XXXXXXXXXX  XXXXXXXXXX  XXXXXXXXXX  XX
0320   XXXXXXXXXX  XXXXXXXXXX  XXXXXXXXXX  XX
0352   XXXXXXXXXX  XXXXXXXXXX  XXXXXXXXXX  XX
0384   XXXXXXXXXX  XXXXXXXXXX  XXXXXXXXXX  XX
0416   XXXXXXXXXX  XXXXXXXXXX  XXXXXXXXXX  XX
0448   XXXXXXXXXX  XXXXXXXXXX  XXXXXXXXXX  XX
0480   XXXXXXXXXX  XXXXXXXXXX  XXXXXXXXXX  XX
0512   XXXXXXXXXX  XXXXXXXXXX  XXXXXXXXXX  XX
0544   XXXXXXXXXX  XXXXXXXXXX  XXXXXXXXXX  XX
0576   XXXXXXXXXX  XXXXXXXXXX  XXXXXXXXXX  XX
0608   XXXXXXXXXX  XXXXXXXXXX  XXXXXXXXXX  XX
0640   XXXXXXXXXX  XXXXXXXXXX  XXXXXXXXXX  XX
0672   XXXXXXXXXX  XXXXXXXXXX  XXXXXXXXXX  XX
         00                    20         30
0704   XXXXXXXXXX  XXXXXXXXXX  XXXXXXXXXX  XX
0736   XXXXXXXXXX  XXXXXXXXXX  XXXXXXXXXX  XX
0768   ----------  ----------  ----------  --
0800   X--X-X--X-  ---X---X-X  -X---X-XX-  X-
0832   XXXXXXXXXX  XXXXXXXXXX  XXXXXXXXXX  XX
0864   XXXXXXXXXX  XXXXXXXXXX  XXXXXXXXXX  XX
0896   XXXXXXXXXX  XXXXXXXXXX  XXXXXXXXXX  XX
0928   XXXXXXXXXX  XXXXXXXXXX  XXXXXXXXXX  XX
0960   XXXXXXXXXX  XXXXXXXXXX  XXXXXXXXXX  XX
0992   XXXXXXXXXX  XXXXXXXXXX  XXXXXXXXXX  XX
1024   XXXXXXXXXX  XXXXXXXXXX  XXXXXXXXXX  XX
1056   XXXXXXXXXX  XXXXXXXXXX  XXXXXXXXXX  XX
1088   XXXXXXXXXX  XXXXXXXXXX  XXXXXXXXXX  XX
1120   XXXXXXXXXX  XXXXXXXXXX  XXXXXXXXXX  XX
1152   XXXXXXXXXX  XXXXXXXXXX  XXXXXXXXXX  XX
1184   XXXXXXXXXX  XXXXXXXXXX  XXXXXXXXXX  XX
1216   XXXXXXXXXX  XXXXXXXXXX  XXXXXXXXXX  XX
1248   XXXXXXXXXX  XXXXXXXXXX  XXXXXXXXXX  XX
1280   XXXXXXXXXX  XXXXXXXXXX  XXXXXXXXXX  XX
```

| | 00 | 10 | 20 | 30 |
|---|---|---|---|---|
| 1312 | XXXXXXXX | XXXXXXXX | XXXXXXXX | XX |
| 1344 | XXXXXXXX | XXXXXXXX | XXXXXXXX | XX |
| 1376 | XXXXXXXX | XXXXXXXX | XXXXXXXX | XX |
| | 00 | 10 | 20 | 30 |
| 1408 | XXXXXXXX | XXXXXXXX | XXXXXXXX | XX |
| 1440 | XXXXXXXX | XXXXXXXX | XXXXXXXX | XX |
| 1472 | XXXXXXXX | XXXXXXXX | XXXXXXXX | XX |
| 1504 | XXXXXXXX | XXXXXXXX | XXXXXXXX | XX |
| 1536 | XXXXXXXX | XXXXXXXX | XXXXXXXX | XX |
| 1568 | XXXXXXXX | XXXXXXXX | XXXXXXXX | XX |
| 1600 | XXXXXXXX | XXXXXXXX | XXXXXXXX | XX |
| 1632 | XXXXXXXX | XXXXXXXX | XXXXXXXX | XX |
| 1664 | XXXXXXXX | XXXXXXXX | XXXXXXXX | XX |
| 1696 | XXXXXXXX | XXXXXXXX | XXXXXXXX | XX |
| 1728 | XXXXXXXX | XXXXXXXX | XXXXXXXX | XX |
| 1760 | XXXXXXXX | XXXXXXXX | XXXXXXXX | XX |
| 1792 | XXXXXXXX | XXXXXXXX | XXXXXXXX | XX |
| 1824 | XXXXXXXX | XXXXXXXX | XXXXXXXX | XX |
| 1856 | XXXXXXXX | XXXXXXXX | XXXXXXXX | XX |
| 1888 | XXXXXXXX | XXXXXXXX | XXXXXXXX | XX |
| 1920 | XXXXXXXX | XXXXXXXX | XXXXXXXX | XX |
| 1952 | XXXXXXXX | XXXXXXXX | XXXXXXXX | XX |
| 1984 | XXXXXXXX | XXXXXXXX | XXXXXXXX | XX |
| 2016 | XXXXXXXX | XXXXXXXX | XXXXXXXX | XX |

Sumcheck 0EA6

A.4 U8: INCC  ..encer

```
COmputer Network I. .erface (CONI) INCOM interface sequencer
Westinghouse R&D Center     1310 Beulah Rd.  Pgh. Pa.   15235
CLK FF DATA INT /BUSY RXCTL XMTREQ Z /R GND
/OE ICC /LC /A /B /C /D RW CL VCC

- - STATE DEFINITIONS - -
;      STATE f-f's     D, C, B, A
;      [0000]   :      IDLE
;      [1000]   :      R-EC (RECEIVE ENABLE COUNTER)
;      [1010]   :      R-C  (RECEIVE CLEAR)
;      [0110]   :      X-EC (XMT ENABLE COUNTER)
;      [0111]   :      X-W  (XMT WAIT)
;      [0101]   :      X-C  (XMT  .AR)

- - INPUT PINS - -
;      FF:     Counter =
;      DATA:   INCOM s. .nized DATA
;      INT:    INCOM synchronized INT
;      /BUSY:  INCOM synchronized /BUSY
;      RXCTL:  Synchronized RxCTL bit 1 => buffer available to INCOM
;      XMTREQ: Synchronized XMTREQ bit
;      /R:     Synchronized /RESET

- - STATE f-f INPUT EQUATIONS - -
```

```
A :=    ;
 /R */D * C * B */A * FF +;              ;       -> X-W
 /R */D * C * B * A;                     X-W -> X-C & X-W

B :=    ;
 /R * D */C */B */A * FF +;              R-EC -> R-C
 /R */D */C */B */A * XMTREQ */BUSY */INT +;   IDLE -> X-EC IF NO RCV.
 /R */D */C */B */A * XMTREQ */BUSY */DATA +;       "
 /R */D */C */B */A * XMTREQ */BUSY */RXCTL +;      "
 /R */D * C * B */A +;                   X-EC -> X-EC & X-W
 /R */D * C * B * A */INT;               X-W -> X-W

C :=    ;
 /R */D */C */B */A * XMTREQ */BUSY */INT +;   IDLE -> X-EC IF NO RCV.
 /R */D */C */B */A * XMTREQ */BUSY */DATA +;       "
 /R */D */C */B */A * XMTREQ */BUSY */RXCTL +;      "
 /R */D * C * B */A +;                   X-EC -> X-EC & X-W
 /R */D * C * B * A;                     X-W -> X-W & X-C

D :=    ;
 /R */D */C */B */A * INT * DATA * RXCTL +;  IDLE -> R-EC
 /R * D */C */B */A;                     R-EC -> R-EC & R-C

;       - - OUTPUT PINS - -
;       ICC:    INCOM clock control
;       /LC:    Load value to counter. Low => "long count"
;       RW:     Read/write* to INCOM
;       CL:     Count/load* to counter
;       /P14:   State f-f "/A"
;       /P15:   State f-f "/B"
;       /XMT:   State f-f "/C": Transmit output
;       /RCV:   State f-f "/D": Receive output

;       - - COMBINATORIAL OUTPUTS - -

/ICC =  ;                                ICC=0:
 /D */C */B */A +;                       IDLE
  D */C * B */A +;                       R-C
 /D * C * B * A;                         X-W

LC =    ;                                /LC=0:
 /R */D */C */B */A * INT * DATA * RXCTL;  If next state is receive /RW =   ;                                RW=0:
  D */C * B */A +;                       R-C
 /D * C * B */A;                         X-EC /CL =   ;                                CL=0:
 /D */C */B */A +;                       IDLE
 /D * C * B * A +;                       X-WC
 /D * C */B * A +;                       X-C
  D */C * B */A;                         R-C FUNCTION TABLE
/OE CLK /R FF DATA INT /BUSY RXCTL XMTREQ
/D /C /B /A ICC /LC RW CL
```

```
;                X
;              / R X
;        D   B X T
;/ C    A I U C R           I /
;O L / F T N S T E / / / /  C L R C
;E K R F A T Y L Q D C B A  C C W L
-----------------------------------------------------------------
  L C L L L L H L L  H H H H  L H H L;  Reset sequencer into IDLE
  L C H L L L H L L  H H H H  L H H L;  Remain in IDLE L L H L H H H H L  H H H H  L L H L;  Initiate receive cycle /LC=0
  L C H L H H H H L  L H H H  H H H H;  R-EC
  L C H L X X X X L  L H H H  H H H H;  Stay in R-EC until counter = FF
  L C H L X X X X L  L H H H  H H H H;
  L C H H X X X X L  L H L H  L H L L;  Counter = FF adv to R-C
  L C H L L L H L L  H H H H  L H H L;  Adv to IDLE L C H L L L H L L  H H H H  L H H L;  Check RXCTL=0 inhibits Rx cycle
  L C H L H H H L L  H H H H  L H H L;  Stay in IDLE
  L C H L L L H L L  H H H H  L H H L;

L C H L L L H H H  H L L H  H H L H;  Initiate transmit cycle -> X-EC
  L C H L X X H X X  H L L H  H H L H;  Stay in X-EC until counter = FF
  L C H L X X H X X  H L L H  H H L H;
  L C H H X X H X X  H L L L  L H H L;  Counter = FF adv to X-W
  L C H L L L L X L  H L L L  L H H L.  Stay in X-W until interrupt
  L C H L L L L X L  H L L L  L H H L;
  L C H L L H H X L  H L H L  H H H L;  Interrupt adv to X-C
  L C H L L L H H L  H H H H  L H H L;  Adv to IDLE
  L C H L L L H H L  H H H H  L H H L;  Remain in IDLE L C H L H H H H H  L H H H  H H H H;  Arbitration of simultaneous
  L C H L X X X X X  L H H H  H H H H;    receive & transmit requests -
  L C H L X X X X X  L H H H  H H H H;    receive should win L C L X X X X X X  H H H H  L H H L;  Reset out of receive seq.

L C L L L L L H H L  H H H H  L H H L;  Reset to IDLE
  H L H L L L H H L  Z Z Z Z  X X X X;  Check Output Enable
  L L H L L L H H L  H H H H  L H H L;  No transition from IDLE
-----------------------------------------------------------------
```

DESCRIPTION  This PAL implements the INCOM interface sequencer on
the INCOM COmputer Network Interface card (CONI) for the IBM PC or
XT personal computers. All inputs must be synchronized with the PAL
clock to avoid meta-stability problems. It receives 3 signals from
the INCOM chip, a counter = FF signal from the external bit counter,
and two control bits that interface with the IBM driver software.

It generates 4 state outputs and 4 combinatorial outputs to control
various external events. Six states are implemented in the sequencer.
A single IDLE state advances to a receive sequence or a transmit
sequence. Two states implement the receive sequencer, while three
are used for transmit.

Command : 4 - Assemble PALASM source
0785 Fuses to be blown

Command : 5 - Simu.   .nction table

```
0001 C000100X0NOLHH:
0002 C000100X1NOLHH:
0003 0011110X1NOLLHH:
0004 C011110X1NOHHHH:
0005 C0XXXX0X1NOHHHHHLHH
0006 C0XXXX0X1NOHHHHLHHN
0007 C1XXXX0X1NOLHHLHLLLN
0008 C000100X1NOLHHHHHLN
0009 C000100X1NOLHHHHHHLN
0010 C011100X1NOLHHHHHLN
0011 C000100X1NOLHHHHHLN
0012 C000111X1NOHHHLLHLHN
0013 C0XX1XXX1NOHHHLLHLHN
0014 C0XX1XXX1NOHHHLLHLHN
0015 C1XX1XXX1NOLHLLLHHLN
0016 C0000X0X1NOLHLLLHHLN
0017 C0000X0X1NOLHLLLHHLN
0018 C0011X0X1NOHHLHLHHLN
0019 C000110X1NOLHHHHHLN
0020 C000110X1NOLHHHHHLN
0021 C011111X1NOHHHHHLHHN
0022 C0XXXXXX1NOHHHHHLHHN
0023 C0XXXXXX1NOHHHHHLHHN
0024 CXXXXXX0NOLHHHHHLN
0025 C000110X0NOLHHHHHLN
0026 0000110X1N1XXZZZZXXN
0027 0000110X1NOLHHHHHLN
```

Command : A - Display fuse pattern

```
           00          10          20          30
0000   ----------  ----------  ----------  --
0032   ----------  X---X---X-  --X-------  --
0064   ----------  X----X---X  ---X------  --
0096   ----------  X----X--X-  ---X------  --
0128   ----------  -X--X----X  --X-------  --
0160   XXXXXXXXXX  XXXXXXXXXX  XXXXXXXXXX  XX
0192   XXXXXXXXXX  XXXXXXXXXX  XXXXXXXXXX  XX
0224   XXXXXXXXXX  XXXXXXXXXX  XXXXXXXXXX  XX
0256   ----------  ----------  ----------  --
0288   ----------  -X--X----X  --X-------  --
0320   ----------  X----X---X  --X-------  --
0352   XXXXXXXXXX  XXXXXXXXXX  XXXXXXXXXX  XX
0384   XXXXXXXXXX  XXXXXXXXXX  XXXXXXXXXX  XX
0416   XXXXXXXXXX  XXXXXXXXXX  XXXXXXXXXX  XX
0448   XXXXXXXXXX  XXXXXXXXXX  XXXXXXXXXX  XX
0480   XXXXXXXXXX  XXXXXXXXXX  XXXXXXXXXX  XX
0512   ----X---X-  X---X-X-X-  --X-----X-  --
0544   ----------  -X--X---X-  --X-----X-  --
0576   XXXXXXXXXX  XXXXXXXXXX  XXXXXXXXXX  XX
0608   XXXXXXXXXX  XXXXXXXXXX  XXXXXXXXXX  XX
0640   XXXXXXXXXX  XXXXXXXXXX  XXXXXXXXXX  XX
0672   XXXXXXXXXX  XXXXXXXXXX  XXXXXXXXXX  XX
           00                      20          30
0704   XXXXXXXXXX      XXXXX   XXXXXXXXXX  XX
```

```
0736  XXXXXXXXXX  XXXXXX      XXXXXXXXXX  XX
0768  ---------X  (-X---X-    X-X-----X-  --
0800  -----X----  (-X-X---X-  X-X-----X-  --
0832  ----------  (-X-X--XX-  X-X-----X-  --
0864  ----------  X----X---X  --X-----X-  --
0896  ----------  X----X---X  ---X----X-  --
0928  XXXXXXXXXX  XXXXXXXXXX  XXXXXXXXXX  XX
0960  XXXXXXXXXX  XXXXXXXXXX  XXXXXXXXXX  XX
0992  XXXXXXXXXX  XXXXXXXXXX  XXXXXXXXXX  XX
1024  X---------  -X--X---X-  --X-----X-  --
1056  ---------X  X-X-X---X-  X-X-----X-  --
1088  -----X----  X-X-X---X-  X-X-----X-  --
1120  ----------  X-X-X--XX-  X-X-----X-  --
1152  ----------  X----X---X  --X-----X-  --
1184  ---------X  X----X---Y  ---X----X-  --
1216  XXXXXXXXXX  XXXX        XXXXX       XX
1248  XXXXXXXXXX  XXXX        XXXXXXXXXX  XX
1280  X---------  X----X---X  --X-----X-  --
1312  ----------  X----X---X  ---X----X-  --
1344  XXXXXXXXXX  XXXXXXXXXX  XXXXXXXXXX  XX
1376  XXXXXXXXXX  XXXXXXXXXX  XXXXXXXXXX  XX
      00          10          20          30
1408  XXXXXXXXXX  XXXXXXXXXX  XXXXXXXXXX  XX
1440. XXXXXXXXXX  XXXXXXXXXX  XXXXXXXXXX  XX
1472  XXXXXXXXXX  XXXXXXXXXX  XXXXXXXXXX  XX
1504  XXXXXXXXXX  XXXXXXXXXX  XXXXXXXXXX  XX
1536  ----------  ----------  ----------  --
1568  ----X---X-  X---X-X-X-  --X-----X-  --
1600  XXXXXXXXXX  XXXXXXXXXX  XXXXXXXXXX  XX
1632  XXXXXXXXXX  XXXXXXXXXX  XXXXXXXXXX  XX
1664  XXXXXXXXXX  XXXXXXXXXX  XXXXXXXXXX  XX
1696  XXXXXXXXXX  XXXXXXXXXX  XXXXXXXXXX  XX
1728  XXXXXXXXXX  XXXXXXXXXX  XXXXXXXXXX  XX
1760  XXXXXXXXXX  XXXXXXXXXX  XXXXXXXXXX  XX
1792  ----------  ----------  ----------  --
1824  ----------  X---X---X-  --X-------  --
1856  ----------  -X--X----X  --X-------  --
1888  ----------  X----X---X  ---X------  --
1920  XXXXXXXXXX  XXXXXXXXXX  XXXXXXXXXX  XX
1952  XXXXXXXXXX  XXXXXXXXXX  XXXXXXXXXX  XX
1984  XXXXXXXXXX  XXXXXXXXXX  XXXXXXXXXX  XX
2016  XXXXXXXXXX  XXXXXXXXXX  XXXXXXXXXX  XX
Sumcheck 5FD0
```

Appendix B

```
                   INCOM COMMUNICATION MODULE (ICM)
                      COPYRIGHT   1984   BY
                   WESTINGHOUSE ELECTRIC CORPORATION 0000          cseg       segment para public 'code'
                 DRIVER EQUATES
                 REQUEST HEADER IMAGE
```

```
= 0000          req_head_base     equ    0                    ; start of request header
= 0001          rh_unit_code      equ    req_head_base+1      ; unit code in request header
= 0002          rh_cmd_code       equ    rh_unit_code+1       ; command code passed by operating system
= 0003          rh_status         equ    rh_cmd_code+1        ; status return to operating system
                ;
                ;   INIT REQUEST HEADER PARAMITERS
                ;
= 000D          num_units         equ    req_head_base+13 ;
= 000E          end_addr_offset   equ    num_units+1
= 0010          end_addr_seg      equ    end_addr_offset+2
                ;
                ;   INPUT OUTPUT HEADER PARAMITERS
                ;
= 000D          med_discp         equ    req_head_base+13 ;
= 000E          trans_addr_ofst   equ    med_discp+1
= 0010          trans_addr_seg    equ    trans_addr_ofst+2 ;
= 0012          byte_count        equ    trans_addr_seg+2 ;
                ;
                ;   TIMER TICK VECTOR
                ;
= 0000          vector_segment    equ    0000h                ; segment interrupt vectors are located
= 0070          tick_vec_ofst     equ    1ch*4                ; timer tick vector offset position
= 0072          tick_vec_seg      equ    tick_vec_ofst+2 ;    timer tick vector seg position
                ;
                ;   CONI CARD VECTOR
                ;
= 0008          int_cont_ofset    equ    08h                  ; interrupt controller base vector ( int 4 )
= 000B          incom_vec         equ    int_cont_ofset+3 ;   coni card vector number
= 002C          incom_vec_ofst    equ    incom_vec*4          ; coni card interrupt vector offset position
= 002E          incom_vec_seg     equ    incom_vec_ofst+2 ;   coni card interrupt vector segment
                ;
= 0021          system            equ    21h                  ; system call
= 0025          set_vec           equ    25h                  ; set interrupt vector command
= 0020          int_ctrl_port     equ    20h                  ; interrupt control port
= 0021          int_mask_port     equ    21h                  ; interrupt mask port
= 00F7          enable_int_3      equ    11110111b            ; enable interrupt mask
= 0020          eoi_cmd           equ    20h                  ; end of interrupt service reset
                ;
                ;   ASSEMBLY FUNCTION EQUATES
                ;
= 014C          funct_dum_off     equ    53h*4                ; dummy assembly function dummy offset ( int vector # 53 )
= 014E          funct_seg_ptr     equ    funct_dum_off+2 ;    assembly function segment pointer
= 0150          funct_rd_offset   equ    54h*4                ; pointer to read function ( offset ) ( int vector # 54 )
                                                              ; seg = [funct_seg_ptr]
= 0152          funct_wr_offset   equ    funct_rd_offset+2 ;  pointer to write funtion ( offset )
                                                              ; seg = [funct_seg_ptr]
= 0004          input_cmd         equ    04h                  ; input command funtion code
= 0008          output_cmd        equ    08h                  ; output command funtion code
                ;
                ;
                ;   GENERAL EQUATES
                ;
= 0300          coni_base         equ    0300h                ; coni card port base address
= 0300          tx_ctl_bit_port   equ    coni_base+0
= 0301          tx_data_1_port    equ    coni_base+1
= 0302          tx_data_2_port    equ    coni_base+2
= 0303          tx_data_3_port    equ    coni_base+3
= 0304          rx_stat_port      equ    coni_base+4
= 0305          rx_data_1_port    equ    coni_base+5
= 0306          rx_data_2_port    equ    coni_base+6
= 0307          rx_data_3_port    equ    coni_base+7
= 0308          coni_ctrl_port    equ    coni_base+8
= 0308          baud_port         equ    coni_base+8
= 0308          coni_stat_port    equ    coni_base+8
= 0309          addr_port         equ    coni_base+9          ; coni card msb address port
= 030A          reset_port        equ    coni_base+10
                ;
= 00FF          lsb_dflt_addr     equ    0ffh                 ; lsb of default master address
= 000F          msb_dflt_addr     equ    0fh                  ; msb of default master address
= 0080          baud_1200         equ    10000000b
= 00C0          baud_300          equ    11000000b
= 0040          baud_38_4khz      equ    01000000b
= 0000          baud_unchanged    equ    00000000b
=               baud_default      equ    baud_1200
= 0002          rx_ack            equ    00000010b            ; acknowlege rececption from coni card
= 0008          rx_msg_rxed       equ    00001000b            ; message rx-ed mask
= 0004          tx_ready          equ    00000100b            ; transmitter ready for another message mask
= 00C0          rx_stat_mask      equ    11000000b            ; receive mask to strip off unused bits
= 0001          tx_transmit       equ    00000001b            ; transmit data command to coni card
= 0001          rx_resp_req       equ    00000001b            ; response request mask
= 0004          retries           equ    00000100b            ; retry mask
= 0004          of_error          equ    00000100b            ; overflow error
= 00FF          fault             equ    0ffh                 ; fault code
= 00FF          indef_time        equ    0ffh                 ; indefinate timeout
= 0040          bch_error         equ    01000000b            ; bch error mask
= 0001          msg_rx            equ    00000001b            ; message rx-ed - valid message
= 0000          msg_not_rx        equ    00000000b            ; message not received - rx buffer empty
= 0002          all_rx            equ    00000010b            ; all messages rx-ed
= 0010          bch_fault         equ    00010000b            ; bch fault code
= 0008          timeout_fault     equ    00001000b            ; timeout fault mask
= 0002          time_out_mask     equ    00000010b            ; time out mask
= 8003          unknown_cmd       equ    8003h                ; timeout error code to dos [ unknown command code 3 ]
= 8002          busy_error        equ    8002h                ; timeout error for buffer full [ device not ready code 2 ]
```

```
= 0024                       tx_time       equ    36              ; 36 * 55 msec. = 2 sec. timeout
= 00B6                       tx_error_tm   equ    182             ; 182 * 55 msec. = 10 sec. timeout
= 00FF                       busy          equ    0ffh            ; busy flag
= 0000                       clear         equ    00h             ; tx clear to transmitt code
                             ;
= 0020                       rx_max_msgs   equ    32              ; maximum number of rx messages
= 0004                       rx_msg_len    equ    4               ; rx message length in bytes
                             ;
= 0008                       tx_msg_len    equ    8               ; tx message length in bytes
= 0020                       tx_max_msgs   equ    32              ; maximum number of tx messages
                             ;
                             ;
                                           assume cs:cseg,es:nothing,ds:cseg
0000                         begin:
= 0000                       start         equ    $
                             ;
                             ;    SPECIAL DEVICE HEADER
                             ;
0000  FF FF FF FF            next_dev      dd     -1              ; next device driver
0004  8000                   attribute     dw     8000h           ; char. device
0006  0560 R                 strategy      dw     dev_strategy    ; pointer to device strategy
0008  0568 R                 interrupt     dw     dev_interrupt   ; pointer to device interrupt handler
000A  49 4E 43 4F 4D 4E      dev_name      db     'INCOMNET'      ; device name
      45 54
                             ;
0012  0000                   rh_offset     dw     0               ; request header offset
0014  0000                   rh_seg        dw     0               ; request header segment
0016  0000                   stack_seg     dw     0               ; machine stack storage buffer
0018  0000                   stack_offset  dw     0               ;
                             ;
001A  0000                   incom_int_ct  dw     0               ; number of times comi card interrupted driver
001C  0000                   timer_tk_ct   dw     0               ; number of times timer tick interrupted
001E  00                     comi_flag     db     0               ; if comi card interrupts then = nz
                             ;
001F  0000                   rx_next_in    dw     0               ;
0021  0000                   rx_next_out   dw     0               ;
0023  00                     rx_count      db     0               ; number of messages rx-ed
0024  00                     rx_buffer_ct  db     0               ; number of messages in buffer
0025  00                     rx_timer      db     0               ; receiver timeout timer
0026  00                     rx_time_out   db     0               ; buffer of for rx timeout
0027  00                     rx_fault      db     0               ; rx timeout fault nz = fault
0028  00                     rx_reset      db     0               ; receiver timer reset flag nz = reset rx timers
0029  00                     rx_ret_msgs   db     0               ; number of rx messages accepted
                             ;
002A  80 [                   rx_buffer     db     rx_max_msgs*rx_msg_len dup (0) ; received message storage buffer
         00
        ]
                             ;
00AA                         rx_buffer_end label  byte            ;
                             ;
00AA  00                     rx_out_count  db     0               ; bytes sent to app. pgm
00AB  03 [                   rx_out_buffer db     3 dup (0)       ; message currently being sent to app. pgm
         00
        ]
00AE  00                     rx_ot_buff_stat db   0
                             ;
00AF  00                     tx_count      db     0               ; tx_in_bufffer byte count
00B0  00                     tx_timer      db     0               ; tx message timer
00B1  00                     tx_fault      db     0               ; tx timeout fault nz = fault
00B2  00                     tx_full_timer db     0               ; tx buffer full timeout - after timeout send error to dos
00B3  00                     tx_busy       db     0               ; transmitter busy flag nz = busy
00B4  00                     tx_clear      db     0               ; z = clear to transmit
00B5  00                     tx_retries    db     0               ; number of tx retries after timeout
00B6  0000                   tx_next_in    dw     0
00B8  0000                   tx_next_out   dw     0
00BA  00                     tx_buffer_cnt db     0               ; number of tx messages in buffer
                             ;
00BB  08 [                   tx_in_buffer  db     tx_msg_len dup (0) ; buffer for bytes coming from application pgm.
         00
        ]
00C3  0100 [                 tx_buffer     db     tx_msg_len*tx_max_msgs dup (0) ; tx que buffer
         00
        ]
                             ;
01C3                         tx_buffer_end label  byte            ;
                             ;
01C3  43 6F 70 79 72 69      copyright     db     'Copyright '
      67 68 74 20
01CD  57 65 73 74 69 6E                    db     'Westinghouse '
      67 68 6F 75 73 65
      20
01DA  45 6C 65 63 74 72                    db     'Electric Corp. '
      69 63 20 43 6F 72
      70 2E 20
01E9  31 39 38 34                          db     '1984'
                             ;
01ED  64 [                   stack_start   db     100 dup (0)
         00
        ]
```

```
251                          local_stack     label   byte            ; local stack
                             ;
251     64 [                 aux_stk_start   db      100 dup (0)     ; auxilary stack for function calls
            00
              ]

285                          aux_stack       label   byte            ; top of aux stack
285     0000                 temp_stk_off    dw      0               ; tempory stack pointer storage
287     0000                 temp_stk_seg    dw      0               ;
289     08 [                 temp_buff       db      8 dup (0)       ; tempory buffer for function call data transfer
            00
              ]

;
                             ;               ASSEMBLY FUNCTION DATA HEADERER
                             ;
2C1     02 [                 funct_header    db      2 dup (0)       ; base address of header
            00
              ]

2C3     00                   funct_cmd       db      0               ; command code to be passed to driver
2C4     0000                 funct_stat      dw      0               ; status message - set by driver
2C6     09 [                                 db      9 dup (0)       ; unused fields
            00
              ]

2CF     0289 R               funct_data_off  dw      temp_buff       ; pointer to data to be transferred to driver
2D1     0000                 funct_data_seg  dw      0               ;
2D3     0000                 funct_txr_count dw      0               ; number of bytes to transfer to and from driver
                             ;
                             ;
                             ;       FUNCTION TABLE
                             ;
2D5     05AE R               function_tbl    dw      init            ; initialization
2D7     0642 R                               dw      media_check     ; media check - not supported
2D9     0642 R                               dw      build_bpb       ; build bpb - not supported
2DB     0642 R                               dw      ioctl_in        ; ioctl input - not supported
2DD     0658 R                               dw      input           ; input read
2DF     0658 R                               dw      nd_input        ; non-destructive input no wait
2E1     0656 R                               dw      in_stat         ; input status
2E3     0642 R                               dw      in_flush        ; input flush- not supported
2E5     06E1 R                               dw      output          ; output
2E7     06E1 R                               dw      out_verify      ; output write with verify
2E9     0649 R                               dw      out_stat        ; output status
2EB     0642 R                               dw      out_flush       ; output flush - not supported
2ED     0642 R                               dw      ioctl_out       ; ioctl output - not supported ;       INTERRUPT PROCEDURES
                             ;
2EF     FA                   timer_tick:     cli
2F0     1E                                   push    ds              ; system timer interrupt calls here
2F1     0E                                   push    cs
2F2     1F                                   pop     ds 2F3     80 3E 0082 R 00                      cmp     tx_full_timer,0 ; is error timer zero now ?
2F8     74 04                                je      tim_tk_1        ; yes - then ignore 2FA     FE 0E 0082 R                         dec     tx_full_timer   ; no - then decrement timer 2FE     80 3E 0025 R FF      tim_tk_1:       cmp     rx_timer,indef_time ; check timers - is timer set for indef. timeout ?
303     74 3A                                je      tim_tk_3        ; yes then do not dec. timer 305     80 3E 0025 R 00                      cmp     rx_timer,0      ; is timer already zero ?
30A     74 33                                je      tim_tk_3        ; yes - then do tx timer 30C     FE 0E 0025 R                         dec     rx_timer        ; no - then dec timer
310     75 20                                jnz     tim_tk_3        ; jmp if not zero yet 312     80 3E 0085 R 00                      cmp     tx_retries,0    ; are there any retries ?
317     74 17                                je      tim_tk_2        ; no - then set fault 319     50                                   push    ax              ; yes - then resend the command
31A     52                                   push    dx
31B     8A 0308                              mov     dx,comi_ctrl_port
31E     B0 01                                mov     al,tx_transmit
320     EE                                   out     dx,al
321     A0 0026 R                            mov     al,rx_time_out  ; reinit timeout timer
324     A2 0025 R                            mov     rx_timer,al
327     FE 0E 0085 R                         dec     tx_retries      ; decrement retry counter
32B     5A                                   pop     dx
32C     58                                   pop     ax
32D     EB 22 90                             jmp     tim_tk_end      ; and exit 330     C6 06 0027 R FF      tim_tk_2:       mov     rx_fault,fault  ; now zero so set fault
335     C6 06 0083 R 00                      mov     tx_busy,0       ; reset busy flag
33A     C6 06 0026 R 00                      mov     rx_time_out,0   ; clear retry timeout 33F     80 3E 0080 R 00      tim_tk_3:       cmp     tx_timer,0      ; tx timer already zero ?
344     74 0B                                je      tim_tk_end      ; yes then exit
```

```
0346  FE 0E 0080 R                        dec    tx_timer         ; timer zero ?
034A  75 05                               jnz    tim_tk_end       ; no - then exit
                            ;
034C  C6 06 0081 R FF                     mov    tx_fault,fault   ; now zero - so set fault
                            ;
0351  1F              tim_tk_end:         pop    ds               ; restore stack and exit
0352  FB                                  sti
0353  CF                                  iret
                            ;
0354  FA              coni_int:           cli
0355  1E                                  push   ds
0356  50                                  push   ax
0357  52                                  push   dx
0358  0E                                  push   cs
0359  1F                                  pop    ds
035A  BA 0308                             mov    dx,coni_stat_port ; get coni card status
035D  EC                                  in     al,dx
035E  A8 08                               test   al,rx_msg_rxed   ; has a message been received ?
0360  74 03                               jz     coni_int_1       ; no - then check if tx is ready
                            ;
0362  E8 0388 R                           call   get_rx_msg       ; yes - then get incoming message
                            ;
0365  A8 04           coni_int_1:         test   al,tx_ready      ; is the coni card ready to accept another message ?
0367  74 05                               jz     coni_int_2       ; no - then check for tx_clear
                            ;
0369  C6 06 0084 R 00                     mov    tx_clear,clear   ; set transmitter ready to send
                            ;
036E  80 3E 0083 R FF coni_int_2:         cmp    tx_busy,busy     ; are there any impending receive messages coming in ?
0373  74 0A                               je     coni_int_end     ; yes - then exit
                            ;
0375  80 3E 0084 R 00                     cmp    tx_clear,clear   ; no - coni card ready to take another message ?
037A  75 03                               jne    coni_int_end     ; no - then exit
                            ;
037C  E8 0401 R                           call   proc_command     ; yes - then send another one out
037F  B0 20           coni_int_end:       mov    al,eoi_cmd       ; yes - then reset interrupt controller
0381  E6 20                               out    int_ctrl_port,al ;
0383  5A                                  pop    dx
0384  58                                  pop    ax
0385  1F                                  pop    ds
0386  FB                                  sti
0387  CF                                  iret
                            ;
                            ;
                            ;
0388  50              get_rx_msg:         push   ax               ; get message from coni card
0389  53                                  push   bx
038A  51                                  push   cx
038B  52                                  push   dx
038C  57                                  push   di
038D  80 3E 0024 R 20                     cmp    rx_buffer_ct,rx_max_msgs ; is buffer full ?
0392  72 11                               jb     get_rx_msg_1     ; no - then take data
                            ;
0394  BA 0308                             mov    dx,coni_ctrl_port ; yes - then clear port
0397  B0 02                               mov    al,rx_ack
0399  EE                                  out    dx,al
                            ;
039A  8B 1E 0021 R                        mov    bx,rx_next_out   ; set overflow error
039E  80 4F 03 04                         or     byte ptr[bx][3],of_error
03A2  EB 57 90                            jmp    get_rx_msg_end   ; and exit
                            ;
03A5  8B 3E 001F R    get_rx_msg_1:       mov    di,rx_next_in    ; save the incoming message in buffer
03A9  BA 0304                             mov    dx,rx_stat_port
03AC  EC                                  in     al,dx            ; get status and control bit
03AD  24 C0                               and    al,rx_stat_mask  ; strip off unused bits
03AF  8A E0                               mov    ah,al
03B1  42                                  inc    dx               ; point to data ports
03B2  B9 0003                             mov    cx,3             ; number of bytes to get and store
                            ;
03B5  EC              get_rx_msg_2:       in     al,dx
03B6  88 05                               mov    [di],al
03B8  47                                  inc    di
03B9  42                                  inc    dx               ; point to next data port
03BA  E2 F9                               loop   get_rx_msg_2
                            ;
03BC  B0 02                               mov    al,rx_ack
03BE  EE                                  out    dx,al            ; acknowledge reception
03BF  80 CC 01                            or     ah,msg_rx        ; set 1 message rx-ed
03C2  FE 06 0024 R                        inc    rx_buffer_ct
03C6  FE 06 0023 R                        inc    rx_count
03CA  A0 0023 R                           mov    al,rx_count
03CD  3A 06 0029 R                        cmp    al,rx_ret_msgs   ; have all messages been rx-ed ?
03D1  72 17                               jb     get_rx_msg_3     ; no then wait
                            ;
                                                                  ; yes - then end reception
03D3  80 CC 02                            or     ah,all_rx        ; set all messages rx-ed
03D6  C6 06 0023 R 00                     mov    rx_count,0       ; reset message count
03DB  C6 06 0025 R 00                     mov    rx_timer,0       ; reset rx timer
03E0  C6 06 0026 R 00                     mov    rx_time_out,0    ;
03E5  C6 06 0083 R 00                     mov    tx_busy,0        ; reset busy flag
                            ;
03EA  88 25           get_rx_msg_3:       mov    [di],ah          ; store status of message rxed
03EC  47                                  inc    di
03ED  81 FF 00AA R                        cmp    di,offset rx_buffer_end ; are we at the end of buffer ?
03F1  72 04                               jb     get_rx_msg_4     ; no - then store new buffer start
```

```
03F3  8D 3E 002A R                    lea    di,rx_buffer
                          ;
03F7  89 3E 001F R       get_rx_msg_4: mov   rx_next_in,di    ; save new buffer pointer
03FB  5F                 get_rx_msg_end: pop di
03FC  5A                               pop    dx
03FD  59                               pop    cx
03FE  5B                               pop    bx
03FF  58                               pop    ax
0400  C3                               ret
                          ;
0401  50                 proc_command: push  ax               ; process next command in que buffer
0402  53                               push   bx
0403  51                               push   cx
0404  52                               push   dx
0405  56                               push   si 0406  80 3E 008A R 00    proc_comm_1: cmp    tx_buffer_cnt,0  ; is there any commands in the que buffer ?
0409  75 03                            jne    proc_comm_2      ; yes - then process the next one
                          ;
040D  E9 055A R                        jmp    proc_end         ; no - then exit
                          ;
0410  33 F6              proc_comm_2: xor    si,si
0412  8B 1E 0088 R                    mov    bx,tx_next_out
0416  80 38 02                        cmp    byte ptr[bx][si],2 ; is this message data-cmd or a control function ?
0419  72 36                           jb     proc_data_cmd   ; jmp if data-cmd function 041B                    proc_ctl:                              ; it's a control function
041B  80 38 03                        cmp    byte ptr[bx][si],3 ; is this a baud rate change or master addr change ?
041E  75 0E                           jne    mastr_addr_chg  ; jmp if it's a master address change 0420                    baud_chg:                              ; change the baud rate
0420  46                              inc    si               ; point to baud rate byte
0421  8A 00                           mov    al,[bx][si]
0423  B1 06                           mov    cl,6
0425  D2 E0                           shl    al,cl            ; shift baud rate into 2 msb's
0427  BA 0308                         mov    dx,baud_port
042A  EE                              out    dx,al            ; send baud rate to coni card
042B  E9 00 90                        jmp    proc_ctrl_end    ; and exit 042E                    mastr_addr_chg:                        ; change master address
042E  46                              inc    si               ; point to lsb address byte
042F  8A 00                           mov    al,[bx][si]
0431  BA 0309                         mov    dx,addr_port
0434  EE                              out    dx,al            ; send msb of address to coni card
0435  42                              inc    dx
0436  46                              inc    si
0437  8A 00                           mov    al,[bx][si]
0439  EE                              out    dx,al            ; send lsb of address to coni card
                          ;
043A  83 C3 08           proc_ctrl_end: add  bx,tx_msg_len
043D  81 FB 01C3 R                    cmp    bx,offset tx_buffer_end
0441  72 04                           jb     proc_ctrl_end1
                          ;
0443  8D 1E 00C3 R                    lea    bx,tx_buffer 0447  89 1E 0088 R       proc_ctrl_end1: mov tx_next_out,bx
044B  FE 0E 008A R                    dec    tx_buffer_cnt
044F  EB B5                           jmp    proc_comm_1      ; see if another command or data 0451  80 38 01           proc_data_cmd: cmp  byte ptr[bx][si],1 ; is it a command ?
0454  74 5C                            je    proc_cmd          ; yes - command so process
                                                                 no - data so process
0456  46                              inc    si               ; point to 1st data byte
0457  BA 0300                         mov    dx,tx_ctl_bit_port
045A  32 C0                           xor    al,al            ; set control bit to data
045C  EE                              out    dx,al
045D  42                              inc    dx               ; point to data ports
045E  B9 0003                         mov    cx,3             ; number of bytes to transfer to coni card 0461  8A 00              proc_data:   mov    al,[bx][si]      ; send byte of data to coni card
0463  EE                              out    dx,al
0464  42                              inc    dx               ; point to next port
0465  46                              inc    si               ; point to next data byte
0466  E2 F9                           loop   proc_data        ; loop until all bytes sent to coni card 0468  46                              inc    si
0469  46                              inc    si               ; point to operation code byte
046A  32 C0                           xor    al,al
046C  C6 06 0085 R 00                 mov    tx_retries,0     ; no retries allowed on data transmissions
0471  A2 0026 R                       mov    rx_time_out,al   ; initialize timeout to zero
0474  A2 0025 R                       mov    rx_timer,al
0477  A2 0029 R                       mov    rx_ret_msgs,al   ; initialize number of return msgs. to zero
047A  F6 00 01                        test   byte ptr[bx][si],rx_resp_req ; is there a response requested ?
047D  75 03                           jnz    proc_data_1      ; yes - then continue
```

```
047F  E9 0535 R                              jmp    proc_cmd_end           ; no - then exit 0482  8A 00             proc_data_1:  mov    al,[bx][si]            ; get number of messages expected back
0484  B1 03                           mov    cl,3
0486  D2 E8                           shr    al,cl
0488  3C 20                           cmp    al,rx_max_msgs         ; make sure not greater than max allowed
048A  76 02                           jna    proc_data_2
      ;
048C  B0 20                           mov    al,rx_max_msgs         ; if so then force to max allowed
      ;
048E  A2 0029 R         proc_data_2:  mov    rx_ret_msgs,al
0491  C6 06 0083 R FF                 mov    tx_busy,busy           ; stop any more tx-ing untill all rx bytes rx-ed
0496  F6 00 02                        test   byte ptr[bx][si],time_out_mask ; is there a timeout set
0499  B0 00                           mov    al,0
049B  75 09                           jnz    proc_data_3            ; yes - then set time out as directed
      ;
049D  A2 0029 R                       mov    rx_ret_msgs,al         ; no - then force no return messages
04A0  A2 0083 R                       mov    tx_busy,al             ; and set tx not busy
04A3  EB 04 90                        jmp    proc_data_4            ; and exit
      ;
04A6  46                proc_data_3:  inc    si                     ; yes - then set timeout as directed
04A7  8A 00                           mov    al,[bx][si]
      ;
04A9  A2 0026 R         proc_data_4:  mov    rx_time_out,al
04AC  A2 0025 R                       mov    rx_timer,al
04AF  E9 0535 R                       jmp    proc_cmd_end           ; and exit
      ;
      ;
      ;
04B2  46                proc_cmd:     inc    si                     ; point to incom instruction
04B3  BA 0300                         mov    dx,tx_ctl_bit_port
04B6  B0 80                           mov    al,10000000b           ; set incom instruction
04B8  EE                              out    dx,al
      ;
04B9  42                              inc    dx                     ; point to 1st data port
04BA  8A 00                           mov    al,[bx][si]            ; get instruction
04BC  24 0F                           and    al,0fh                 ; strip off unused bits
04BE  46                              inc    si                     ; point to command byte
04BF  8A 20                           mov    ah,[bx][si]
04C1  B1 04                           mov    cl,4
04C3  D2 E4                           shl    ah,cl                  ; shift to high nibble
04C5  0A C4                           or     al,ah                  ; combine nibbles
04C7  EE                              out    dx,al                  ; and send to comi card
      ;
04C8  42                              inc    dx                     ; point to second data port
04C9  46                              inc    si                     ; point to lsb of device address
04CA  8A 00                           mov    al,[bx][si]
04CC  EE                              out    dx,al                  ; and send to comi card
      ;
04CD  42                              inc    dx                     ; point to 3rd data port
04CE  46                              inc    si                     ; point to msb of devive address
04CF  8A 00                           mov    al,[bx][si]
04D1  24 0F                           and    al,0fh                 ; strip off unused bits
04D3  46                              inc    si                     ; point to app cmd or data
04D4  8A 20                           mov    ah,[bx][si]
04D6  D2 E4                           shl    ah,cl                  ; move to high nibble
04D8  0A C4                           or     al,ah                  ; combine nibbles
04DA  EE                              out    dx,al                  ; and sendto comi card
      ;
04DB  8A 28                           mov    ch,[bx][si]            ; save number of retries
04DD  D2 ED                           shr    ch,cl
04DF  FE C5                           inc    ch                     ; index to 1 ( 0 = 1 retry )
      ;
04E1  46                              inc    si                     ; point to operation code
04E2  F6 00 01                        test   byte ptr[bx][si],rx_resp_req ; is there a response requested ?
04E5  B0 00                           mov    al,0
04E7  75 06                           jnz    proc_cmd_1             ; yes - then continue
      ;
04E9  A2 0085 R                       mov    tx_retries,al          ; no - then set zero retries and end
04EC  EB 41 90                        jmp    proc_cmd_5
      ;
04EF  8A 00             proc_cmd_1:   mov    al,[bx][si]            ; then get number of response messages
04F1  B1 03                           mov    cl,3
04F3  D2 E8                           shr    al,cl
04F5  3C 20                           cmp    al,rx_max_msgs         ; is number greater than allowed ?
04F7  76 02                           jna    proc_cmd_2
      ;
04F9  B0 20                           mov    al,rx_max_msgs         ; then force to max
      ;
04FB  A2 0029 R         proc_cmd_2:   mov    rx_ret_msgs,al         ; set number of return messages
04FE  C6 06 0083 R FF                 mov    tx_busy,busy           ; set transmitter busy untill al bytes received
0503  3C 01                           cmp    al,1                   ; is the number of response messages greater than 1 ?
0505  B0 00                           mov    al,0
0507  77 07                           ja     proc_cmd_3             ; yes - then set zero retries
      ;
0509  F6 00 04                        test   byte ptr[bx][si],retries ; are there any retries ?
050C  74 02                           jz     proc_cmd_3             ; no - then set zero retries
      ;
050E  8A C5                           mov    al,ch                  ; yes - then set retries to given
      ;
0510  A2 0085 R         proc_cmd_3:   mov    tx_retries,al          ; set number of retries
0513  F6 00 02                        test   byte ptr[bx][si],time_out_mask ; is there a time out time ?
0516  B0 00                           mov    al,0
0518  75 12                           jnz    proc_cmd_4             ; yes - then set timeout
```

```
051A A2 0029 R                       mov     rx_ret_msgs,al    ; no - so do not allow return messages
051D 80 3E 0085 R 00                 cmp     tx_retries,0      ; no time out - any retries ?
0522 74 08                           je      proc_cmd_5        ; no - then set time out to zero 0524 C6 06 0085 R 00                 mov     tx_retries,0      ; yes - then force zero retries
0529 EB 04 90                        jmp     proc_cmd_5

052C 46              proc_cmd_4:     inc     si                ; point to timeout time
052D 8A 00                           mov     al,[bx][si]

052F A2 0026 R       proc_cmd_5:     mov     rx_time_out,al
0532 A2 0025 R                       mov     rx_timer,al       ; set timeout timer 0535 83 C3 08        proc_cmd_end:   add     bx,tx_msg_len
0538 81 FB 01C3 R                    cmp     bx,offset tx_buffer_end
053C 72 04                           jb      proc_cmd_end1

053E 8D 1E 00C3 R                    lea     bx,tx_buffer 0542 89 1E 0088 R    proc_cmd_end1:  mov     tx_next_out,bx
0546 FE 0E 008A R                    dec     tx_buffer_cnt
054A C6 06 0084 R FF                 mov     tx_clear,busy     ; set not clear to send
054F C6 06 0023 R 00                 mov     rx_count,0        ; reset received message counter
0554 BA 0308                         mov     dx,comi_ctrl_port ; transmit data
0557 B0 01                           mov     al,tx_transmit
0559 EE                              out     dx,al 055A 5E              proc_end:       pop     si
055B 5A                              pop     dx
055C 59                              pop     cx
055D 5B                              pop     bx
055E 58                              pop     ax
055F C3                              ret 0560                 incom           proc    far
                               ;     DEVICE STRATEGY
0560                 dev_strategy:
0560 2E: 8C 06 0014 R                mov     cs:rh_seg,es      ; save segment of request header pointer
0565 2E: 89 1E 0012 R                mov     cs:rh_offset,bx   ; save offset of request header pointer
056A CB                              ret

;     DEVICE INTERUPT 0568                 dev_interrupt:
0568 1E                              push    ds                ; preserve machine state on entry
056C 06                              push    es
056D 50                              push    ax
056E 53                              push    bx
056F 51                              push    cx
0570 52                              push    dx
0571 57                              push    di
0572 56                              push    si
0573 55                              push    bp
0574 0E                              push    cs
0575 1F                              pop     ds
0576 8C 16 0016 R                    mov     stack_seg,ss      ; save system stack
057A 89 26 0018 R                    mov     stack_offset,sp
057E 8C CA                           mov     dx,cs             ; get new stack
0580 FA                              cli                       ; no interrupts while changing stack
0581 9E D2                           mov     ss,dx
0583 8D 26 0251 R                    lea     sp,local_stack
0587 FB                              sti

;     DO THE BRANCH ACCORDING TO THE FUNCTION PASSED 0588 8E 06 0014 R                    mov     es,rh_seg
058C 8B 2E 0012 R                    mov     bp,rh_offset
0590 26: 8A 5E 02                    mov     bl,es:rh_cmd_code[bp] ; get function byte
0594 32 FF                           xor     bh,bh
0596 03 DB                           add     bx,bx
0598 FF 97 02D5 R                    call    function_tbl[bx]  ; execute function 059C 8E 16 0016 R                    mov     ss,stack_seg      ; restore system stack
05A0 8B 26 0018 R                    mov     sp,stack_offset
05A4 5D                              pop     bp
05A5 5E                              pop     si
05A6 5F                              pop     di
05A7 5A                              pop     dx
05A8 59                              pop     cx
05A9 5B                              pop     bx
05AA 58                              pop     ax
05AB 07                              pop     es
05AC 1F                              pop     ds
05AD CB                              ret 05AE                 incom           endp
```

```
                              init:
05AE
05AE    1E                          push    ds                  ; set new interrupt vector for timer tick
05AF    BA 0000                     mov     dx,vector_segment
05B2    52                          push    dx
05B3    1F                          pop     ds
05B4    8D 16 02EF R                lea     dx,timer_tick
05B8    BB 0070                     mov     bx,tick_vec_ofst
05BB    89 17                       mov     [bx],dx
05BD    BB 0072                     mov     bx,tick_vec_seg
05C0    0E                          push    cs
05C1    5A                          pop     dx
05C2    89 17                       mov     [bx],dx 05C4    8D 16 0354 R                lea     dx,coni_int        ; set interrupt vector for coni card
05C8    BB 002C                     mov     bx,incom_vec_ofst
05CB    89 17                       mov     [bx],dx
05CD    BB 002E                     mov     bx,incom_vec_seg
05D0    0E                          push    cs
05D1    5A                          pop     dx
05D2    89 17                       mov     [bx],dx 05D4    BB 014E                     mov     bx,funct_seg_ptr   ; set function seg. pointer of function call
05D7    89 17                       mov     [bx],dx
05D9    4B                          dec     bx                 ; point to offset pointer
05DA    4B                          dec     bx
05DB    C7 07 0000                  mov     word ptr[bx],0     ; dummy offset 05DF    BB 0152                     mov     bx,funct_wr_offset ; plug in funcion call pointers
05E2    8D 16 07FE R                lea     dx,write_cad
05E6    89 17                       mov     [bx],dx
05E9    BB 0150                     mov     bx,funct_rd_offset ;
05EB    8D 16 083B R                lea     dx,read_cad
05EF    89 17                       mov     [bx],dx
05F1    1F                          pop     ds 05F2    0E                          push    cs                 ; set segment of temp_buff
05F3    5A                          pop     dx
05F4    89 16 02D1 R                mov     funct_data_seg,dx 05F8    E4 21                       in      al,int_mask_port   ; turn on external interrupt 3
05FA    24 F7                       and     al,enable_int_3
05FC    E6 21                       out     int_mask_port,al 05FE    BA 030A                     mov     dx,reset_port      ; reset coni card
0601    EC                          in      al,dx              ; inputing from this port resets coni 0602    BA 0309                     mov     dx,addr_port       ; set default address of master
0605    B0 FF                       mov     al,lsb_dflt_addr   ; to 0fffh
0607    EE                          out     dx,al
0608    42                          inc     dx                 ; point to msb adrress port
0609    B0 0F                       mov     al,msb_dflt_addr
060B    EE                          out     dx,al 060C    BA 0308                     mov     dx,baud_port       ; set default baud rate to 1200
060F    B0 80                       mov     al,baud_default
0611    EE                          out     dx,al 0612    BA 0309                     mov     dx,coni_ctrl_port  ; flush receiver buffer
0615    B0 02                       mov     al,rx_ack
0617    EE                          out     dx,al 0618    8D 16 002A R                lea     dx,rx_buffer       ; init rx buffer pointers
061C    89 16 001F R                mov     rx_next_in,dx
0620    89 16 0021 R                mov     rx_next_out,dx 0624    8D 16 00C3 R                lea     dx,tx_buffer       ; init tx buffer pointers
0628    89 16 00B6 R                mov     tx_next_in,dx
062C    89 16 00B8 R                mov     tx_next_out,dx 0630    8D 06 08A3 R                lea     ax,driver_end      ; set end of driver on even para boundry
0634    05 0010                     add     ax,0010h
0637    25 FFF0                     and     ax,0fff0h
063A    26: 39 46 0E                mov     es:end_addr_offset[bp],ax ; set ending address offset
063E    26: 8C 4E 10                mov     es:end_addr_seg[bp],cs    ; set ending address segment ;
                              ;    THE FOLLOWING ENTRIES ARE NOT SUPPORTED
                              ;
0642                          media_check:
0642                          build_bpb:
0642                          ioctl_in:
0642                          ioctl_out:
0642                          in_flush:
0642                          out_flush:
                              ;
                              ;    THE FOLLOWING ENTRIES ARE SUPPORTED
                              ;
0642    26: 81 4E 03 0100     set_stat_done:  or   es:word ptr rh_status[bp],0100h ; set status and return
0648    C3                                    ret
                              ;
```

```
0649  80 3E 008A R 20      out_stat:       cmp     tx_buffer_cnt,tx_max_msgs  ; is the tx buffer full ?
064E  72 F2                                jb      set_stat_done              ; no then set status ready
                           ;
0650  26: 81 4E 03 0200    set_stat_busy:  or      es:word ptr rh_status[bp],200h ; set status busy
                           ;
0656  EB EA                in_stat:        jmp     set_stat_done              ; staus not busy ;
                           ;
                           input:
0658                       nd_input:
0658  E8 07F1 R                            call    get_trans_data   ; get buffer address and byte count
065B  80 3E 00AA R 00                      cmp     rx_out_count,0   ; is this a new message request ?
0660  75 03                                jnz     in_1
                           ;
0662  E8 0693 R                            call    fill_out_buff    ; fill buffer if new message request
                           ;
0665  06                   in_1:           push    es
0666  8E C3                                mov     es,bx            ; set segment of buffer
0668  32 FF                                xor     bh,bh
                           ;
066A  8A 1E 00AA R         in_2:           mov     bl,rx_out_count  ; move message to dos buffer
066E  8A 87 00AB R                         mov     al,rx_out_buffer[bx]
0672  26: 88 05                            mov     es:[di],al
0675  47                                   inc     di
0676  FE 06 00AA R                         inc     rx_out_count
067A  80 3E 00AA R 04                      cmp     rx_out_count,4   ; has a complete message been sent ?
067F  72 0D                                jb      in_3             ; no - then continue sending
                           ;
0681  83 F9 01                             cmp     cx,1             ; is this the last byte in message ?
0684  C6 06 00AA R 00                      mov     rx_out_count,0
0689  74 03                                je      in_3             ; yes then don't fill buffer this time
                           ;
068B  E8 0693 R                            call    fill_out_buff    ; yes - get another message
                           ;
068E  E2 DA                in_3:           loop    in_2             ; loop till all bytes req. are xfered
                           ;
0690  07                                   pop     es
0691  EB AF                                jmp     set_stat_done ;
                           ;
0693  50                   fill_out_buff:  push    ax               ; fill buffer with next message
0694  53                                   push    bx
0695  51                                   push    cx
0696  80 3E 0024 R 00                      cmp     rx_buffer_ct,0   ; any messages in buffer ?
069B  75 08                                jne     fob_1            ; yes - then move one
                           ;
069D  C6 06 00AE R 00                      mov     rx_ot_buff_stat,msg_not_rx ; set message not received
06A2  E9 23 90                             jmp     fob_4            ; and exit
                           ;
06A5  8B 1E 0021 R         fob_1:          mov     bx,rx_next_out   ; move 1 message fora rx_buffer to output buffer
06A9  B9 0004                              mov     cx,rx_msg_len
06AC  33 F6                                xor     si,si
                           ;
06AE  8A 00                fob_2:          mov     al,[bx][si]
06B0  88 84 00AB R                         mov     rx_out_buffer[si],al
06B4  46                                   inc     si
06B5  E2 F7                                loop    fob_2
                           ;
06B7  83 C3 04                             add     bx,rx_msg_len    ; set new rx buffer pointer
06BA  81 FB 00AA R                         cmp     bx,offset rx_buffer_end ; gone past buffer end ?
06BE  72 04                                jb      fob_3            ; no - then save new buffer pointer
                           ;
06C0  8D 1E 002A R                         lea     bx,rx_buffer     ; yes - then set pointer at beginning of buffer
                           ;
06C4  89 1E 0021 R         fob_3:          mov     rx_next_out,bx   ; save new buffer pointer
06C8  FE 0E 0024 R                         dec     rx_buffer_ct     ; dec number of messages left in buffer
                           ;
06CC  80 3E 0027 R FF      fob_4:          cmp     rx_fault,fault   ; was their a timeout error ?
06D1  75 05                                jne     fob_5            ; no - then exit
                           ;
06D3  80 0E 00AE R 08                      or      rx_ot_buff_stat,timeout_fault
                           ;
06D8  C6 06 0027 R 00      fob_5:          mov     rx_fault,0       ; reset timeout error
06DD  59                                   pop     cx
06DE  5B                                   pop     bx
06DF  58                                   pop     ax
06E0  C3                                   ret ;
                           ;
                           output:
06E1                       
06E1  80 3E 00B1 R FF      out_verify:     cmp     tx_fault,fault   ; is there a time out error ?
06E6  75 17                                jne     out_1            ; no - then take data
                           ;
06E8  26: C7 46 12 0000                    mov     es:word ptr byte_count[bp],0 ; set number of bytes xfered
06EE  26: C7 46 03 8003                    mov     es:word ptr rh_status[bp],unknown_cmd ; set error
06F4  C6 06 00B1 R 00                      mov     tx_fault,0       ; reset fault
06F9  C6 06 00AF R 00                      mov     tx_count,0       ; reset count
06FE  C3                                   ret
                           ;
06FF  E8 07F1 R            out_1:          call    get_trans_data   ; get buffer address and byte count
0702  80 3E 00AF R 00                      cmp     tx_count,0       ; is this the start of new command ?
0707  75 3B                                jne     out_4            ; no - then don't set time out
```

```
0709 C6 06 0082 R 26              mov    tx_full_timer,tx_error_tm ; set timeout
070E 06                           push   es
070F 8E C3                        mov    es,bx
0711 26: 80 3D 04                 cmp    es:byte ptr[di],4 ; is this message a rx_timer reset ?
0715 07                           pop    es
0716 72 05                        jb     out_2         ; no - then process normally 0718 C6 06 0028 R FF              mov    rx_reset,0ffh ; set reset flag 071D 80 3E 0028 R FF    out_2:    cmp    rx_reset,0ffh ; is this a reset message ?
0722 74 1B                        je     out_3         ; yes - then disregard buffer full 0724 80 3E 008A R 20              cmp    tx_buffer_cnt,tx_max_msgs ; is the buffer full ?
0729 72 14                        jb     out_3         ; no - then continue 072B 80 3E 0082 R 00              cmp    tx_full_timer,0 ; has timer timed out yet ?
0730 75 EB                        jne    out_2         ; no, then loop till timeout 0732 33 C0                        xor    ax,ax         ; yes - then flag error and exit
0734 26: 89 46 12                 mov    es:byte_count[bp],ax ; set 0 bytes accepted
0738 26: C7 46 03 3002            mov    es:word ptr rh_status[bp],busy_error ; set busy error
073E C3                           ret                  ; and exit 073F C6 06 0080 R 24   out_3:     mov    tx_timer,tx_time ; yes - set timeout timer 0744 06              out_4:       push   es
0745 8E C3                        mov    es,bx
0747 32 FF                        xor    bh,bh
0749 32 E4                        xor    ah,ah         ; zero bytes accepted counter 074B 8A 1E 00AF R    out_5:       mov    bl,tx_count   ; get command bytes
074F 26: 8A 05                    mov    al,es:[di]
0752 88 87 008B R                 mov    tx_in_buffer[bx],al
0756 FE 06 00AF R                 inc    tx_count
075A 47                           inc    di
075B FE C4                        inc    ah
075D 80 3E 00AF R 08              cmp    tx_count,tx_msg_len ; has a complete command been received
0762 72 20                        jb     out_7         ; no - then get more bytes 0764 E8 078A R                    call   que_command   ; if all command bytes in - put into command buffer
0767 83 F9 01                     cmp    cx,1          ; any more commands coming in?
076A 76 18                        jbe    out_7         ; no - then leave timer = 0

076C 80 3E 008A R 20              cmp    tx_buffer_cnt,tx_max_msgs ; is transmitter buffer full ?
0771 72 0C                        jb     out_6         ; no - then take next command 0773 07                           pop    es
0774 8A C4                        mov    al,ah         ; yes full
0776 32 E4                        xor    ah,ah
0778 26: 89 46 12                 mov    es:byte_count[bp],ax ; set number of bytes accepted
077C EB 09 90                     jmp    out_8         ; and exit 077F C6 06 0080 R 24  out_6:      mov    tx_timer,tx_time ; yes - then re-init timeout timer 0784 E2 C5           out_7:       loop   out_5         ; loop till all bytes received 0786 07                           pop    es 0787 E9 0642 R       out_8:       jmp    set_stat_done ; exit 078A 50              que_command: push   ax
078B 53                           push   bx
078C 51                           push   cx
078D 56                           push   si
078E 8B 1E 0086 R                 mov    bx,tx_next_in
0792 B9 0008                      mov    cx,tx_msg_len
0795 33 F6                        xor    si,si
0797 80 BC 008B R 04              cmp    tx_in_buffer[si],4 ; is this command to reset rx timer ?
079C 72 17                        jb     que_comm_1    ; no - then put into que buffer ; yes then don't take message
079E C6 06 0025 R 00              mov    rx_timer,0    ; reset rx timers
07A3 C6 06 0026 R 00              mov    rx_time_out,0
07A8 C6 06 0028 R 00              mov    rx_reset,0    ; reset rx_reset flag
07AD C6 06 0083 R 00              mov    tx_busy,0     ; release transmitter
07B2 EB 2E 90                     jmp    que_end_1     ; and exit 07B5 8A 84 008B R   que_comm_1:   mov    al,tx_in_buffer[si] ; move command to que buffer
07B9 88 07                        mov    [bx],al
07BB 46                           inc    si
07BC 43                           inc    bx
07BD E2 F6                        loop   que_comm_1

07BF 81 FB 01C3 R                 cmp    bx,offset tx_buffer_end
07C3 72 04                        jb     que_comm_2

07C5 8D 1E 00C3 R                 lea    bx,tx_buffer

07C9 89 1E 0086 R   que_comm_2:   mov    tx_next_in,bx
07CD FE 06 008A R                 inc    tx_buffer_cnt 07D1 80 3E 0083 R FF  que_end:    cmp    tx_busy,busy  ; check if should start a new tx cycle
07D6 74 0A                        je     que_end_1     ; exit - because current transmission in progress
```

```
07D8  80 3E 0084 R 00              cmp    tx_clear,clear    ; is coni card ready for another message ?
07DD  75 03                        jne    que_end_1         ; no - then exit
                         ;
07DF  E8 0401 R                    call   proc_command      ; then initiate a new transmission 07E2  C6 06 00AF R 00  que_end_1:  mov    tx_count,0        ; zero byte counter
07E7  C6 06 00B0 R 00              mov    tx_timer,0        ; reset timeout timer
07EC  5E                           pop    si
07ED  59                           pop    cx
07EE  5B                           pop    bx
07EF  58                           pop    ax
07F0  C3                           ret ;
07F1             get_trans_data:                            ; on exit: di = buffer address
                                                            ;          bx = segment of buffer
                                                            ;          cx = number of bytes to transfer
                         ;
07F1  26: 8B 7E 0E                 mov    di,es:trans_addr_ofst[bp]  ; get buffer address
07F5  26: 8B 5E 10                 mov    bx,es:trans_addr_seg[bp]   ; get buffer segment
07F9  26: 8B 4E 12                 mov    cx,es:byte_count[bp]       ; get number of bytes to transfer
07FD  C3                           ret ;
                         ;         ASSEMBLY FUNCTION CALLS
                         ;
07FE             funct_calls  proc  far
                         ;
07FE  E8 087A R        write_cmd:  call   save_stack
0801  55                           push   bp
0802  8B 2E 0285 R                 mov    bp,temp_stk_off
0806  26: 8B 5E 04                 mov    bx,es:[bp]+4      ; get varible descriptor block address
080A  26: 8B 77 01                 mov    si,es:[bx]+1      ; get varable address
080E  B9 0008                      mov    cx,tx_msg_len     ; set message len
0811  89 0E 02D3 R                 mov    funct_txr_count,cx
0815  33 FF                        xor    di,di 0817  26: 8A 04        write_cmd_1: mov   al,es:[si]        ; move message to temp_buff
081A  88 85 0289 R                 mov    temp_buff[di],al
081E  47                           inc    di
081F  46                           inc    si
0820  E2 F5                        loop   write_cmd_1

0822  5D                           pop    bp
0823  C6 06 02C3 R 08              mov    funct_cmd,output_cmd ; set function command
0828  C7 06 0012 R 02C1 R          mov    rh_offset,offset funct_header ; point to function header
082E  0E                           push   cs
082F  5A                           pop    dx
0830  89 16 0014 R                 mov    rh_seg,dx
0834  0E                           push   cs               ; setup for far return
0835  E8 056B R                    call   dev_interrupt    ; send message to driver
0838  EB 5A 90                     jmp    restore_stack ;
                         ;
083B  E8 087A R        read_cmd:   call   save_stack
083E  C7 06 02D3 R 0004            mov    funct_txr_count,rx_msg_len
0844  C6 06 02C3 R 04              mov    funct_cmd,input_cmd
0849  C7 06 0012 R 02C1 R          mov    rh_offset,offset funct_header ; point to function header
084F  0E                           push   cs
0850  5A                           pop    dx
0851  89 16 0014 R                 mov    rh_seg,dx
0855  0E                           push   cs               ; setup for far return
0856  E8 056B R                    call   dev_interrupt    ; get message from driver
0859  55                           push   bp
085A  8B 2E 0285 R                 mov    bp,temp_stk_off  ; put message in calling pgm buffer
085E  26: 8B 5E 04                 mov    bx,es:[bp]+4     ; get varable descriptor block
0862  26: 8B 7F 01                 mov    di,es:[bx]+1     ; get varable address
0866  B9 0004                      mov    cx,rx_msg_len
0869  33 F6                        xor    si,si 086B  8A 94 0289 R     read_cmd_1: mov    al,temp_buff[si]
086F  26: 88 05                    mov    es:[di],al
0872  47                           inc    di
0873  46                           inc    si
0874  E2 F5                        loop   read_cmd_1

0876  5D                           pop    bp
0877  EB 18 90                     jmp    restore_stack ;
                         ;
087A  5B               save_stack: pop    bx               ; pop return address of call
087B  2E: 8C 16 0287 R             mov    cs:temp_stk_seg,ss
0880  2E: 89 26 0285 R             mov    cs:temp_stk_off,sp
0885  8C CA                        mov    dx,cs
0887  FA                           cli                     ; no interrupts while changing stacks
0888  8E D2                        mov    ss,dx
088A  8D 26 0285 R                 lea    sp,aux_stack
088E  FB                           sti
088F  0E                           push   cs               ; put [FAR] return address back on new stack
0890  53                           push   bx
0891  0E                           push   cs               ; set data segment = code segment
0892  1F                           pop    ds
0893  CB                           ret
```

```
0894  FA                    restore_stack:  cli                    ; no interrupts while restoring stack
0895  8E 16 0287 R                          mov     ss,temp_stk_seg
0899  8B 26 0285 R                          mov     sp,temp_stk_off
089D  FB                                    sti
089E  06                                    push    es             ; restore data segment
089F  1F                                    pop     ds
08A0  CA 0002                               ret     2
                            ;
08A3                        funct_calls     endp
                            ;
= 08A3                      driver_end      equ     $              ; ending address of driver
                            ;
08A3                        cseg            ends
                                            end     begin Segments and groups:
                     N a m e            Size    align   combine class

CSEG . . . . . . . . . . . . .          08A3    PARA    PUBLIC 'CODE'

Symbols:
                     N a m e            Type    Value   Attr

ADDR_PORT. . . . . . . . . . .          Number  0309
ALL_RX . . . . . . . . . . . .          Number  0002
ATTRIBUTE. . . . . . . . . . .          L WORD  0004    CSEG
AUX_STACK. . . . . . . . . . .          L BYTE  02B5    CSEG
AUX_STK_START. . . . . . . . .          L BYTE  0251    CSEG    Length =0064
BAUD_1200. . . . . . . . . . .          Number  0080
BAUD_300 . . . . . . . . . . .          Number  00C0
BAUD_38_4KHZ . . . . . . . . .          Number  0040
BAUD_CH6 . . . . . . . . . . .          L NEAR  0420    CSEG
BAUD_DEFAULT . . . . . . . . .          Alias   BAUD_1200
BAUD_PORT. . . . . . . . . . .          Number  0308
BAUD_UNCHANGED . . . . . . . .          Number  0000
BCH_ERROR. . . . . . . . . . .          Number  0040
BCH_FAULT. . . . . . . . . . .          Number  0010
BEGIN. . . . . . . . . . . . .          L NEAR  0000    CSEG
BUILD_BPB. . . . . . . . . . .          L NEAR  0642    CSEG
BUSY . . . . . . . . . . . . .          Number  00FF
BUSY_ERROR . . . . . . . . . .          Number  8002
BYTE_COUNT . . . . . . . . . .          Number  0012
CLEAR. . . . . . . . . . . . .          Number  0000
CONI_BASE. . . . . . . . . . .          Number  0300
CONI_CTRL_PORT . . . . . . . .          Number  0308
CONI_FLAG. . . . . . . . . . .          L BYTE  001E    CSEG
CONI_INT . . . . . . . . . . .          L NEAR  0354    CSEG
CONI_INT_1 . . . . . . . . . .          L NEAR  0365    CSEG
CONI_INT_2 . . . . . . . . . .          L NEAR  036E    CSEG
CONI_INT_END . . . . . . . . .          L NEAR  037F    CSEG
CONI_STAT_PORT . . . . . . . .          Number  0308
COPYRIGHT. . . . . . . . . . .          L BYTE  01C3    CSEG
DEV_INTERRUPT. . . . . . . . .          L NEAR  056B    CSEG
DEV_NAME . . . . . . . . . . .          L BYTE  000A    CSEG
DEV_STRATEGY . . . . . . . . .          L NEAR  0560    CSEG
DRIVER_END . . . . . . . . . .          Number  08A3    CSEG
ENABLE_INT_3 . . . . . . . . .          Number  00F7
END_ADDR_OFFSET. . . . . . . .          Number  000E
END_ADDR_SEG . . . . . . . . .          Number  0010
EOI_CMD. . . . . . . . . . . .          Number  0020
FAULT. . . . . . . . . . . . .          Number  00FF
FILL_OUT_BUFF. . . . . . . . .          L NEAR  0693    CSEG
FOB_1. . . . . . . . . . . . .          L NEAR  06A5    CSEG
FOB_2. . . . . . . . . . . . .          L NEAR  06AE    CSEG
FOB_3. . . . . . . . . . . . .          L NEAR  06C4    CSEG
FOB_4. . . . . . . . . . . . .          L NEAR  06CC    CSEG
FOB_5. . . . . . . . . . . . .          L NEAR  06D8    CSEG
FUNCTION_TBL . . . . . . . . .          L WORD  02D5    CSEG
FUNCT_CALLS. . . . . . . . . .          F PROC  07FE    CSEG    Length =00A5
FUNCT_CMD. . . . . . . . . . .          L BYTE  02C3    CSEG
FUNCT_DATA_OFF . . . . . . . .          L WORD  02CF    CSEG
FUNCT_DATA_SEG . . . . . . . .          L WORD  02D1    CSEG
FUNCT_DUM_OFF. . . . . . . . .          Number  014C
FUNCT_HEADER . . . . . . . . .          L BYTE  02C1    CSEG    Length =0002
FUNCT_RD_OFFSET. . . . . . . .          Number  0150
FUNCT_SEG_PTR. . . . . . . . .          Number  014E
FUNCT_STAT . . . . . . . . . .          L WORD  02C4    CSEG
FUNCT_TIR_COUNT. . . . . . . .          L WORD  02D3    CSEG
FUNCT_WR_OFFSET. . . . . . . .          Number  0152
GET_RX_MSG . . . . . . . . . .          L NEAR  0388    CSEG
GET_RX_MSG_1 . . . . . . . . .          L NEAR  03A5    CSEG
GET_RX_MSG_2 . . . . . . . . .          L NEAR  03B5    CSEG
GET_RX_MSG_3 . . . . . . . . .          L NEAR  03EA    CSEG
GET_RX_MSG_4 . . . . . . . . .          L NEAR  03F7    CSEG
GET_RX_MSG_END . . . . . . . .          L NEAR  03FB    CSEG
GET_TRANS_DATA . . . . . . . .          L NEAR  07F1    CSEG
INCOM. . . . . . . . . . . . .          F PROC  0560    CSEG    Length =004E
```

| Symbol | Type | Value | Segment |
|---|---|---|---|
| INCOM_INT_CT | L WORD | 001A | CSEG |
| INCOM_VEC | Number | 0008 | |
| INCOM_VEC_OFST | Number | 002C | |
| INCOM_VEC_SEG | Number | 002E | |
| INDEF_TIME | Number | 00FF | |
| INIT | L NEAR | 05AE | CSEG |
| INPUT | L NEAR | 0658 | CSEG |
| INPUT_CMD | Number | 0004 | |
| INTERRUPT | L WORD | 0008 | CSEG |
| INT_CONT_OFSET | Number | 0008 | |
| INT_CTRL_PORT | Number | 0020 | |
| INT_MASK_PORT | Number | 0021 | |
| IN_1 | L NEAR | 0665 | CSEG |
| IN_2 | L NEAR | 066A | CSEG |
| IN_3 | L NEAR | 068E | CSEG |
| IN_FLUSH | L NEAR | 0642 | CSEG |
| IN_STAT | L NEAR | 0656 | CSEG |
| IOCTL_IN | L NEAR | 0642 | CSEG |
| IOCTL_OUT | L NEAR | 0642 | CSEG |
| LOCAL_STACK | L BYTE | 0251 | CSEG |
| LSB_DFLT_ADDR | Number | 00FF | |
| MASTR_ADDR_CHG | L NEAR | 042E | CSEG |
| MEDIA_CHECK | L NEAR | 0642 | CSEG |
| MED_DISCP | Number | 000D | |
| MSB_DFLT_ADDR | Number | 000F | |
| MSG_NOT_RX | Number | 0000 | |
| MSG_RX | Number | 0001 | |
| NO_INPUT | L NEAR | 0658 | CSEG |
| NEXT_DEV | L DWORD | 0000 | CSEG |
| NUM_UNITS | Number | 000D | |
| OF_ERROR | Number | 0004 | |
| OUTPUT | L NEAR | 06E1 | CSEG |
| OUTPUT_CMD | Number | 0008 | |
| OUT_1 | L NEAR | 06FF | CSEG |
| OUT_2 | L NEAR | 071D | CSEG |
| OUT_3 | L NEAR | 073F | CSEG |
| OUT_4 | L NEAR | 0744 | CSEG |
| OUT_5 | L NEAR | 074B | CSEG |
| OUT_6 | L NEAR | 077F | CSEG |
| OUT_7 | L NEAR | 0784 | CSEG |
| OUT_8 | L NEAR | 0787 | CSEG |
| OUT_FLUSH | L NEAR | 0642 | CSEG |
| OUT_STAT | L NEAR | 0649 | CSEG |
| OUT_VERIFY | L NEAR | 06E1 | CSEG |
| PROC_CMD | L NEAR | 04B2 | CSEG |
| PROC_CMD_1 | L NEAR | 04EF | CSEG |
| PROC_CMD_2 | L NEAR | 04FB | CSEG |
| PROC_CMD_3 | L NEAR | 0510 | CSEG |
| PROC_CMD_4 | L NEAR | 052C | CSEG |
| PROC_CMD_5 | L NEAR | 052F | CSEG |
| PROC_CMD_END | L NEAR | 0535 | CSEG |
| PROC_CMD_END1 | L NEAR | 0542 | CSEG |
| PROC_COMMAND | L NEAR | 0401 | CSEG |
| PROC_COMM_1 | L NEAR | 0406 | CSEG |
| PROC_COMM_2 | L NEAR | 0410 | CSEG |
| PROC_CTL | L NEAR | 041B | CSEG |
| PROC_CTRL_END | L NEAR | 043A | CSEG |
| PROC_CTRL_END1 | L NEAR | 0447 | CSEG |
| PROC_DATA | L NEAR | 0461 | CSEG |
| PROC_DATA_1 | L NEAR | 0482 | CSEG |
| PROC_DATA_2 | L NEAR | 048E | CSEG |
| PROC_DATA_3 | L NEAR | 04A6 | CSEG |
| PROC_DATA_4 | L NEAR | 04A9 | CSEG |
| PROC_DATA_CMD | L NEAR | 0451 | CSEG |
| PROC_END | L NEAR | 055A | CSEG |
| QUE_COMMAND | L NEAR | 078A | CSEG |
| QUE_COMM_1 | L NEAR | 07B5 | CSEG |
| QUE_COMM_2 | L NEAR | 07C9 | CSEG |
| QUE_END | L NEAR | 07D1 | CSEG |
| QUE_END_1 | L NEAR | 07E2 | CSEG |
| READ_CMD | L NEAR | 083B | CSEG |
| READ_CMD_1 | L NEAR | 086B | CSEG |
| REQ_READ_BASE | Number | 0000 | |
| RESET_PORT | Number | 030A | |
| RESTORE_STACK | L NEAR | 0894 | CSEG |
| RETRIES | Number | 0004 | |
| RH_CMD_CODE | Number | 0002 | |
| RH_OFFSET | L WORD | 0012 | CSEG |
| RH_SEG | L WORD | 0014 | CSEG |
| RH_STATUS | Number | 0003 | |
| RH_UNIT_CODE | Number | 0001 | |
| RX_ACK | Number | 0002 | |
| RX_BUFFER | L BYTE | 002A | CSEG  Length =0080 |
| RX_BUFFER_CT | L BYTE | 0024 | CSEG |
| RX_BUFFER_END | L BYTE | 00AA | CSEG |
| RX_COUNT | L BYTE | 0023 | CSEG |
| RX_DATA_1_PORT | Number | 0305 | |
| RX_DATA_2_PORT | Number | 0306 | |
| RX_DATA_3_PORT | Number | 0307 | |
| RX_FAULT | L BYTE | 0027 | CSEG |
| RX_MAX_MSGS | Number | 0020 | |
| RX_MSG_LEN | Number | 0004 | |
| RX_MSG_RXED | Number | 0008 | |

```
RX_NEXT_IN . . . . . . . . . . . .   L WORD  001F  CSEG
RX_NEXT_OUT. . . . . . . . . . . .   L WORD  0021  CSEG
RX_OT_BUFF_STAT. . . . . . . . . .   L BYTE  00AE  CSEG
RX_OUT_BUFFER. . . . . . . . . . .   L BYTE  00AB  CSEG   Length =0003
RX_OUT_COUNT . . . . . . . . . . .   L BYTE  00AA  CSEG
RX_RESET . . . . . . . . . . . . .   L BYTE  0028  CSEG
RX_RESP_REQ. . . . . . . . . . . .   Number  0001
RX_RET_MSGS. . . . . . . . . . . .   L BYTE  0029  CSEG
RX_STAT_MASK . . . . . . . . . . .   Number  00C0
RX_STAT_PORT . . . . . . . . . . .   Number  0304
RX_TIMER . . . . . . . . . . . . .   L BYTE  0025  CSEG
RX_TIME_OUT. . . . . . . . . . . .   L BYTE  0026  CSEG
SAVE_STACK . . . . . . . . . . . .   L NEAR  087A  CSEG
SET_STAT_BUSY. . . . . . . . . . .   L NEAR  0650  CSEG
SET_STAT_DONE. . . . . . . . . . .   L NEAR  0642  CSEG
SET_VEC. . . . . . . . . . . . . .   Number  0025
STACK_OFFSET . . . . . . . . . . .   L WORD  0018  CSEG
STACK_SEG. . . . . . . . . . . . .   L WORD  0016  CSEG
STACK_START. . . . . . . . . . . .   L BYTE  01ED  CSEG   Length =0064
START. . . . . . . . . . . . . . .   Number  0000  CSEG
STRATEGY . . . . . . . . . . . . .   L WORD  0006  CSEG
SYSTEM . . . . . . . . . . . . . .   Number  0021
TEMP_BUFF. . . . . . . . . . . . .   L BYTE  02B9  CSEG   Length =0008
TEMP_STK_OFF . . . . . . . . . . .   L WORD  02B5  CSEG
TEMP_STK_SEG . . . . . . . . . . .   L WORD  02B7  CSEG
TICK_VEC_OFST. . . . . . . . . . .   Number  0070
TICK_VEC_SEG . . . . . . . . . . .   Number  0072
TIMEOUT_FAULT. . . . . . . . . . .   Number  0008
TIMER_TICK . . . . . . . . . . . .   L NEAR  02EF  CSEG
TIMER_TK_CT. . . . . . . . . . . .   L WORD  001C  CSEG
TIME_OUT_MASK. . . . . . . . . . .   Number  0002
TIM_TK_1 . . . . . . . . . . . . .   L NEAR  02FE  CSEG
TIM_TK_2 . . . . . . . . . . . . .   L NEAR  0330  CSEG
TIM_TK_3 . . . . . . . . . . . . .   L NEAR  033F  CSEG
TIM_TK_END . . . . . . . . . . . .   L NEAR  0351  CSEG
TRANS_ADDR_OFST. . . . . . . . . .   Number  000E
TRANS_ADDR_SEG . . . . . . . . . .   Number  0010
TX_BUFFER. . . . . . . . . . . . .   L BYTE  00C3  CSEG   Length =0100
TX_BUFFER_CNT. . . . . . . . . . .   L BYTE  00BA  CSEG
TX_BUFFER_END. . . . . . . . . . .   L BYTE  01C3  CSEG
TX_BUSY. . . . . . . . . . . . . .   L BYTE  00B3  CSEG
TX_CLEAR . . . . . . . . . . . . .   L BYTE  00B4  CSEG
TX_COUNT . . . . . . . . . . . . .   L BYTE  00AF  CSEG
TX_CTL_BIT_PORT. . . . . . . . . .   Number  0300
TX_DATA_1_PORT . . . . . . . . . .   Number  0301
TX_DATA_2_PORT . . . . . . . . . .   Number  0302
TX_DATA_3_PORT . . . . . . . . . .   Number  0303
TX_ERROR_TM. . . . . . . . . . . .   Number  0086
TX_FAULT . . . . . . . . . . . . .   L BYTE  00B1  CSEG
TX_FULL_TIMER. . . . . . . . . . .   L BYTE  00B2  CSEG
TX_IN_BUFFER . . . . . . . . . . .   L BYTE  00BB  CSEG   Length =0008
TX_MAX_MSGS. . . . . . . . . . . .   Number  0020
TX_MSG_LEN . . . . . . . . . . . .   Number  0008
TX_NEXT_IN . . . . . . . . . . . .   L WORD  0086  CSEG
TX_NEXT_OUT. . . . . . . . . . . .   L WORD  0088  CSEG
TX_READY . . . . . . . . . . . . .   Number  0004
TX_RETRIES . . . . . . . . . . . .   L BYTE  00B5  CSEG
TX_TIME. . . . . . . . . . . . . .   Number  0024
TX_TIMER . . . . . . . . . . . . .   L BYTE  00B0  CSEG
TX_TRANSMIT. . . . . . . . . . . .   Number  0001
UNKNOWN_CMD. . . . . . . . . . . .   Number  8003
VECTOR_SEGMENT . . . . . . . . . .   Number  0000
WRITE_CMD. . . . . . . . . . . . .   L NEAR  07FE  CSEG
WRITE_CMD_1. . . . . . . . . . . .   L NEAR  0817  CSEG Warning Severe
Errors  Errors
   0       0
```

What is claimed as new and desired to be secured by Letters Patent of the United States is:

1. In a communication and control network, the combination of, a network master controller which includes a processor means, said processor means having an input/output slot as part thereof, said processor means also having an address bus and a data bus, said address bus and said data bus being connected to said input/output slot, a common network line, a plurality of digital integrated circuits, each coupled to said common network line and each adapted to transmit plural bit messages to and receive plural bit messages from said common network line in a predetermined format, interface means positioned in said one input/output slot in connection with said data bus and also interconnected with one of said digital integrated circuits, said interface means providing a sole communication path between said processor means and said one digital integrated circuit, means in said processor means for developing a plural byte output message string, driver means including means for storing said plural byte output message string and means for reformatting said stored output message in said predetermined format and transmitting the same over said data bus to said interface means, and said interface means includes means for storing a message transmitted over said data bus by said driver means and transmitting the stored message to said one digital integrated circuit.

2. The combination of claim 1, wherein said driver means includes means for signaling said processor means in the event all of the bytes of said plural byte output message string are not developed within a predetermined time interval.

3. The combination of claim 1, wherein said plural byte output message string includes a control byte, said control byte having a first value when succeeding bytes of said output message string are data to be sent to another one of said digital integrated circuits coupled to said common network line and having a second value when succeeding bytes of said output message string are a command to be sent over said common network line to said other digital integrated circuit, said driver means including means responsive to said control byte for changing a predetermined control bit in said reformatted output message in accordance with the value of said control byte.

4. The combination of claim 3, wherein said control byte has a third value when succeeding bytes of said output message string comprise a desired address for said network master controller, said driver means including means responsive to said third value of said control byte for transmitting said desired address over said data bus to said interface means, said interface means including means for storing said desired address and controlling the address of said one digital integrated circuit in accordance therewith.

5. The combination of claim 3, wherein said control byte has a fourth value when a succeeding byte of said output message string comprises a desired baud rate for transmission of messages over said common network line, said driver means including means responsive to said fourth value of said control byte for transmitting said desired baud rate over said data bus to said interface means, said interface means including means for storing said desired baud rate and controlling the baud rate of said one digital integrated circuit in accordance therewith.

6. The combination of claim 3, wherein said plural byte output message string includes a further byte at least a portion of which indicates the number of times said reformatted output message is to be retransmitted over said data bus to said interface means in tee event no response to said output message is received over said common network line from said other digital integrated circuit, said driver means including means responsive to said further byte for retransmitting said reformatted message over said data bus to said interface means a corresponding number of times.

7. The combination of claim 1, wherein said driver means includes a message timer, means for initializing said message timer in response to the first byte of said plural byte output message string, means for decrementing said message timer at a predetermined rate, and means for signaling said processor means in the event all of the bytes of said plural byte output message string are to developed before said message time is decremented to zero.

8. The combination of claim 7, wherein said processor means includes a source of timing pulses which is used to decrement said message timer at said predetermined rate.

9. The combination of claim 1, wherein said driver means includes a receive timer for establishing a timeout interval during which a response to said output message should be received from another one of said digital integrated circuits over said common network line, means for setting said receive timer to a desired value in accordance with the value of a predetermined byte of said output message string, means for decrementing said receive timer at a predetermined rate, and means for signaling said processor means in the event said receive timer is decremented to zero before a response to said output message is received.

10. The combination of claim 9, wherein said processor means includes a source of timing pulses which is used to decrement said receive timer.

11. The combination of claim 1, wherein said driver means includes means responsive to the value of a predetermined byte of said plural byte output message string for establishing a time out interval during which a response to said reformatted output message should be received from another one of said digital integrated circuits over said common network line.

12. The combination of claim 11, wherein said driver means includes receive timer means responsive to a predetermined value of said predetermined byte for initiating a timeout interval of indefinite duration, and means responsive to a predetermined value of said predetermined byte in a succeeding plural byte output message string for resetting said receive timer to zero, thereby to terminate said timeout interval of indefinite duration.

13. The combination of claim 1, wherein said driver means includes means responsive to the value of a predetermined byte of said plural byte output message string for initiating a timeout interval of indefinite duration during which a response to said reformatted output message can be received from another one of said digital integrated circuits over said common network line.

14. The combination of claim 13, wherein said driver means includes means responsive to a predetermined value of said predetermined byte in a succeeding plural byte output message string for terminating said timeout interval.

15. The combination of claim I, wherein said plural byte output message string includes an operation code byte, a first bit of said operation code byte having a predetermined value when a response to said reformatted output message is expected back from another one of said digital integrated circuits over said common network line, said driver means including means responsive to said predetermined value of said first bit for preventing the transmission of another output message to said interface means.

16. The combination of claim 15, wherein transmission of another output message is prevented for a predetermined timeout interval.

17. The combination of claim 16, wherein the duration of said timeout interval is determined in accordance with the value of another byte of said plural byte output message string.

18. The combination of claim 17, wherein a second bit of said operation code byte has a predetermined value if said output message is to be repeated after said predetermined timeout interval, and said driver means includes means responsive to said predetermined value of said second bit for retransmitting said reformatted output message to said interface means.

19. The combination of claim 18, wherein said plural byte output message string includes another byte at least a portion of which indicates the number of times said output message is to be repeated, and said driver means includes means responsive to said portion of said other byte for retransmitting said reformatted output message to said interface means the indicated number of times.

20. The combination of claim 15, wherein a plurality of other bits in said operation code byte have values indicating the number of messages expected back from said other one of said digital integrated circuits over said common network line in response to said reformatted output message.

21. The combination of claim 20, wherein said interface means includes means for storing a response from said other digital integrated circuit over said common network line, said driver means including means for storing said received response message, and means for preventing the transmission of another output message to said interface means until the expected number of response message have been received as determined by said other bits of said operation code byte.

22. The combination of claim 21, wherein said driver means includes means for storing a number of message in response to said output message in accordance with he value of said other bits of said operation code byte, and means operative in the event that the number of responses called for by said other bits exceeds a predetermined maximum number of response messages for storing only said maximum number of responses.

23. The combination of claim 20, wherein another bit of said operation code byte has a predetermined value when said reformatted output message is to be retransmitted to said interface means and another byte of said string includes a portion which indicates the number of such retransmissions, said driver means including means for preventing any retransmissions of said reformatted output messages if the number of response messages expected back from said common network line is greater than one.

* * * * *